US010063829B2

(12) United States Patent
Inoue et al.

(10) Patent No.: US 10,063,829 B2
(45) Date of Patent: Aug. 28, 2018

(54) IMAGE PROCESSING METHOD, IMAGE PROCESSING APPARATUS, IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Chiaki Inoue, Utsunomiya (JP); Kaoru Eguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 14/683,333

(22) Filed: Apr. 10, 2015

(65) Prior Publication Data
US 2015/0304632 A1    Oct. 22, 2015

(30) Foreign Application Priority Data

Apr. 18, 2014  (JP) .................................. 2014-086065
Mar. 2, 2015   (JP) .................................. 2015-040020

(51) Int. Cl.
H04N 13/02      (2006.01)
H04N 13/00      (2018.01)
(Continued)

(52) U.S. Cl.
CPC ..... *H04N 13/0007* (2013.01); *G02B 27/0018* (2013.01); *G06T 5/005* (2013.01);
(Continued)

(58) Field of Classification Search
CPC ................................................. H04N 13/0007
See application file for complete search history.

(56) References Cited

U.S. PATENT DOCUMENTS

2011/0080401 A1*  4/2011  Tan .................... H04N 13/0018
                                                              345/419
2013/0194387 A1*  8/2013  Hatakeyama ........ H04N 5/3572
                                                               348/46
(Continued)

FOREIGN PATENT DOCUMENTS

JP     2008054206 A     3/2008
JP     2011205531 A    10/2011
JP     2014171236 A     9/2014

OTHER PUBLICATIONS

Ng et al., "Light Field Photography with a Hand-held Plenoptic Camera", Stanford Tech Report CTSR (Computer Science Technical Report), 2005, pp. 1-11. Cited in Specification.

(Continued)

*Primary Examiner* — Tracy Y Li
(74) *Attorney, Agent, or Firm* — Rossi, Kimms & McDowell LLP

(57) ABSTRACT

An image processing method includes the steps of determining a first unnecessary component contained in each of a plurality of parallax images based on a plurality of pieces of relative difference information of the parallax images, generating a first image by reducing the first unnecessary component from the parallax images, generating a blurred image by adding blur to the first image, creating a mask based on the blurred image and the first image, and determining a second unnecessary component based on the first unnecessary component and the mask.

19 Claims, 36 Drawing Sheets

(51) Int. Cl.
*G06T 5/00* (2006.01)
*G06T 5/50* (2006.01)
*G02B 27/00* (2006.01)
*H04N 5/21* (2006.01)

(52) U.S. Cl.
CPC ........... *G06T 5/50* (2013.01); *H04N 13/0018* (2013.01); *G06T 2200/21* (2013.01); *G06T 2207/10012* (2013.01); *H04N 5/211* (2013.01)

(56) References Cited

U.S. PATENT DOCUMENTS

| | | | |
|---|---|---|---|
| 2014/0009463 A1* | 1/2014 | Watanabe | G09G 5/14 345/419 |
| 2014/0022337 A1* | 1/2014 | Putraya | H04N 5/23238 348/36 |
| 2014/0035907 A1* | 2/2014 | Hasegawa | G09G 5/14 345/419 |
| 2014/0168387 A1 | 6/2014 | Aoki | |

OTHER PUBLICATIONS

Georgiev et al., "Full Resolution Light Field Rendering", Adobe Technical Report, Jan. 2008, pp. 1-12. Cited in Specification.

\* cited by examiner

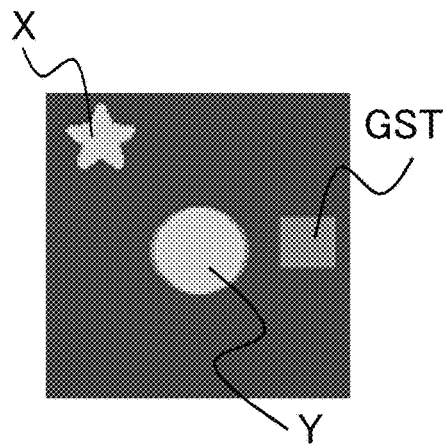 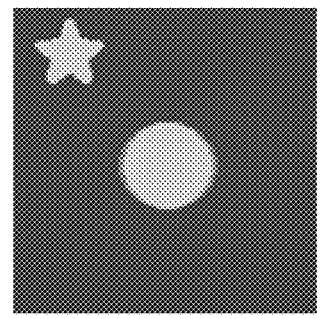
FIG. 1A  FIG. 1B
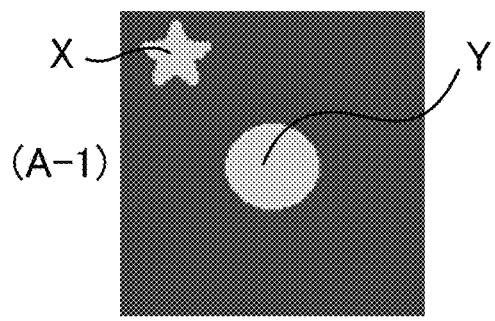 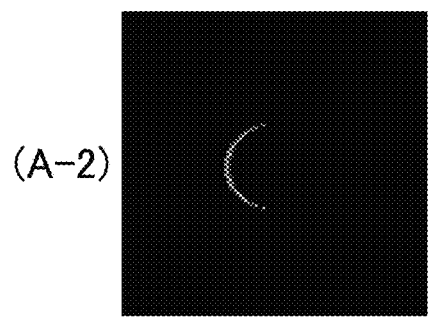
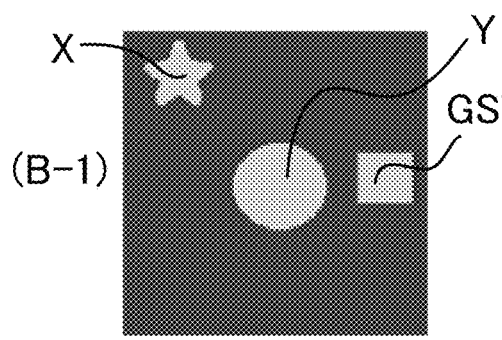 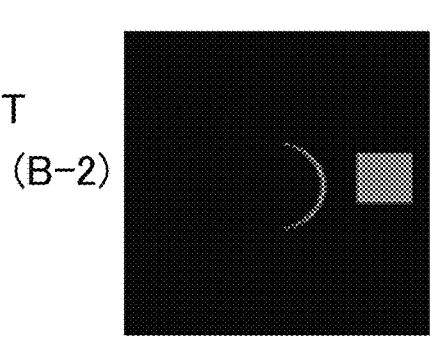
FIG. 2

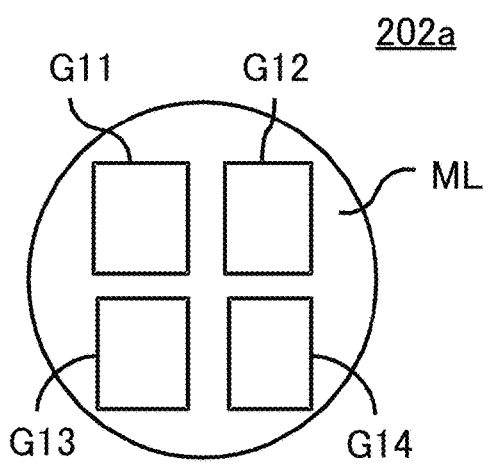
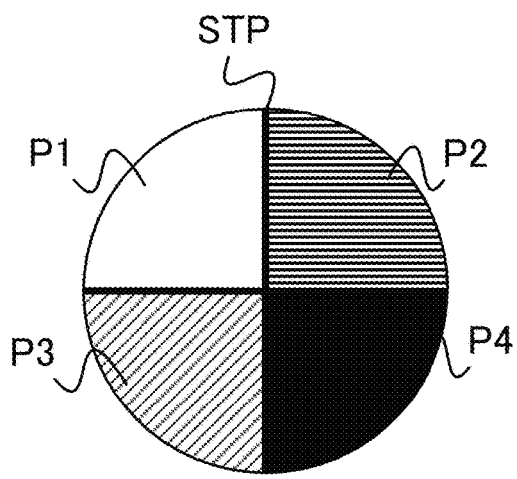
FIG. 13  FIG. 14
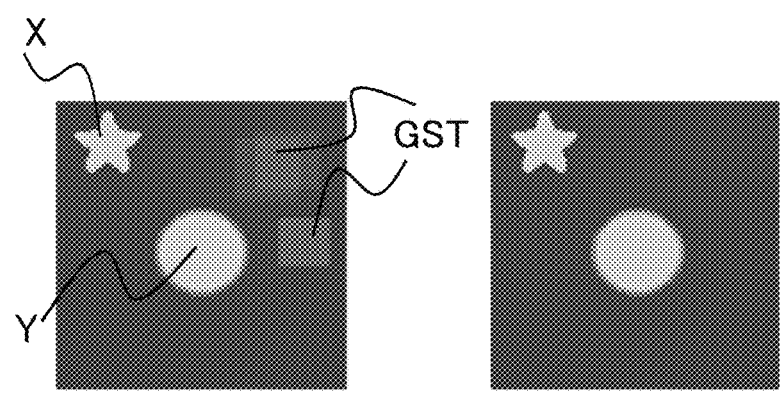
FIG. 15A  FIG. 15B

SECOND UNNECESSARY COMPONENT REGION

PARALLAX SYNTHESIS IMAGE

SECOND UNNECESSARY COMPONENT REGION

PARALLAX SYNTHESIS IMAGE

IMAGE PROCESSING METHOD, IMAGE PROCESSING APPARATUS, IMAGE PICKUP APPARATUS, AND NON-TRANSITORY COMPUTER-READABLE STORAGE MEDIUM

BACKGROUND OF THE INVENTION

Field of the Invention

The present invention relates to an image processing method for improving an image quality of a shot image.

Description of the Related Art

In image pickup through an image pickup apparatus such as a camera, part of light incident on an image pickup optical system may be reflected by a surface of a lens and a member holding the lens and arrive at an imaging plane as unnecessary light. This unnecessary light appears as an unnecessary component such as a ghost and a flare in a shot image. When a diffractive optical element is used to correct longitudinal (axial) chromatic aberration and chromatic aberration of magnification, light from a high intensity object such as the sun outside an angle of view for the image shooting may be incident on the diffractive optical element, generating unnecessary light as an unnecessary component over the entire image.

Japanese Patent Laid-open No. 2008-54206 discloses a method of detecting any ghost based on a difference image indicating a difference between an image (in-focus image) when an image pickup optical system is in focus on an object and an image (defocus image) when the image pickup optical system is out of focus. However, the method disclosed in Japanese Patent Laid-open No. 2008-54206 requires image pickup to be performed a plurality of times and thus is not suitable for still image pickup and moving image pickup of a moving object.

Japanese Patent Laid-open No. 2011-205531 discloses a method of detecting any ghost based on comparison of a plurality of parallax images captured by a single-lens stereoscopic image pickup. The method disclosed in Japanese Patent Laid-open No. 2011-205531, which obtains a plurality of parallax images by single image pickup, is applicable to still image pickup and moving image pickup of a moving object.

However, the method disclosed in Japanese Patent Laid-open No. 2011-205531 detects any ghost by calculating a difference between a primary image and a secondary image, and thus has a degraded ghost detection effect when using parallax images captured at three viewpoints or more. Japanese Patent Laid-open No. 2011-205531 corrects an image shift caused by the parallax before detecting the ghost. In this case, a process such as extraction of a corresponding point can be applied to a focused object, but it is insufficient for a blurred object region and it is necessary to obtain detailed distance information (distance map) over an entire region of images from the image pickup apparatus to the object. On the other hand, when the ghost is to be detected without correcting the parallax difference, the parallax component as well as the ghost is detected and the parallax component and the unnecessary component (ghost component) cannot be separated from each other.

When a diffractive optical element is used in a telephoto lens to correct longitudinal (axial) chromatic aberration and chromatic aberration of magnification, light from a high intensity object such as the sun outside an angle of view for the image shooting may be incident on the diffractive optical element, generating unnecessary light over the entire image. This unnecessary light also appears as an unnecessary component in the shot image. Previously, a method of removing the unnecessary component by using digital image processing has been known.

Japanese Patent Laid-open Nos. 2011-205531 and 2014-171236 disclose a method of detecting any ghost based on comparison of a plurality of parallax images captured by a single-lens stereoscopic image pickup. The method disclosed in Japanese Patent Laid-open Nos. 2011-205531 and 2014-171236, which obtains a plurality of parallax images by single image pickup, is applicable to still image pickup and moving image pickup of a moving object.

In the method disclosed in Japanese Patent Laid-open No. 2011-205531, however, it is assumed that a parallax component is previously corrected and thus the ghost cannot be correctly detected when the parallax component still exists.

On the other hand, Japanese Patent Laid-open No. 2014-171236 discloses a method of detecting the ghost when the parallax component still exists. With respect to a distant view such as a landscape photograph which contains a small amount of parallax component, a low-pass filter can be applied to the parallax image to remove the parallax component. However, with respect to an image containing a large amount of parallax component such as an image focused on a close-distance object, application of the low-pass filter is insufficient to remove the parallax component. On the other hand, when the low-pass filter is strongly applied, the ghost to be detected decreases as well and it is difficult to appropriately detect the ghost.

SUMMARY OF THE INVENTION

The present invention provides an image processing method, an image processing apparatus, an image pickup apparatus, and a non-transitory computer-readable storage medium that are capable of separating a parallax component and an unnecessary component contained in a shot image without performing image pickup a plurality of times. Furthermore, the present invention provides an image processing apparatus, an image pickup apparatus, an image processing method, and a non-transitory computer-readable storage medium that are capable of determining a first unnecessary component of a shot image without performing image pickup a plurality of times to determine a second unnecessary component in which an object parallax component is reduced from the first unnecessary component.

An image processing method as one aspect of the present invention includes the steps of determining a first unnecessary component contained in each of a plurality of parallax images based on a plurality of pieces of relative difference information of the parallax images, generating a first image by reducing the first unnecessary component from the parallax images, generating a blurred image by adding blur to the first image, creating a mask based on the blurred image and the first image, and determining a second unnecessary component based on the first unnecessary component and the mask.

An image processing apparatus as another aspect of the present invention includes a first unnecessary component determiner configured to determine a first unnecessary component contained in each of a plurality of parallax images based on a plurality of pieces of relative difference information of the parallax images, an image generator configured to generate a first image by reducing the first unnecessary component from the parallax images, a blurred image generator configured to generate a blurred image by adding blur to the first image, a mask creator configured to create a mask based on the blurred image and the first image, and a second unnecessary component determiner configured to determine a second unnecessary component based on the first unnecessary component and the mask.

An image pickup apparatus as another aspect of the present invention includes an image pickup element configured to photoelectrically convert an optical image to output a plurality of parallax images, a first unnecessary component determiner configured to determine a first unnecessary component contained in each of the parallax images based on a plurality of pieces of relative difference information of the parallax images, an image generating unit configured to generate a first image by reducing the first unnecessary component from the parallax images, a blurred image generating unit configured to generate a blurred image by adding blur to the first image, a mask creating unit configured to create a mask based on the blurred image and the first image, and a second unnecessary component determiner configured to determine a second unnecessary component based on the first unnecessary component and the mask.

A non-transitory computer-readable storage medium is another aspect of the present invention stores an image processing program to cause a computer to execute a process including the steps of determining a first unnecessary component contained in each of a plurality of parallax images based on a plurality of pieces of relative difference information of the parallax images, generating a first image by reducing the first unnecessary component from the parallax images, generating a blurred image by adding blur to the first image, creating a mask based on the blurred image and the first image, and determining a second unnecessary component based on the first unnecessary component and the mask.

An image processing apparatus as another aspect of the present invention includes a first determiner configured to determine a first unnecessary component based on difference information of a plurality of parallax images, and a second determiner configured to determine a second unnecessary component by reducing a parallax component from the first unnecessary component.

An image pickup apparatus as another aspect of the present invention includes an image pickup unit configured to photoelectrically convert an optical image formed via an optical system to output a plurality of parallax images, a first determiner configured to determine a first unnecessary component based on difference information of the parallax images, and a second determiner configured to determine a second unnecessary component by reducing a parallax component from the first unnecessary component.

An image processing method as another aspect of the present invention includes the steps of determining a first unnecessary component based on difference information of a plurality of parallax images, and determining a second unnecessary component by reducing a parallax component from the first unnecessary component.

A non-transitory computer-readable storage medium as another aspect of the present invention stores an image processing program to cause a computer to execute a process including the steps of determining a first unnecessary component based on difference information of a plurality of parallax images, and determining a second unnecessary component by reducing a parallax component from the first unnecessary component.

Further features and aspects of the present invention will become apparent from the following description of exemplary embodiments with reference to the attached drawings.

BRIEF DESCRIPTION OF THE DRAWINGS

FIGS. 1A and 1B illustrate exemplary output images obtained by an image processing method in Embodiment 1.

FIG. 2 illustrates a procedure of the image processing method in Embodiment 1.

FIG. 13 illustrates an image pickup element in Embodiment 3.

FIG. 14 illustrates an explanatory diagram of unnecessary light passing through an aperture stop of the optical system in Embodiment 3.

FIGS. 15A and 15B illustrate exemplary output images obtained by an image processing method in Embodiment 3.

DESCRIPTION OF THE EMBODIMENTS

Exemplary embodiments of the present invention will be described below with reference to the accompanied drawings.

An image pickup apparatus capable of generating a plurality of parallax images used in each embodiment of the present invention includes an image pickup system that guides a plurality of light beams passing through regions of a pupil of an optical system (image pickup optical system) that are different from each other, to light-receiving portions (pixels) of an image pickup element that are different from each other and perform photoelectric conversions.

Figure 4:
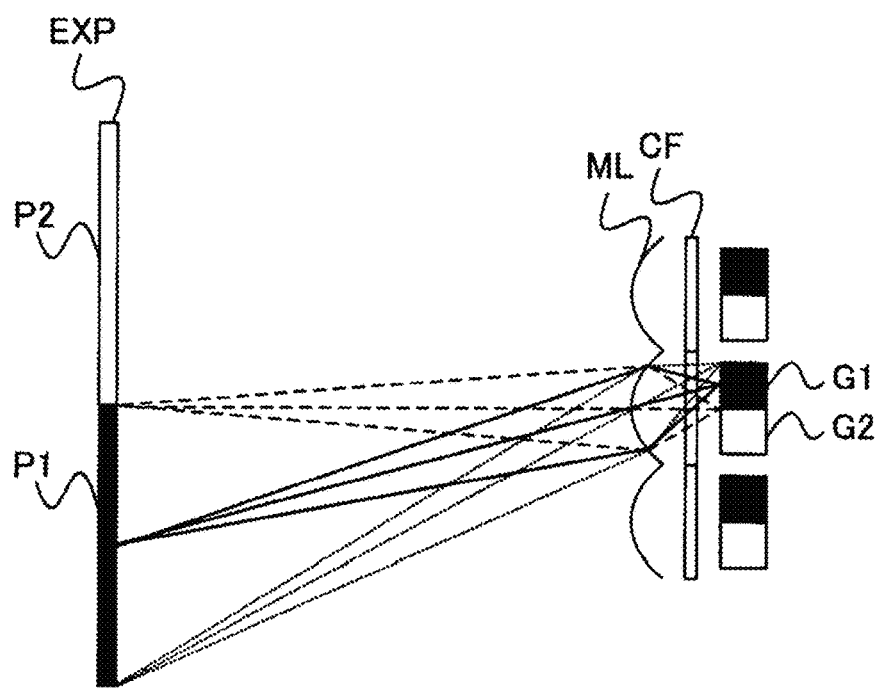
FIG. 4 illustrates a relational diagram of a light-receiving portion of an image pickup element and a pupil of an optical system in an image pickup system in each embodiment.

FIG. 4 illustrates a relation between the light-receiving portions of the image pickup element in the image pickup system in this embodiment and the pupil of the optical system. In FIG. 4, ML represents a micro lens, and CF represents a color filter. EXP represents an exit pupil (the pupil) of the optical system, and P1 and P2 represent regions of the exit pupil EXP. G1 and G2 represent the pixels (light-receiving portions), and one pixel G1 and one pixel G2 makes a pair (the pixels G1 and G2 are disposed to share one micro lens ML). The image pickup element includes an array of a plurality of pairs (pixel pairs) of the pixels G1 and G2. The paired pixels G1 and G2 have a conjugate relation with the exit pupil EXP via the shared (that is, provided for each pixel pair) micro lens ML. In each embodiment, the pixels G1 and G2 arrayed in the image pickup element are also referred to as pixel units G1 and G2, respectively.

Figure 5:
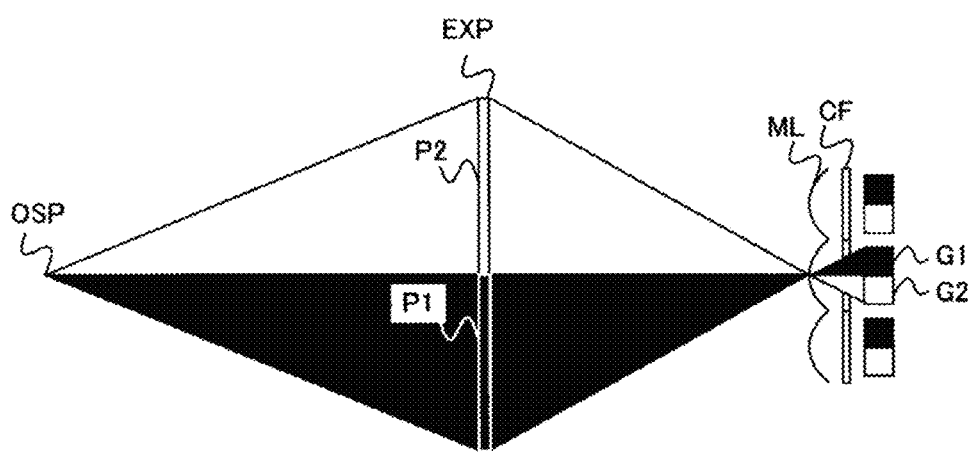
FIG. 5 illustrates a schematic diagram of the image pickup system in each embodiment.

FIG. 5 is a schematic diagram of the image pickup system in this embodiment which is assumed to have a configuration in which instead of the micro lens ML illustrated in FIG. 4, a thin lens is provided at the position of the exit pupil EXP. The pixel G1 receives a light beam passing through a region P1 of the exit pupil EXP. The pixel G2 receives a light beam passing through a region P2 of the exit pupil EXP. Symbol OSP represents an object point for which image pickup is performed. The object point OSP does not necessarily need to have an object located thereon. A light beam passing through the object point OSP is incident on one of the pixel G1 and the pixel G2 depending on a position (the region P1 or the region P2 in this embodiment) in the pupil (exit pupil EXP) through which the light beam passes. Travelling of light beams through regions of the pupil that are different from each other corresponds to separation of an incident light from the object point OSP by its angle (parallax). In other words, for each micro lens ML corresponding to the pixels G1 and G2, an image based on an output signal from the pixel G1 and an image based on an output signal from the pixel G2 are generated as a plurality of (in this example, a pair of) parallax images having parallaxes with each other. Hereinafter, reception of light beams passing through the regions of the pupil that are different from each other by the light-receiving portions (pixels) different from each other may be referred to as pupil division.

When the conjugate relation is not completely held due to, for example, a position shift of the exit pupil EXP illustrated in FIGS. 4 and 5, or when the regions P1 and P2 partially overlap with each other, a plurality of obtained images are still treated as parallax images. A minimum element that constitutes an image is called a pixel (pixel signal), which is distinguished from a pixel on the image pickup element, and each pixel represents a light intensity and color according to its numerical value. A value of each pixel is referred to as a pixel value. The pixel value is equal to a luminance value when the image is a monochrome image, and each embodiment in the present invention will describe the monochrome image for simplicity. Therefore, in each embodiment, the pixel value and the luminance value have the same meaning. When the image is an RGB color image, the same calculation can be performed for each color of the pixel values. This is true also in each of the following embodiments.

Embodiment 1

Figure 6:
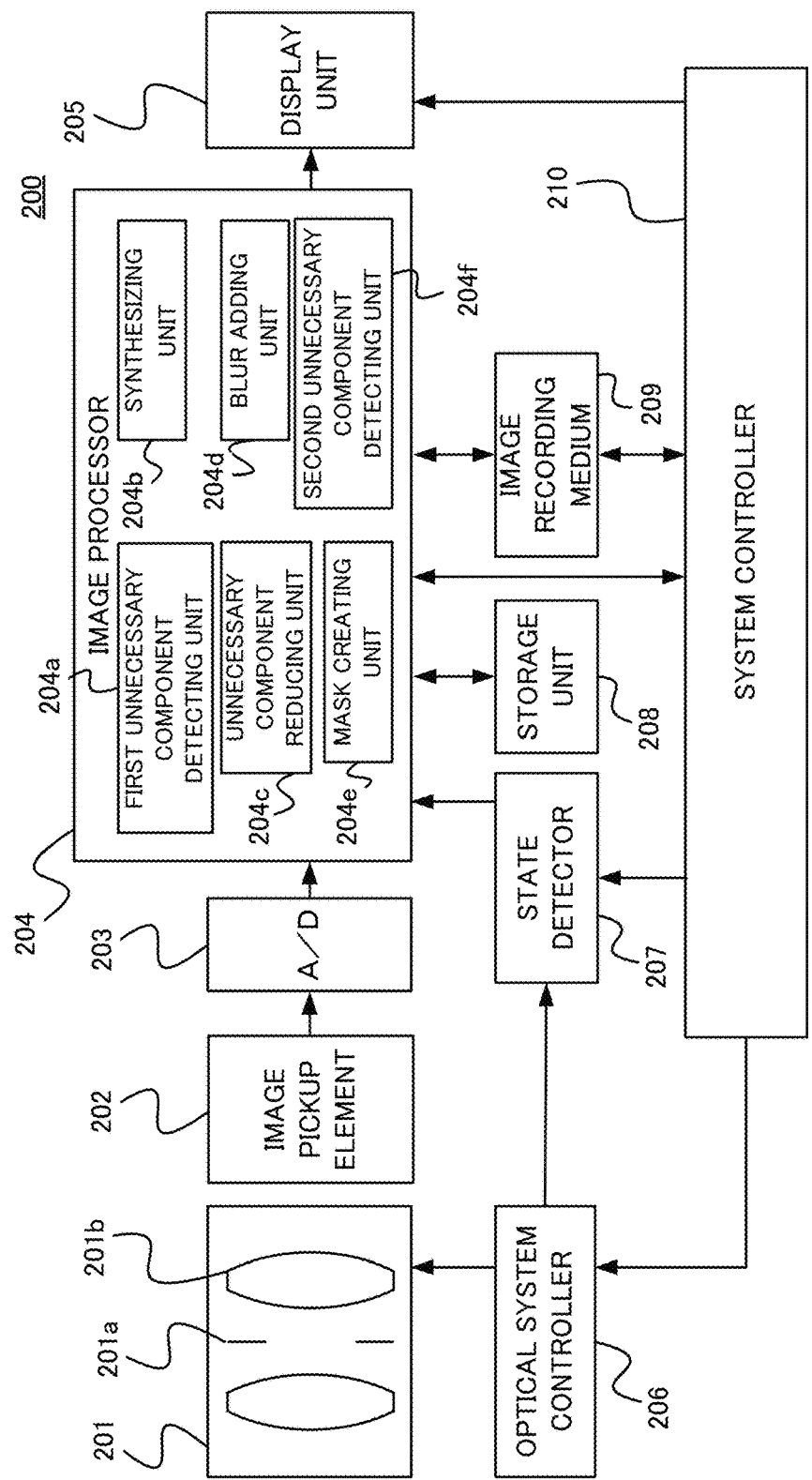
FIG. 6 illustrates a block diagram of an image pickup apparatus in each of Embodiments 1 to 5.

Referring to FIG. 6, an image pickup apparatus that executes an image processing method in Embodiment 1 of the present invention will be described. FIG. 6 is a block diagram of a configuration of an image pickup apparatus 200 in this embodiment. An optical system 201 (image pickup optical system) includes an aperture stop 201a and a focus lens 201b, and causes light from an object (not illustrated) to be imaged (condensed) on an image pickup element 202. The image pickup element 202 includes a photoelectric conversion element such as a CCD sensor and a CMOS sensor, and receives light beams passing through regions of the pupil that are different from each other, through pixels (light-receiving portions) corresponding to the respective regions (performs the pupil division), as described referring to FIGS. 4 and 5. In this manner, the image pickup element 202 performs a photoelectric conversion on an object image (optical image) and outputs image signals (analog electric signals) as a plurality of parallax images. An A/D converter 203 converts the analog electric signals output from the image pickup element 202 into digital signals, and then outputs these digital signals to an image processor 204 (image processing unit).

The image processor 204 performs typical image processing on the digital signals, and also performs a determination process of unnecessary light and a correction process to reduce or remove the unnecessary light. In this embodiment, the image processor 204 corresponds to an image processing apparatus incorporated in the image pickup apparatus 200. The image processor 204 includes a first unnecessary component detecting unit 204a, a synthesizing unit 204b, an unnecessary component reducing unit 204c, a blur adding unit 204d, a mask creating unit 204e, and a second unnecessary component detecting unit 204f.

The first unnecessary component detecting unit 204a (first unnecessary component determiner) generates (acquires) parallax images and detects (determines) a first unnecessary component in the parallax images. The synthesizing unit 204b (synthesizer) calculates a synthesis value of the detected unnecessary components and synthesizes the generated parallax images. The unnecessary component reducing unit 204c (image generator) reduces an unnecessary component in the synthesized parallax image based on the calculated first unnecessary component or a second unnecessary component described below, or a synthesis value of them. The blur adding unit 204d (blurred image generator) adds blur to a first unnecessary component removed image in which the first unnecessary component is removed or reduced from the parallax image synthesized based on the first unnecessary component or each parallax image. The mask creating unit 204e (mask creator) creates a mask based on the first unnecessary component removed image and the blurred image obtained by adding the blur to the first unnecessary component removed image. The second unnecessary component detecting unit 204f (second unnecessary component determiner) determines a second unnecessary component based on the first unnecessary component and the mask. An output image (image data) processed at the image processor 204 is stored in an image recording medium 209 such as a semiconductor memory and an optical disk. The output image from the image processor 204 may be displayed on a display unit 205. A storage unit 208 stores an image processing program and various kinds of information needed for the image processing by the image processor 204.

A system controller 210 (control unit) controls the operation of the image pickup element 202, the processing at the image processing unit 204, and the optical system 201 (the aperture stop 201a and the focus lens 201b). An optical system controller 206 performs mechanical drive of the aperture stop 201a and the focus lens 201b of the optical system 201 in response to a control instruction from the system controller 210. The aperture stop 201a has its opening diameter controlled in accordance with a set aperture value (F-number). The focus lens 201b has its position controlled by an autofocus (AF) system and a manual focus mechanism (not illustrated) to perform focusing (focus control) in accordance with an object distance. A state detector 207 acquires current image capturing condition information in response to a control instruction from the system controller 210. In this embodiment, the optical system 201 is included as part of the image pickup apparatus 200 (integrally with the image pickup apparatus 200) including the image pickup element 202, but is not limited thereto. Like a single-lens reflex camera, the image pickup system may include an interchangeable optical system (interchangeable lens) detachably attached to an image pickup apparatus body.

Figure 7A:
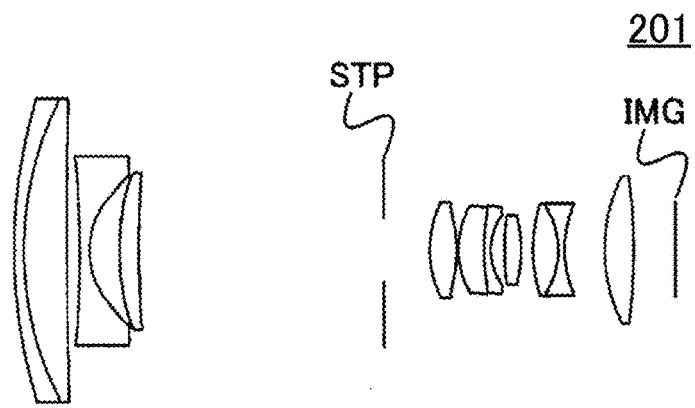
FIGS. 7A and 7B illustrate a configuration of the optical system and an explanatory diagram of unnecessary light occurring in the optical system in Embodiment 1.
Figure 7B:
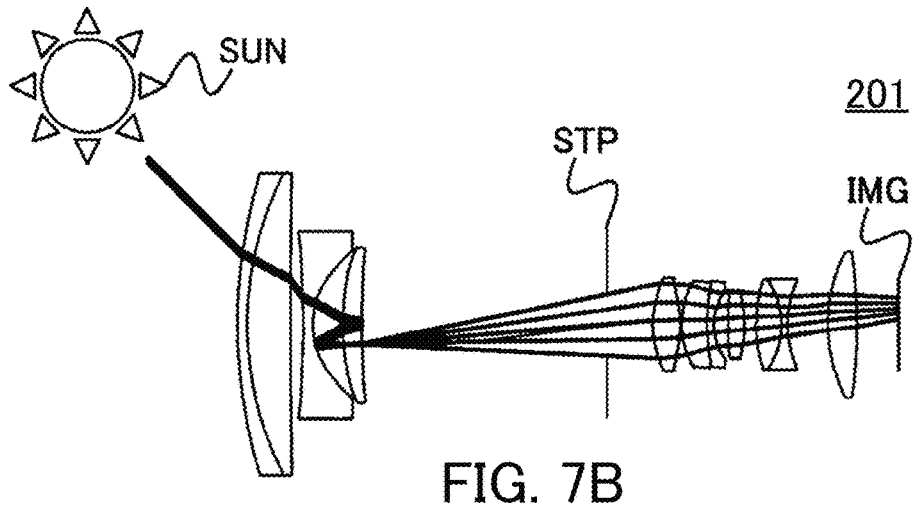

FIGS. 7A and 7B are a configuration diagram of the optical system 201 and an explanatory diagram of unnecessary light occurring in the optical system 201, respectively. FIG. 7A specifically illustrates an exemplary configuration of the optical system 201. In FIG. 7A, symbol STP represents an aperture stop (corresponding to the aperture stop 201a), and symbol IMG represents an imaging plane. The image pickup element 202 illustrated in FIG. 6 is disposed at the position of the imaging plane IMG. FIG. 7B illustrates a case in which strong light from the sun denoted with SUN as an exemplary high luminance object is incident on the optical system 201, and light reflected at a surface of a lens included in the optical system 201 arrives as unnecessary light (ghost and flare) at the imaging plane IMG.

Figure 8:
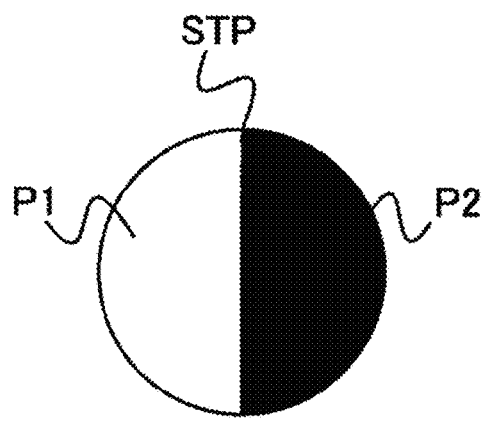
FIG. 8 illustrates an explanatory diagram of unnecessary light passing through an aperture stop of the optical system in Embodiment 1.

FIG. 8 illustrates the regions P1 and P2 (pupil regions or pupil division regions) of the aperture stop STP, through which light beams incident on the pixels G1 and G2 illustrated in FIG. 5 pass. The aperture stop STP can be assumed to correspond to the exit pupil EXP of the optical system 201, but in practice, it is often the case that the aperture stop STP and the exit pupil EXP are different from each other. Although a light beam from the high luminance object (SUN) passes through an almost entire region of the aperture stop STP, a region through which the light beams to be incident on the pixels G1 and G2 pass divided into the regions P1 and P2 (pupil regions).

Next, referring to FIGS. 1A and 1B to FIGS. 3A to 3E, a method of determining an unnecessary component as an image component that appears through a photoelectric conversion of unnecessary light in a shot image generated by the image pickup apparatus 200 will be described. FIGS. 1A and 1B illustrate exemplary output images obtained by the image processing method in this embodiment. FIG. 1A illustrates a shot image obtained by synthesizing the plurality of parallax images generated through image pickup with the pupil division. The shot image of FIG. 1A includes two objects (objects X and Y) and an unnecessary component (ghost component GST) that occurs by a light source (not illustrated). The shot image of FIG. 1A is an example in a state where it focuses on the star-shaped object X (in-focus object) and the round-shaped object Y (out-of-focus object) is blurred. The ghost component GST illustrated as a square shape in the shot image is an unnecessary component as an image component corresponding to unnecessary light (ghost). In FIG. 1A, the unnecessary component (ghost component GST) is illustrated in gray, but in reality, it is somewhat transparent enough to see objects. An unnecessary component corresponds to unnecessary light on a shot object, and thus has luminance higher than that of the shot object. This is true also in other embodiments described below.

FIG. 2 illustrates a procedure of the image processing method in this embodiment. FIG. 2 (A-1) and FIG. 2 (B-1) respectively illustrate a pair of parallax images obtained by performing, at the pixel groups G1 and G2, a photoelectric conversion on light beams passing through the regions (pupil regions) P1 and P2. A pair of parallax images illustrated in FIG. 2 (A-1) and FIG. 2 (B-1) have a difference (parallax component) corresponding to their parallax as image components. As illustrated in FIG. 1A, when the object X is in focus and the object Y located behind it is blurred, the parallax component exists on the object Y. The pair of parallax images may contain the unnecessary component (ghost component GST) schematically illustrated as a square, and the unnecessary component is not contained in FIG. 2 (A-1) but contained only in FIG. 2 (B-1). This embodiment describes a state where the unnecessary components do not overlap with each other and separated from each other, but they may overlap with each other and have luminance differences. In other words, the unnecessary components GST having a square shape only need to have positions or luminances different from each other.

FIG. 2 (A-2) illustrates an image obtained by subtracting the image of FIG. 2 (B-1) in the pair of parallax images from the image of FIG. 2 (A-1) in the pair as a reference image. The image (relative difference image) includes, as a difference (relative difference information) of the pair of parallax images, a parallax component and an unnecessary component (ghost component GST). The difference calculation described above calculates the parallax component and the unnecessary component included in the image of FIG. 2 (B-1) as a negative value, but this negative value is discarded from the image of FIG. 2 (A-2) to simplify unnecessary component reducing process performed at the latter step. Therefore, the difference image of FIG. 2 (A-2) illustrates only the parallax component included in the image of FIG. 2 (A-1). Similarly, FIG. 2 (B-2) illustrates an image obtained by subtracting the image of FIG. 2 (A-1) in the pair of parallax images from the image of FIG. 2 (B-1) in the pair as a reference image. Similarly to the image of FIG. 2 (A-2), the difference calculation described above calculates the parallax component included in the image of FIG. 2 (A-1) as a negative value, but this negative value is discarded from the image of FIG. 2 (B-2) to simplify unnecessary component reducing process described below. Therefore, the difference image of FIG. 2 (B-2) illustrates the unnecessary component and the parallax component included in the image of FIG. 2 (B-1). Thus, leaving only the parallax component and the unnecessary component in the difference image (in other words, separating or extracting the parallax component and the unnecessary component), the parallax component and the unnecessary component can be determined.

In this state, although the unnecessary component (ghost component GST) can be extracted, the parallax component also exists. Therefore, it is necessary to separate the parallax component and the unnecessary component (ghost component GST). Subsequently, referring to FIGS. 3A to 3E, a method of separating the parallax component and the unnecessary component will be described. FIGS. 3A to 3E illustrate a procedure of the method (image processing method) of separating the parallax component and the unnecessary component.

Figure 3A:
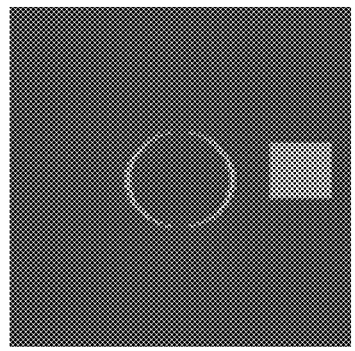
FIGS. 3A to 3E illustrate a procedure of the image processing method in Embodiment 1.

FIG. 3A is a synthesis image obtained by synthesizing the relative difference images of FIG. 2 (A-2) and FIG. 2 (B-2). The synthesis means for example calculating a sum value (combined value) or an average value of the relative difference image. In this embodiment, the synthesis is performed by calculating the average value. In this embodiment, the average value, illustrated in FIG. 3A, of the relative difference images (relative difference information) of the parallax images is referred to as a first unnecessary component. The first unnecessary component contains the mixture of the parallax component and the unnecessary component described above.

Figure 3B:
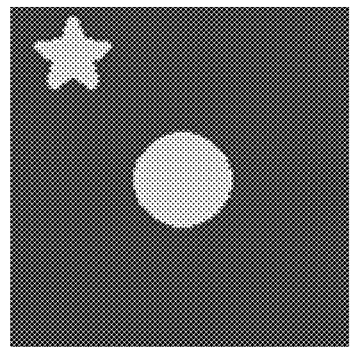

FIG. 3B is an image obtained by subtracting the first unnecessary component (image of FIG. 3A) from the shot image (image illustrated in FIG. 1A) obtained by synthesizing the plurality of parallax images described above, i.e. an image (first unnecessary component removed image) obtained by removing or reducing the first unnecessary component from the shot image. In the image of FIG. 3B, the unnecessary component (ghost component) is removed. However, in the image of FIG. 3B, the parallax component is removed at the same time, and the blurred portion of the object Y is removed. The blur in a photograph is an important factor as an image expression, and accordingly the image (output image) in which the blur is removed is undesirable.

Figure 3C:
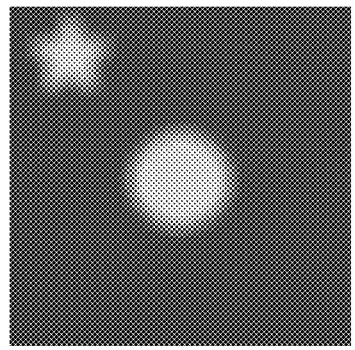
Figure 3D:
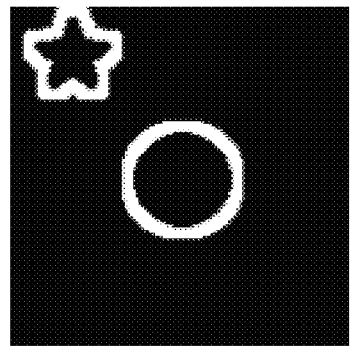
Figure 3E:
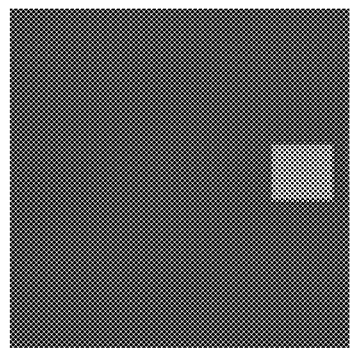

FIG. 3C is an image (blur added image) obtained by adding the blur to the first unnecessary component removed image (image of FIG. 3B). FIG. 3D is a mask (mask image) obtained by subtracting the first unnecessary component removed image (image of FIG. 3B) from the blur added image (image of FIG. 3C) and performing a binarizing process. As can be seen in FIG. 3C, adding the blur, edge portions of the objects are blurred and accordingly a luminance gradient occurs near the edge portions. Therefore, as described above, subtracting the first unnecessary component removed image (image of FIG. 3B) from the blur added image (image of FIG. 3C), only luminance gradient portions are extracted as illustrated in FIG. 3D. In other words, only regions near the edge portions of the objects are extracted. In this case, the parallax component descried above occurs only in the region near the edge portion of the object. Therefore, extracting the region near the edge portion of the object, a region in which the parallax component is contained can be specified. FIG. 3E is an image obtained by removing the parallax component from the first unnecessary component (image of FIG. 3A) by using the mask (image of FIG. 3D), and it corresponds to a second unnecessary component obtained by extracting only the unnecessary component. In this embodiment, the parallax component and the unnecessary component (ghost component) can be separated through such a procedure.

In this embodiment, it is assumed to output a shot image, as an output image, obtained by synthesizing the plurality of parallax images, which are generated through image pickup by the pupil division illustrated in FIG. 1A. In this embodiment, an average image of the parallax images is output as an output image. In this case, the second unnecessary component illustrated in FIG. 3E is also an average value of the unnecessary components of the parallax images. Then, for an image to be output, a correction process is performed to remove or reduce the second unnecessary component. Accordingly, this can generate an image with a reduced unnecessary component that is equivalent to a shot image generated through image pickup without the pupil division as illustrated in FIG. 1B.

Figure 9:
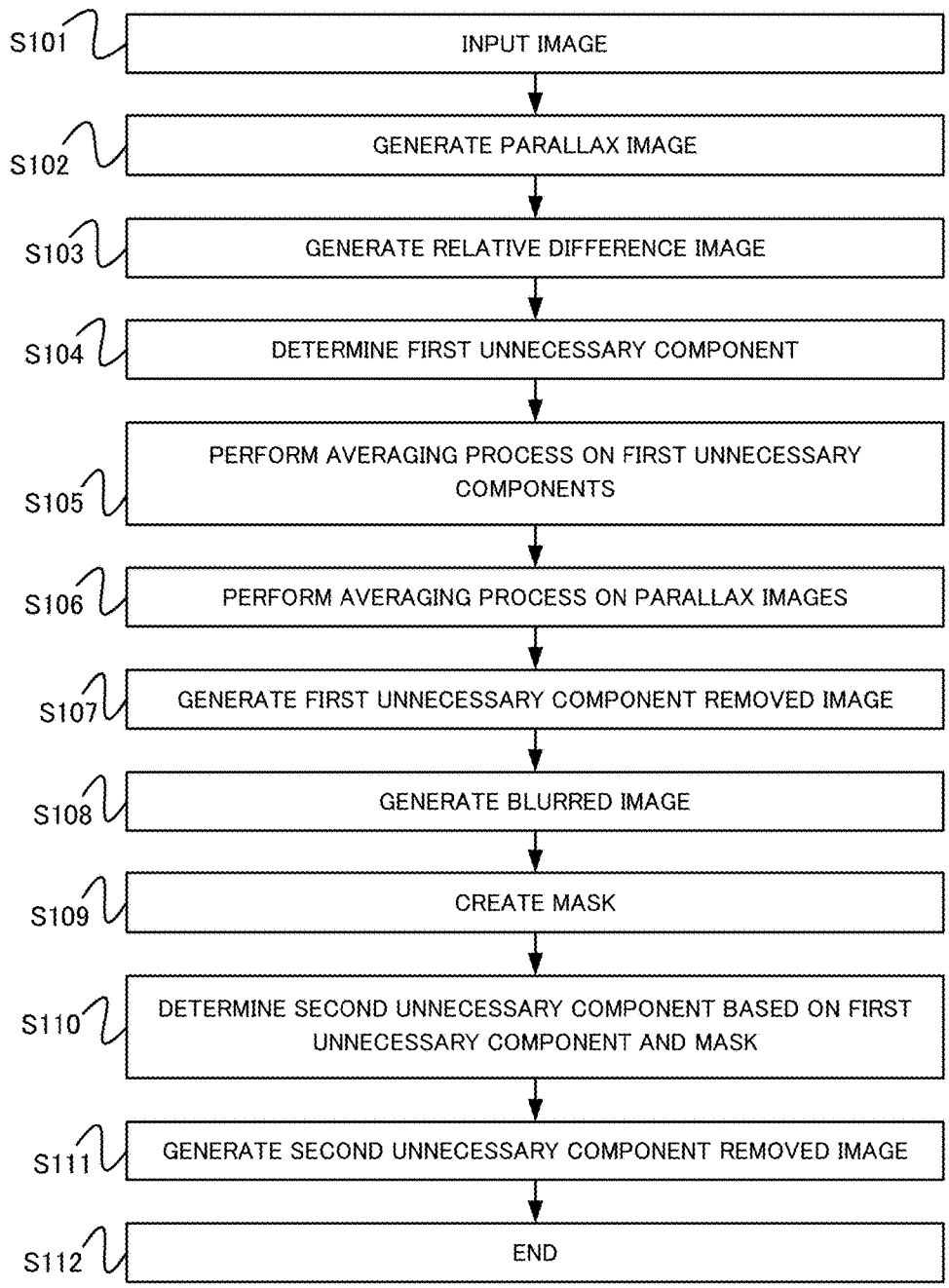
FIG. 9 illustrates a flowchart of the image processing method in Embodiment 1.

Next, referring to FIG. 9, a procedure of determination process (image processing) of any unnecessary component (ghost component) in this embodiment will be described. FIG. 9 illustrates a flowchart of the image processing method (method of determining the unnecessary component) in this embodiment. Each step in FIG. 9 is executed mainly by the system controller 210 or the image processor 204 in accordance with an image processing program as a computer program.

First of all, at step S101, the system controller 210 acquires an input image. In other words, the system controller 210 control the image pickup unit including the optical system 201 and the image pickup element 202 to take a photograph of an object. Subsequently, at step S102, the system controller 210 controls the image processor 204 to generate a pair of parallax images as input images by using digital signals output from the image pickup element 202 (pixel groups G1 and G2) and obtained by performing A/D conversion by an A/D convertor 203. In this case, the image processor 204 may perform a typical developing process or various image correcting processes to generate the parallax images.

Subsequently, at step S103, the first unnecessary component detecting unit 204a of the image processor 204 obtains relative difference information (relative difference images) of the parallax images. In other words, the first unnecessary component detecting unit 204a generates the relative difference image (image of FIG. 2 (A-2) by using the image of FIG. 2 (A-1) as a reference image and the relative difference image (image of FIG. 2 (B-2)) by using the image of FIG. 2 (B-1) as a reference image. When unnecessary lights reaching an imaging plane pass through pupil regions of the optical system 201 that are different from each other, the presence or absence of the unnecessary component (ghost component) or the position of occurrence of the unnecessary component is different for each parallax image as illustrated in FIG. 2 (A-1) and FIG. 2 (B-1). Therefore, in a simple relative difference image, a difference value of both the unnecessary components indicates positive and negative values. In this embodiment, subtracting the image of FIG. 2 (B-1) from the image (image of FIG. 2 (A-1)) to generate the relative difference image (image of FIG. 2 (A-2)), the unnecessary component contained in the image of FIG. 2 (A-1) indicates positive values and the unnecessary component contained in the image of FIG. 2 (B-1) indicates negative values. In this embodiment, for the sake of simplifying a process of reducing the unnecessary component described below, the negative values are discarded to zero. Therefore, with respect to the image of FIG. 2 (A-2), only the parallax component and the unnecessary component (ghost component) contained in the image of FIG. 2 (A-1) are detected as positive values. Performing the same process for the relative difference image (image of FIG. 2 (B-2)), with respect to the image of FIG. 2 (B-2), only the parallax component and the unnecessary component (ghost component) contained in the image of FIG. 2 (B-1) are detected as positive values.

Then, at step S104, the first unnecessary component detecting unit 204a determines a component remaining in the relative difference image generated at step S103 as a first unnecessary component. Specifically, each of the components (relative difference images) illustrated in FIG. 2 (A-2) and FIG. 2 (B-2) are the first unnecessary component.

Subsequently, at step S105, the synthesizing unit 204b of the image processor 204 performs an averaging process on (synthesizes) the first unnecessary components (relative difference images) of the parallax images determined at step S104. Specifically, the synthesizing unit 204b performs the averaging process of the relative difference image of FIG. 2 (A-2) and the relative difference image of FIG. 2 (B-2) to generate the averaged first unnecessary component (image of FIG. 3A).

Then, at step S106, the synthesizing unit 204b performs the averaging process of the parallax images and outputs an image (averaged parallax image) equivalent to a shot image generated through image pickup without the pupil division. Specifically, the synthesizing unit 204b performs the averaging calculation of the parallax image of FIG. 2 (A-1) and the parallax image of FIG. 2 (B-1) generated at step S102 to generate an averaged synthesis image (image of FIG. 1A). Alternatively, the synthesis image may be generated by adding the digital signals output from the image pickup element 202 (pixel groups G1 and G2) and obtained by performing A/D conversion by the A/D convertor 203 without performing the step (step S102) of generating the parallax images.

Subsequently, at step S107, the unnecessary component reducing unit 204c of the image processor 204 performs a correction process of removing or reducing the averaged first unnecessary component from the averaged parallax image to generate a first unnecessary component removed image (image of FIG. 3B). In this case, since the negative values are discarded to be zero at step S103, only the first unnecessary component is detected as positive values.

Therefore, simply subtracting the averaged first unnecessary component (image of FIG. 3A) from the synthesis image (image of FIG. 1A), the unnecessary component reducing unit 204c is capable of generating the image (first unnecessary component removed image) in which the first unnecessary component is removed.

Subsequently, at step S108, the blur adding unit 204d of the image processor 204 adds blur to the first unnecessary component removed image (image of FIG. 3B) to generate a blurred image (image of FIG. 3C). Specifically, the blur adding unit 204d performs a filtering process by using a filter having a blurring effect for the first unnecessary component removed image. In this embodiment, a Gaussian filter which can adjust a blur amount is used. In this embodiment, a filter coefficient as a blur amount is set by using the standard deviation of Gaussian distribution to be sufficiently large compared to the parallax component. On the other hand, the blur amount can also be determined by referring the image shooting condition such as a focal length and an aperture value Fno of the optical system 201 obtained from the state detector 207. The blur amount is an amount determined based on a parameter to control the strength of the blur such as the standard deviation of Gaussian distribution or a parameter to control a range of the blur depending on a size of the filter. A parallax difference amount (corresponding to a region size of the parallax component) of the object varies depending on the focal length or the aperture value Fno of the optical system 201. Therefore, referring to the image shooting condition, an optimum blur amount can be determined and the size of the filter can be reduced.

In this embodiment, the same blur amount is applied to the entire image, but it is preferred that the blur amount is changed depending on a distance for each object when object distance information is known. Since the parallax difference amount of the object varies depending on the object distance, changing the blur amount depending on the distance for each object, an optimum blur amount can be determined for each object and the size of the filter can be reduced. Reducing the size of the filter, a process load of the blur adding process performed by the blur adding unit 204d can be greatly reduced. With respect to the object distance information, first, corresponding points of the object are extracted by using a block matching method generally known for a pair of parallax images, and a parallax amount is calculated as a difference of positions of pixels of the corresponding points between the parallax images. Then, the distance information for the shooting object can be calculated based on the calculated parallax amount, the focal length of the image pickup system as known information, and base length data by the pupil division. In this embodiment, the calculating step of the object distance information may be added.

Subsequently, at step S109, the mask creating unit 204e of the image processor 204 generates a mask (image of FIG. 3D) based on difference information of the blurred image (image of FIG. 3C) generated at step S108 and the first unnecessary component removed image (image of FIG. 3B). Specifically, the mask creating unit 204e subtracts the first unnecessary component removed image from the blur added image and performs a binarizing process to create the mask (mask image). In this embodiment, the mask described above is used as it is, and a mask region can be enlarged by adding the blur to the mask by the blur adding unit 204d. Enlarging the mask region, the parallax component can be surely masked even in a state where the object is greatly blurred. In order to further reduce the size of the filter, at each of steps S108 and S109, each process may be performed by using a reduced image. Reducing the image size, the size of the filter to blur an image can be reduced, and the process load of the blur adding process can be greatly reduced. Furthermore, enlarging the mask created by using the reduced image up to an original image size, an approximately equivalent mask can be created.

Subsequently, at step S110, the second unnecessary component detecting unit 204f of the image processor 204 determines a second unnecessary component (image of FIG. 3E) based on the first unnecessary component and the mask. Specifically, the second unnecessary component detecting unit 204f performs a masking process for the first unnecessary component (image of FIG. 3A) by using the mask (image of FIG. 3C) described above. Accordingly, only the parallax components can be removed from the mixture (mixed image) of the parallax component and the unnecessary component (ghost component).

Subsequently, at step S111, the unnecessary component reducing unit 204c performs a correction process to reduce or remove the second unnecessary component (image of FIG. 3E) from an image to be output. In this embodiment, the image processor 204 generates, as an image to be output, an image equivalent to the shot image, which is illustrated in FIG. 1B, generated through image pickup without the pupil division. In this case, since only the unnecessary component is detected as positive values by discarding the negative values to be zero at step S103, the unnecessary component can be removed by simply subtracting the second unnecessary component of FIG. 3E from the synthesis image of FIG. 1A. Finally, at step S112, the system controller 210 stores an output image (image of FIG. 1B) in which the unnecessary component is removed or reduced in the image recording medium 209 or displays the output image on the display unit 205.

According to this embodiment, an unnecessary component (ghost component) formed by unnecessary light can be determined from a plurality of relative difference images based on a plurality of parallax images obtained by image pickup once. In other words, the unnecessary component contained in a shot image can be determined without performing image pickup a plurality of times. Furthermore, since negative values are discarded in generating the relative difference images, a high-quality shot image in which the unnecessary component determined only by a simple difference calculation is appropriately removed or reduced can be obtained.

Embodiment 2

Next, Embodiment 2 of the present invention will be described. An image pickup apparatus in this embodiment has the same basic configuration as that of the image pickup apparatus 200 in Embodiment 1 described referring to FIG. 6, and thus a description thereof will be omitted. In addition, a light-receiving portion of an image pickup element in an image pickup system of this embodiment has the same configuration as that of Embodiment 1, and thus a description thereof will be omitted.

Figure 10:
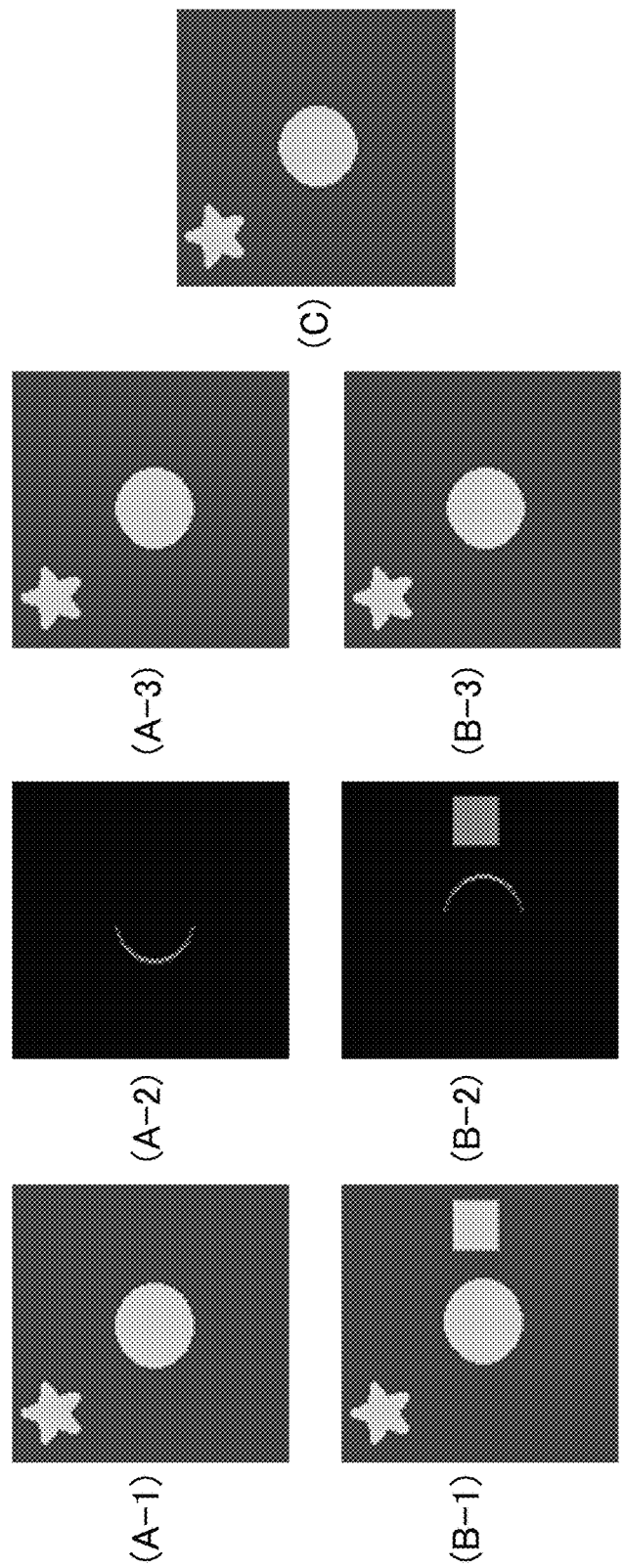
FIG. 10 illustrates a procedure of an image processing method in Embodiment 2.
Figure 11:
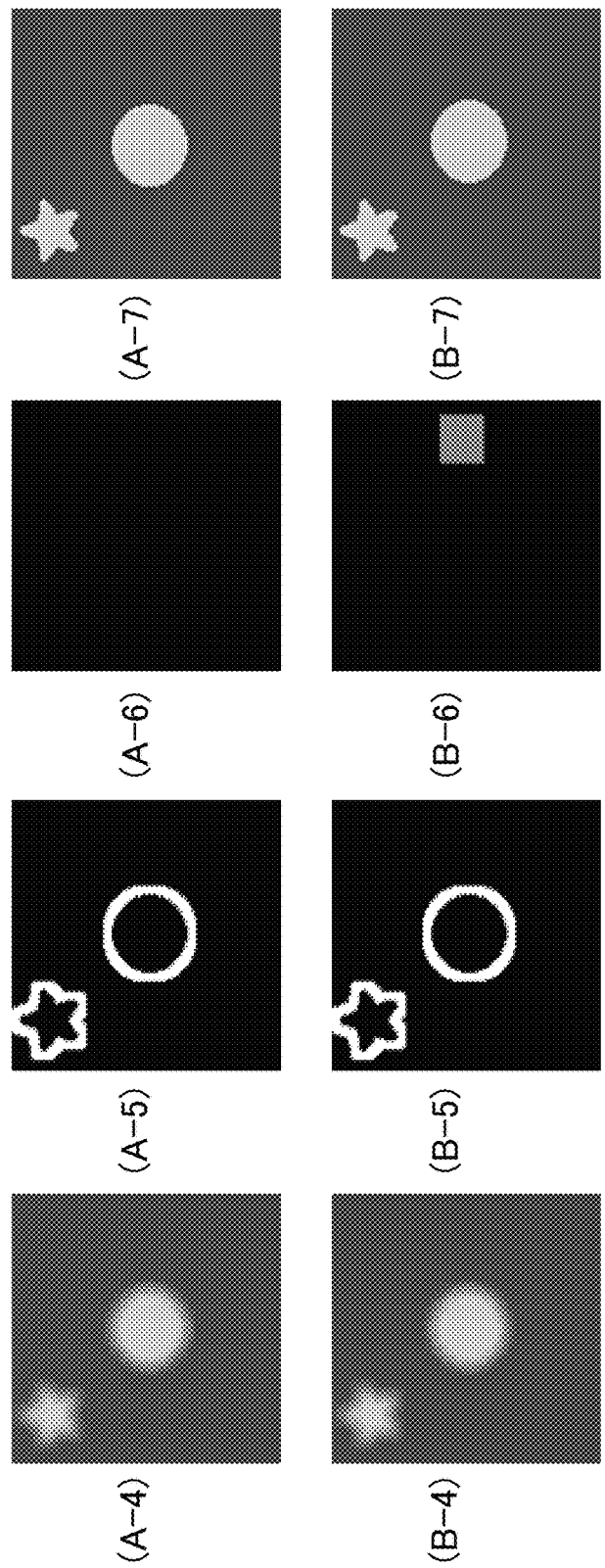
FIG. 11 illustrates a procedure of the image processing method in Embodiment 2.

Referring to FIGS. 10 and 11, a method of determining an unnecessary component in this embodiment will be described. A shot image obtained by synthesizing a plurality of parallax images generated through image pickup with the pupil division is the same as that of FIG. 1A. FIGS. 10 and 11 illustrates a procedure of an image processing method in this embodiment.

FIG. 10 (A-1) and FIG. 10 (B-1) respectively illustrate a pair of parallax images obtained by performing, at the pixel groups G1 and G2, a photoelectric conversion on light beams passing through the regions (pupil regions) P1 and P2. The pair of parallax images have a difference (parallax component) corresponding to their parallax as image components. When the object X is in focus and the object Y located behind it is blurred as illustrated in FIG. 1A, the parallax component exists on the object Y. The pair of parallax images may contain the unnecessary component (ghost component GST) schematically illustrated as a square, and the unnecessary component is not contained in FIG. 10 (A-1) but contained only in FIG. 10 (B-1).

FIG. 10 (A-2) illustrates an image obtained by subtracting the image of FIG. 10 (B-1) in the pair of parallax images from the image of FIG. 10 (A-1) in the pair as a reference image. The image (relative difference image) includes, as a difference (relative difference information) of the pair of parallax images, a parallax component and the unnecessary component described above. The difference calculation described above calculates the parallax component and the unnecessary component included in the image of FIG. 10 (B-1) as a negative value, but this negative value is discarded from the image of FIG. 10 (A-2) to simplify unnecessary component reducing process performed at the latter step. Therefore, the difference image of FIG. 10 (A-2) illustrates only the parallax component included in the image of FIG. 10 (A-1). Similarly, FIG. 10 (B-2) illustrates an image obtained by subtracting the image of FIG. 10 (A-1) in the pair of parallax images from the image of FIG. 10 (B-1) in the pair as a reference image.

Similarly to the image of FIG. 10 (A-2), the difference calculation described above calculates the parallax component included in the image of FIG. 10 (A-1) as a negative value, but this negative value is discarded from the image of FIG. 10 (B-2) to simplify unnecessary component reducing process at the latter step. Therefore, the difference image of FIG. 10 (B-2) illustrates the unnecessary component and the parallax component included in the image of FIG. 10 (B-1). Thus, leaving only the parallax component and the unnecessary component in the difference image (in other words, separating or extracting the parallax component and the unnecessary component), the parallax component and the unnecessary component can be determined. In this embodiment, the relative difference images (relative difference information) of the parallax images illustrated in FIG. 10 (A-2) and FIG. 10 (B-2) are defined as first unnecessary components. In this state, although the unnecessary component (ghost) can be extracted, the parallax component also exists. Therefore, it is necessary to separate the parallax component and the unnecessary component.

Next, a method of separating the parallax component and the unnecessary component (ghost component) will be described. The first unnecessary component contains the mixture of the parallax component and the unnecessary component described above. FIG. 10 (A-3) and FIG. 10 (B-3) are images (first unnecessary component removed image) obtained by subtracting the first unnecessary components illustrated in FIG. 10 (A-2) and FIG. 10 (B-2) from the parallax images described above, i.e. an image obtained by removing or reducing the first unnecessary component from the parallax images. As an example, FIG. 10 (C) is an image (synthesis image) obtained by performing an average process on the first unnecessary component removed image illustrated in FIG. 10 (A-3) and FIG. 10 (B-3) and synthesizing them. In the synthesis image illustrated in FIG. 10 (C), the ghost as an unnecessary component is removed, but the parallax component is removed at the same time, and the blurred portion of the object Y is removed. The blur in a photograph is an important factor as an image expression, and accordingly the image (output image) in which the blur is removed is undesirable.

Next, FIG. 11 (A-4) and FIG. 11 (B-4) are blur added images obtained by adding the blur to the first unnecessary component removed images (images of FIG. 10 (A-3) and FIG. 10 (B-3)). FIG. 11 (A-5) and FIG. 11 (B-5) are masks (mask images) obtained by subtracting the first unnecessary component removed images from the blur added images (images of FIG. 11 (A-4) and FIG. 11 (B-4)) and performing a binarizing process. As can be seen in FIG. 11 (A-4) and FIG. 11 (B-4), adding the blur, edge portions of the objects are blurred and accordingly a luminance gradient occurs near the edge portions. Therefore, as described above, subtracting the first unnecessary component removed image from the blur added image, only luminance gradient portions are extracted as illustrated in FIG. 11 (A-5) and FIG. 11 (B-5). In other words, only regions near the edge portions of the objects are extracted. In this case, the parallax component descried above occurs only in the region near the edge portion of the object, and therefore, extracting the region near the edge portion of the object, a region in which the parallax component is contained can be specified. FIG. 11 (A-6) and FIG. 11 (B-6) are second unnecessary components obtained by removing the parallax components from the first unnecessary components illustrated in FIG. 10 (A-2) and FIG. 10 (B-2) by using the masks to extract only the unnecessary component. The parallax component and the unnecessary component (ghost) can be separated through such a procedure.

Then, for an image to be output, a correction process is performed to remove or reduce the unnecessary component determined as described above. Accordingly, as illustrated in FIG. 11 (A-7) and FIG. 11 (B-7), this can generate the parallax images in which the unnecessary components substantially disappear. Furthermore, synthesizing the parallax images with the reduced unnecessary components can generate the image with a reduced unnecessary component that is equivalent to a shot image generated through image pickup without the pupil division as illustrated in FIG. 1B.

Figure 12:
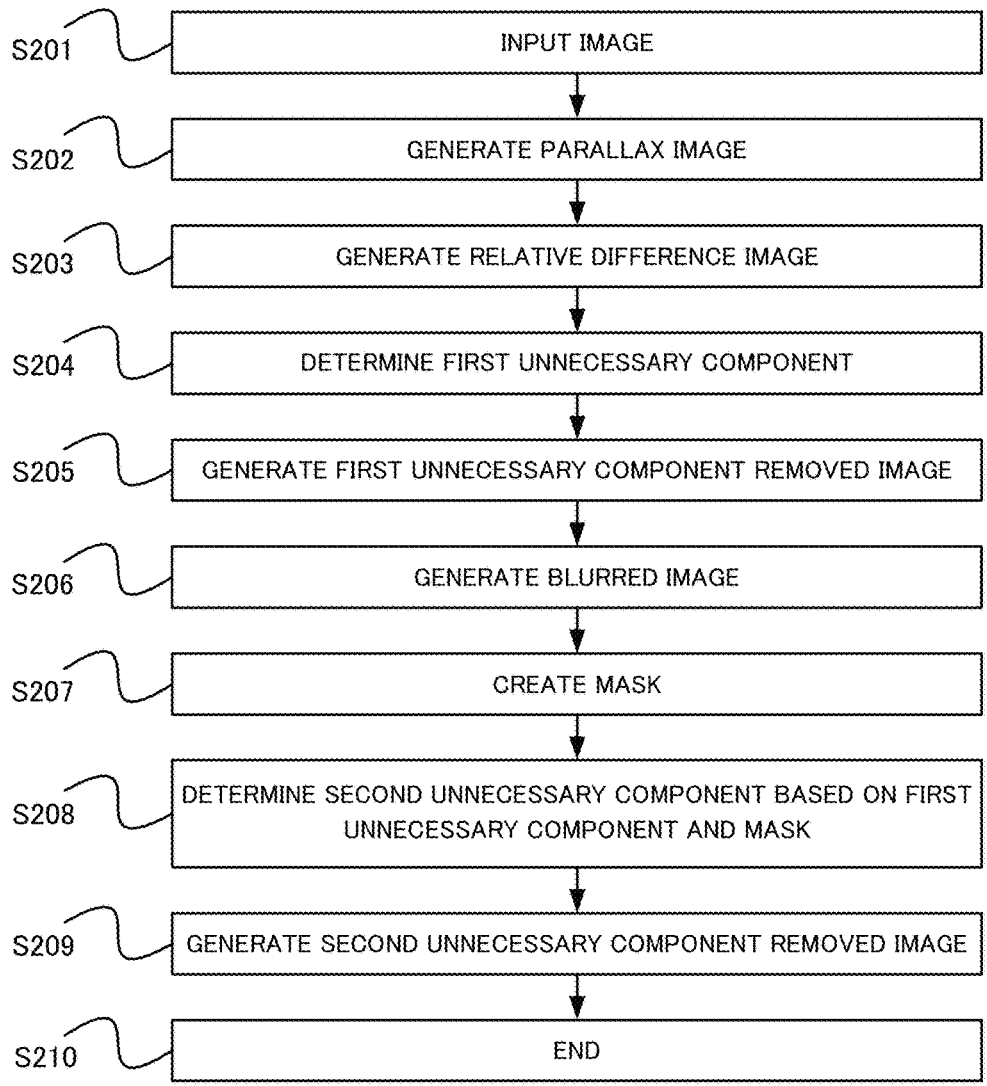
FIG. 12 illustrates a flowchart of the image processing method in Embodiment 2.

Next, referring to FIG. 12, a procedure of determination process (image processing) of any unnecessary component (ghost component) in this embodiment will be described. FIG. 12 illustrates a flowchart of the image processing method (method of determining the unnecessary component) in this embodiment. Each step in FIG. 12 is executed mainly by the system controller 210 or the image processor 204 in accordance with an image processing program as a computer program.

In FIG. 12, steps S201 to S204 are respectively the same as steps S101 to S104 in Embodiment 1 described referring to FIG. 9, and thus descriptions thereof will be omitted.

Subsequently, at step S205, the unnecessary component reducing unit 204c performs a correction process to reduce or remove the first unnecessary component corresponding to each of the parallax images to generate the first unnecessary component removed images (images illustrated in FIG. 10 (A-3) and FIG. 10 (B-3)). In this case, discarding negative values to be zero at step S203, only the first unnecessary components are detected as positive values and thus the unnecessary components can be removed by simply subtracting the first unnecessary components from the parallax images.

Subsequently, at step S206, the blur adding unit 204d adds blurs to the first unnecessary component reduced images to generate blurred images (images of FIG. 11 (A-4) and FIG. 11 (B-4)). Specifically, the blur adding unit 204d performs a filtering process by using a filter having a blurring effect for the first unnecessary component removed images.

Subsequently, at step S207, the mask creating unit 204e generates the masks (mask images) illustrated in FIG. 11 (A-5) and FIG. 11 (B-5) based on difference information of the blurred images generated at step S206 and the first unnecessary component removed images. Specifically, the mask creating unit 204e subtracts the first unnecessary component removed images from the blur added images and performs a binarizing process to create the masks.

Subsequently, at step S208, the second unnecessary component detecting unit 204f determines the second unnecessary components (images of FIG. 11 (A-6) and FIG. 11 (B-6)) based on the first unnecessary components and the masks. Specifically, the second unnecessary component detecting unit 204f performs a masking process for the first unnecessary components by using the respective masks described above. Accordingly, only the parallax components can be removed from the mixture (mixed image) of the parallax component and the unnecessary component (ghost).

Subsequently, at step S209, the unnecessary component reducing unit 204c performs a correction process to reduce or remove the second unnecessary components from images to be output. In this embodiment, the image processor 204 generates, as images to be output, parallax images, which are illustrated in FIG. 11 (A-7) and FIG. 11 (B-7), obtained by treating the pixels G1 and G2 as one pixel. In this case, discarding the negative values to be zero at step S203, only the unnecessary components contained in the parallax images are detected as positive values. Therefore, the unnecessary components can be removed by simply subtracting the second unnecessary components from the respective parallax images. In this embodiment, step S209 corresponds to subtracting the second unnecessary component of FIG. 11 (A-6) from the parallax image of FIG. 10 (A-1), and subtracting the second unnecessary component of FIG. 11 (B-6) from the parallax image of FIG. 10 (B-1). Finally, at step S210, the system controller 210 stores the output images in which the unnecessary components are removed or reduced in the image recording medium 209 or displays the output images on the display unit 205.

According to this embodiment, an unnecessary component (ghost component) formed by unnecessary light can be determined from a plurality of relative difference images based on a plurality of parallax images obtained by image pickup once. In other words, the unnecessary component contained in a shot image can be determined without performing image pickup a plurality of times. Furthermore, since negative values are discarded in generating the relative difference images, a high-quality shot image in which the unnecessary component determined only by a simple difference calculation is appropriately removed or reduced can be obtained.

Embodiment 3

Next, Embodiment 3 (multiple pupil division) of the present invention will be described. An image pickup apparatus in this embodiment has the same basic configuration as that of the image pickup apparatus 200 in Embodiment 1 described referring to FIG. 6, and thus a description thereof will be omitted.

FIG. 13 illustrates a light-receiving portion of an image pickup element 202a in this embodiment. In FIG. 13, ML denotes a micro lens. G11, G12, G13, and G14 are a group of pixels (light-receiving portions). The image pickup element 202a includes an array of a plurality of pixel groups each including the pixels G11, G12, G13, and G14, and each pixel group has a conjugate relation with an exit pupil EXP via the micro lens ML that is common or shared (in other words, provided for each pixel group). In this embodiment, a plurality of pixels G11 arrayed in the image pickup element 202a are collectively referred to as a pixel unit G11. Similarly, sets of a plurality of pixels G12, G13, and G14 arrayed in the image pickup element 202a are collectively referred to as pixel units G12, G13, and G14, respectively. A specific exemplary configuration of the optical system 201 is the same as that in Embodiment 1 described referring to FIGS. 7A and 7B, and thus a description thereof will be omitted.

FIG. 14 is an explanatory diagram of unnecessary light passing through an aperture stop STP of the optical system 201. FIG. 14 illustrates regions (pupil regions or pupil division regions) P1, P2, P3, and P4 of the aperture stop STP through which light beams incident on the pixels G11, G12, G13, and G14 illustrated in FIG. 13 pass. The aperture stop STP may be assumed to be equivalent to the exit pupil EXP of the optical system 201, but in practice, the aperture stop STP and the exit pupil EXP are usually different from each other. Light beams from a high luminance object pass through substantially the entire range of the aperture stop STP, and a region through which the light beams incident on the pixels pass is divided into the regions P1, P2, P3, and P4.

Subsequently, referring to FIGS. 15A and 15B to FIGS. 17A to 17E, a method of determining an unnecessary component as an image component that appears through a photoelectric conversion of unnecessary light in a shot image generated by the image pickup apparatus 200 will be described.

FIGS. 15A and 15B illustrate exemplary output images obtained by the image processing method in this embodiment. FIG. 15A illustrates a shot image obtained by synthesizing the plurality of parallax images generated through image pickup with the pupil division. This shot image includes two objects (objects X and Y) and a ghost that occurs by a light source (not illustrated). The shot image of FIG. 15A is an example in a state where it focuses on the star-shaped object X (in-focus object) and the round-shaped object Y (out-of-focus object) is blurred. The ghost component GST illustrated as a square shape in the shot image is an unnecessary component as an image component corresponding to unnecessary light (ghost). An unnecessary component corresponds to unnecessary light on a shot object, and thus has luminance higher than that of the shot object. This is true also in other embodiments described below.

Figure 16:
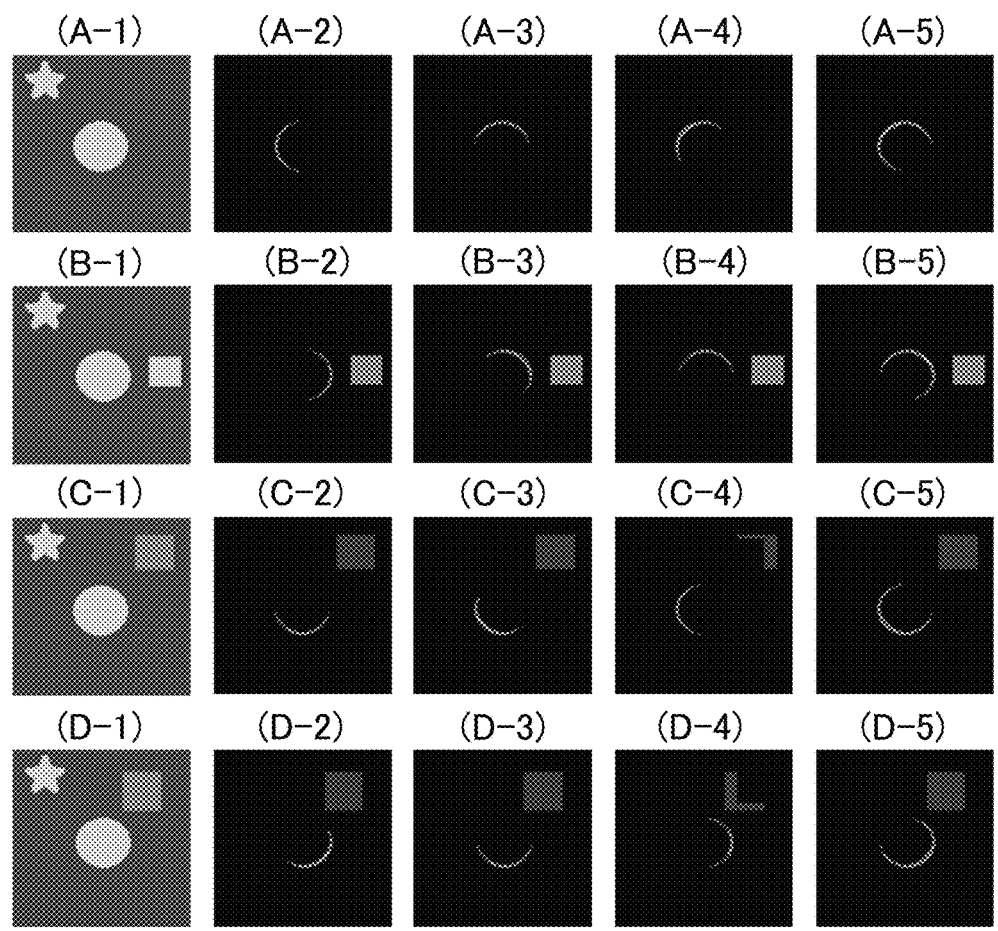
FIG. 16 illustrates a procedure of the image processing method in Embodiment 3.

FIGS. 16 and 17A to 17E illustrate a procedure of the image processing method in this embodiment. FIG. 16 (A-1), FIG. 16 (B-1), FIG. 16 (C-1) and FIG. 16 (D-1) respectively illustrate a pair of parallax images obtained by performing, at the pixel groups G11, G12, G13, and G14, a photoelectric conversion on light beams passing through the regions (pupil regions) P1, P2, P3, and P4. The pair of parallax images may contain unnecessary components (ghost component GST) schematically illustrated as a square. In FIG. 16 (C-1) and FIG. 16 (D-1), positions of the unnecessary components partially overlap with each other. In FIG. 16 (B-1), 16 (C-1), and FIG. 16 (D-1), positions of the unnecessary components are different from each other. In FIG. 16 (A-1), the unnecessary component (ghost component GST) does not occur.

FIG. 16 (A-2) illustrates a relative difference image obtained by subtracting the image of FIG. 16 (B-1) in the pair of parallax images from the image of FIG. 16 (A-1) in the pair as a reference image. Similarly to Embodiment, 1 this image includes, as relative difference information, a parallax component of the object and an unnecessary component described above. Similarly to Embodiment, 1 the difference calculation described above calculates the unnecessary component included in the image of FIG. 16 (B-1) as a negative value, but this negative value is discarded from the image of FIG. 16 (A-2) to simplify unnecessary component reducing process performed at the latter step. This is true also in all the relative difference images described below. FIG. 16 (A-3) illustrates a relative difference image obtained by subtracting the image of FIG. 16 (C-1) in the pair of parallax images from the image of FIG. 16 (A-1) in the pair as a reference image. FIG. 16 (A-4) illustrates a relative difference image obtained by subtracting the image of FIG. 16 (D-1) in the pair of parallax images from the image of FIG. 16 (A-1) in the pair as a reference image. In FIG. 16 (A-1), the unnecessary component (ghost component GST) does not occur. Therefore, FIG. 16 (A-2), FIG. 16 (A-3), and FIG. 16 (A-4) illustrate only the parallax component contained in FIG. 16 (A-1).

FIG. 16 (A-5) is image information (relative difference maximum value information) obtained by extracting the maximum value of the relative difference information at each pixel position in the relative difference images of FIG. 16 (A-2), FIG. 16 (A-3), and FIG. 16 (A-4) that are relative difference information acquired as two-dimensional data. In this embodiment, the image information is a position and an amount of the parallax component contained in FIG. 16 (A-1).

Similarly, FIG. 16 (B-2) illustrates a relative difference image obtained by subtracting the image of FIG. 16 (A-1) in the pair of parallax images from the image of FIG. 16 (B-1) in the pair as a reference image. FIG. 16 (B-3) illustrates a relative difference image obtained by subtracting the image of FIG. 16 (C-1) in the pair of parallax images from the image of FIG. 16 (B-1) in the pair as a reference image. FIG. 16 (B-4) illustrates a relative difference image obtained by subtracting the image of FIG. 16 (D-1) in the pair of parallax images from the image of FIG. 16 (B-1) in the pair as a reference image. FIG. 16 (B-5) is image information (relative difference maximum value information) obtained by extracting the maximum value of the relative difference information at each pixel position in the relative difference images of FIG. 16 (B-2), FIG. 16 (B-3), and FIG. 16 (B-4) that are relative difference information acquired as two-dimensional data. In this embodiment, the image information is a position and an amount of the parallax component contained in FIG. 16 (B-1).

Similarly, FIG. 16 (C-2) illustrates a relative difference image obtained by subtracting the image of FIG. 16 (A-1) in the pair of parallax images from the image of FIG. 16 (C-1) in the pair as a reference image. FIG. 16 (C-3) illustrates a relative difference image obtained by subtracting the image of FIG. 16 (B-1) in the pair of parallax images from the image of FIG. 16 (C-1) in the pair as a reference image. FIG. 16 (C-4) illustrates a relative difference image obtained by subtracting the image of FIG. 16 (D-1) in the pair of parallax images from the image of FIG. 16 (C-1) in the pair as a reference image. As described above, in FIG. 16 (C-1) and FIG. 16 (D-1), positions of the unnecessary components partially overlap with each other, and therefore the unnecessary component contained in the relative difference information is not partially detected. Thus, the unnecessary components occurring at the same position does not appear in the relative difference images. In other words, there is an undetected unnecessary component by using only the difference information between two images.

However, for example, if the unnecessary component in at least one parallax image occurs at a position different from that in the reference image as illustrated in FIG. 16 (B-1) by acquiring the relative difference information of the plurality of parallax images in this embodiment, the unnecessary component can be effectively detected. FIG. 16 (C-5) is image information (relative difference maximum value information) obtained by extracting the maximum value of the relative difference information at each pixel position in the relative difference images of FIG. 16 (C-2), FIG. 16 (C-3), and FIG. 16 (C-4) that are relative difference information acquired as two-dimensional data. In this embodiment, the image information is a position and an amount of the parallax component contained in FIG. 16 (C-1).

Similarly, FIG. 16 (D-2) illustrates a relative difference image obtained by subtracting the image of FIG. 16 (A-1) in the pair of parallax images from the image of FIG. 16 (D-1) in the pair as a reference image. FIG. 16 (D-3) illustrates a relative difference image obtained by subtracting the image of FIG. 16 (B-1) in the pair of parallax images from the image of FIG. 16 (D-1) in the pair as a reference image. FIG. 16 (D-4) illustrates a relative difference image obtained by subtracting the image of FIG. 16 (C-1) in the pair of parallax images from the image of FIG. 16 (D-1) in the pair as a reference image. FIG. 16 (D-5) is image information (relative difference maximum value information) obtained by extracting the maximum value of the relative difference information at each pixel position in the relative difference images of FIG. 16 (D-2), FIG. 16 (D-3), and FIG. 16 (D-4) that are relative difference information acquired as two-dimensional data. In this embodiment, the image information is a position and an amount of the parallax component contained in FIG. 16 (D-1).

In this embodiment, it is assumed that a shot image obtained by averagely synthesizing the parallax images generated through image pickup with the pupil division illustrated in FIG. 15A is output as an output image. In this case, since the unnecessary component is extracted for each parallax image as described above, a method in which the unnecessary component is reduced by subtracting each unnecessary component extracted from each parallax image can be applied. However, it needs to perform a reducing process of the unnecessary component for each of the parallax images, and thus the reducing process is complicated compared to a case where one averaged image of the parallax images is output as an image. Therefore, in this embodiment, a synthesizing process is performed on the unnecessary components of the parallax images described above with the same process in accordance with the synthesizing process of the parallax images for an output image. In this embodiment, since an image obtained by averaging the parallax images is output as a finally output image, an average value of the unnecessary components of the parallax images is calculated to perform the synthesizing process.

Figure 17A:
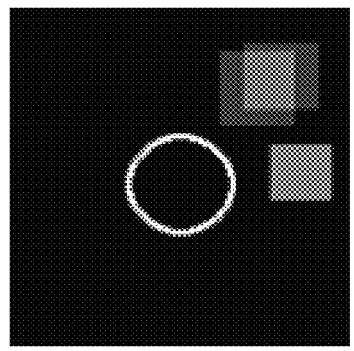
FIGS. 17A to 17E illustrate a procedure of the image processing method in Embodiment 3.

FIG. 17A illustrates an unnecessary component which are averagely synthesized. When the output image is output as an average value of the parallax images, the unnecessary component contained in the output image coincides with an average value of the unnecessary components contained in the parallax images. In this embodiment, the average value of the relative difference image (relative difference information) of the parallax images illustrated in FIG. 17A is defined as a first unnecessary component. The first unnecessary component contains the mixture of the unnecessary component and the parallax component described above.

Figure 17B:
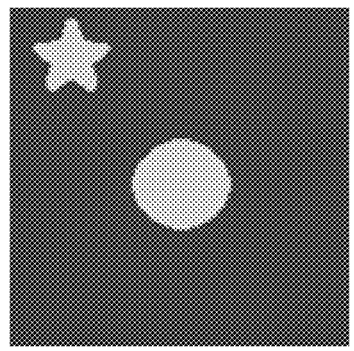

FIG. 17B is an image (first unnecessary component removed image) obtained by subtracting the first unnecessary component (image of FIG. 17A) from the shot image (image of FIG. 15A) obtained by synthesizing the plurality of parallax images described above, i.e. an image obtained by removing or reducing the first unnecessary component from the image of FIG. 15A. In the image illustrated in FIG. 17B, the ghost component as an unnecessary component is removed, but the parallax component is removed at the same time and the blurred portion of the object Y is removed. The blur in a photograph is an important factor as an image expression, and accordingly the final image (output image) in which the blur is removed is undesirable.

Figure 17C:
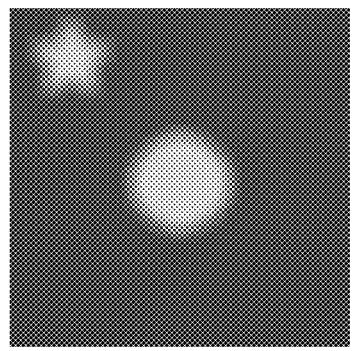
Figure 17D:
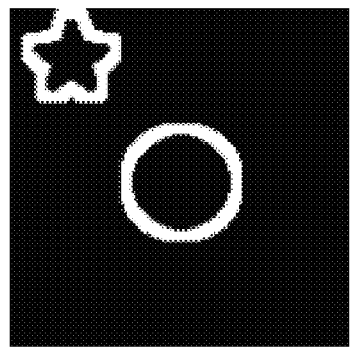

FIG. 17C is a blur added image obtained by adding the blur to the first unnecessary component removed image (image of FIG. 17B). FIG. 17D is a mask (mask image) obtained by subtracting the first unnecessary component removed image (image of FIG. 17B) from the blur added image (image of FIG. 17C) and performing a binarizing process. As can be seen in FIG. 17C, adding the blur, edge portions of the objects are blurred and accordingly a luminance gradient occurs near the edge portions. Therefore, as described above, subtracting the first unnecessary component removed image (image of FIG. 17B) from the blur added image (image of FIG. 17C), only luminance gradient portions are extracted as illustrated in FIG. 17D. In other words, only regions near the edge portions of the objects are extracted. Since the parallax component descried above occurs only in the region near the edge portion of the object, extracting the region near the edge portion of the object, a region in which the parallax component is contained can be specified.

Figure 17E:
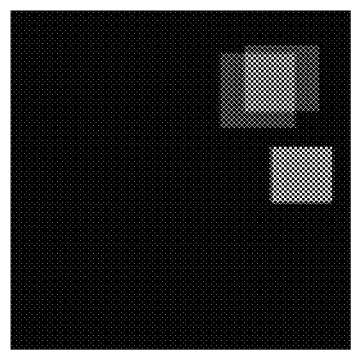

FIG. 17E is a second unnecessary component obtained by removing the parallax component from the first unnecessary component (image of FIG. 17A) by using the mask (image of FIG. 17D) to extract only the unnecessary component. In this embodiment, the parallax component and the unnecessary component (ghost component) can be separated through such a procedure.

In this embodiment, it is assumed to output a shot image, as an output image, obtained by synthesizing the plurality of parallax images, which are generated through image pickup with the pupil division illustrated in FIG. 15A. In this embodiment, an average image of the parallax images is output as a finally output image. In this case, the second unnecessary component illustrated in FIG. 17E is also an average value of the unnecessary components of the parallax images. Then, for an image to be output, a correction process is performed to remove or reduce the second unnecessary component. Accordingly, this can generate an image with a reduced unnecessary component that is equivalent to a shot image generated through image pickup without the pupil division as illustrated in FIG. 15B.

Figure 18:
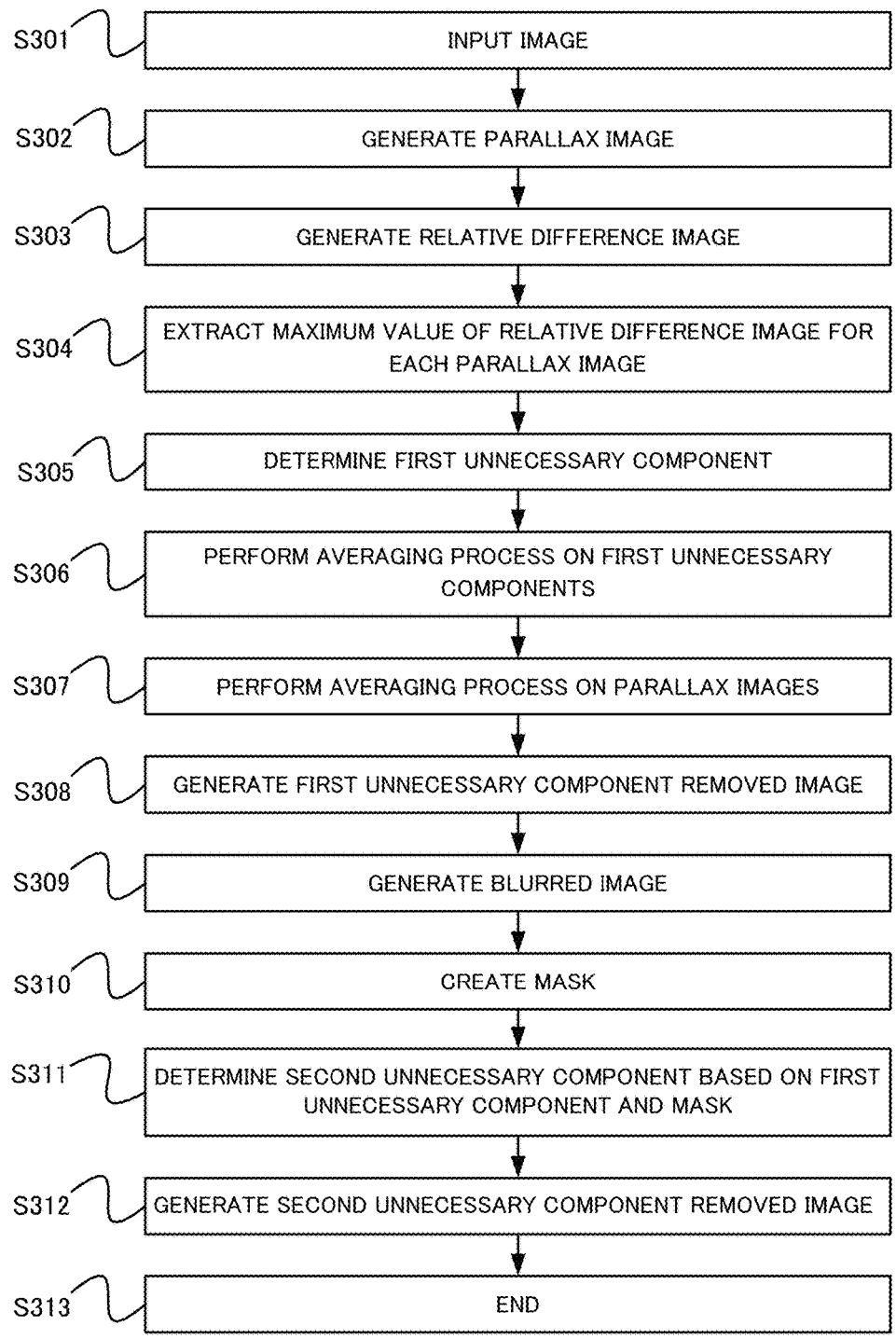
FIG. 18 illustrates a flowchart of the image processing method in Embodiment 3.

Next, referring to FIG. 18, a procedure of determination process (image processing) of any unnecessary component (ghost component) in this embodiment will be described. FIG. 18 illustrates a flowchart of the image processing method (method of determining the unnecessary component) in this embodiment. Each step in FIG. 18 is executed mainly by the system controller 210 or the image processor 204 in accordance with an image processing program as a computer program. In FIG. 18, steps S301 and S302 are the same as steps S101 and S102 respectively in Embodiment 1 described with reference to FIG. 9, and thus descriptions thereof will be omitted.

Subsequently, at step S303, the first unnecessary component detecting unit 204a of the image processor 204 obtains, for a pair of parallax images, a plurality of pieces of relative difference information by using each of the parallax images as a reference image. In other words, the first unnecessary component detecting unit 204a generates the relative difference images (images of FIG. 16 (A-2), FIG. 16 (A-3), and FIG. 16 (A-4) by using the image of FIG. 16 (A-1) as a reference image. The first unnecessary component detecting unit 204a also generates the relative difference images (images of FIG. 16 (B-2), FIG. 16 (B-3), and FIG. 16 (B-4) by using the image of FIG. (B-1) as a reference image. The first unnecessary component detecting unit 204a also generates the relative difference images (images of FIG. 16 (C-2), FIG. 16 (C-3), and FIG. 16 (C-4) by using the image of FIG. 16 (C-1) as a reference image. The first unnecessary component detecting unit 204a also generates the relative difference images (images of FIG. 16 (D-2), FIG. 16 (D-3), and FIG. 16 (D-4) by using the image of FIG. 16 (D-1) as a reference image.

When unnecessary lights reaching an imaging plane pass through pupil regions of the optical system 201 that are different from each other, the positions of occurrence of the unnecessary component are different for each parallax image as illustrated in FIG. 16 (B-1) and FIG. 16 (C-1). Therefore, in a simple relative difference image, a difference value of both the unnecessary components indicates positive and negative values. In this embodiment, for the sake of simplifying a process of reducing the unnecessary component described below, the negative values are discarded to zero. Therefore, only the parallax component and the unnecessary component are detected as positive values. On the other hand, when the unnecessary components partially overlap with each other at the same position as illustrated in FIG. 16 (C-1) and FIG. 16 (D-2), the partial unnecessary components are not detected in the relative difference information as described above. In order to reduce a detection error caused by a luminance unevenness of the parallax images, a luminance correcting step such as a shading correction may be added.

Subsequently, at step S304, the first unnecessary component detecting unit 204a extracts the maximum value of the relative difference information at each pixel position in the relative difference image obtained by using each parallax image generated at step S303 as a reference image. An effect of extracting the maximum value of the plurality of pieces of relative difference information will be described. In the images of FIG. 16 (C-1) and FIG. 16 (D-1) as described in this embodiment, the unnecessary components partially overlap with each other at the same position. Thus, the unnecessary components may occur at the same position in the parallax images depending on the optical system or the position of a high luminance light source. In this case, when the difference between two images is calculated, the unnecessary component becomes zero. In other words, there are undetectable unnecessary components by using only the difference information of the two images. Therefore, in this embodiment, acquiring relative difference information of the plurality of parallax images, the unnecessary component can be effectively detected as illustrated in FIG. 16 (C-3) when the unnecessary component occurs at a position different from that in the reference image even in one parallax image as illustrated in FIG. 16 (B-1). As described above, acquiring the plurality of pieces of relative difference information and extracting the relative difference maximum value information of the plurality of pieces of relative difference information, the position and the amount of the unnecessary component can be surely detected if there is an image containing the unnecessary component at a position different from that in the other parallax images.

Then, at step S305, the first unnecessary component detecting unit 204a determines a component remaining in the relative difference maximum value image extracted at step S304 as a first unnecessary component. In order to remove the influence of a noise or the like, a step of a noise reducing process, a threshold process, or the like may be added.

Subsequently, at step S306, the synthesizing unit 204b of the image processor 204 performs an averaging process on the relative difference maximum value information as the first unnecessary components of the parallax images obtained at step S305. Specifically, the synthesizing unit 204b performs the averaging process of the relative difference maximum value information of FIG. 16 (A-5), FIG. 16 (B-5), FIG. 16 (C-5), and FIG. 16 (D-5) to generate the averaged first unnecessary component (image of FIG. 17A).

Then, at step S307, the synthesizing unit 204b performs an averaging process on the parallax images to output an image that is equivalent to a shot image generated through image pickup without the pupil division. Specifically, the synthesizing unit 204b performs the averaging calculation of the parallax images of FIG. 16 (A-1), FIG. 16 (B-1), FIG. 16 (C-1), and FIG. 16 (D-1) generated at step S302 to generate an averaged synthesis image (image of FIG. 15A). Alternatively, the synthesizing unit 204b may generate the synthesis image by calculating an average value of the digital signals output from the image pickup element 202 (pixel groups G11 to G14) and obtained by performing A/D conversion by the A/D convertor 203 without performing the step of generating the parallax images.

Subsequently, at step S308, the unnecessary component reducing unit 204c of the image processor 204 performs a correction process of removing or reducing the averaged first unnecessary component from the averaged parallax image to generate a first unnecessary component removed image (image of FIG. 17B). In this case, since the negative values are discarded to be zero at step S303, only the first unnecessary component is detected as positive values. Therefore, simply subtracting the averaged first unnecessary component (image of FIG. 17A) from the synthesis image (image of FIG. 15A), the unnecessary component reducing unit 204c is capable of removing the first unnecessary component.

Subsequently, at step S309, the blur adding unit 204d of the image processor 204 adds blur to the first unnecessary component removed image to generate a blurred image (image of FIG. 17C). Specifically, the blur adding unit 204d performs a filtering process by using a filter having a blurring effect for the first unnecessary component removed image. In this embodiment, a Gaussian filter which can adjust a blur amount is used. In this embodiment, a filter coefficient as a blur amount is set by using the standard deviation of Gaussian distribution to be sufficiently large compared to the parallax component. Instead, the blur amount can also be determined by referring the image shooting condition such as a focal length and an aperture value Fno of the optical system 201 obtained from the state detector 207. Since a parallax difference amount (corresponding to a region size of the parallax component) of the object varies depending on the focal length or the aperture value Fno of the optical system 201, referring to the image shooting condition, an optimum blur amount can be determined and the size of the filter can be reduced. In this embodiment, the blur amount is constant over the entire region of the image, but it is preferred that the blur amount changes depending on a distance for each object if the object distance information is known. Since the parallax difference amount of the object varies depending on the object distance, changing the blur amount depending on the distance for each object, an optimum blur amount can be determined for each object and the size of the filter can be reduced. Reducing the size of the filter, the process load of the blur adding process can be greatly reduced.

Subsequently, at step S310, the mask creating unit 204e of the image processor 204 generates a mask (image of FIG. 17D) based on difference information of the blurred image generated at step S309 and the first unnecessary component removed image generated at step S308. Specifically, the mask creating unit 204e subtracts the first unnecessary component removed image from the blur added image and performs a binarizing process to create the mask (mask image). In this embodiment, the mask described above is used as it is, and a mask region can be enlarged by adding the blur to the mask by the blur adding unit 204d. Enlarging the mask region, the parallax component can be surely masked even in a state where the object is greatly blurred. In order to remove the influence of a noise or the like, a step of a noise reducing process, a threshold process, or the like may be added.

Subsequently, at step S311, the second unnecessary component detecting unit 204f of the image processor 204 determines a second unnecessary component (image of FIG. 17E) based on the first unnecessary component and the mask. Specifically, the second unnecessary component detecting unit 204f performs a masking process for the first unnecessary component by using the mask described above. Accordingly, only the parallax components can be removed from the mixture (mixed image) of the parallax component and the unnecessary component (ghost component).

Subsequently, at step S312, the unnecessary component reducing unit 204c performs a correction process to reduce or remove the second unnecessary component from an image to be output. In this embodiment, the image processor 204 generates, as an image to be output, an image equivalent to the shot image, which is illustrated in FIG. 15B, generated through image pickup without the pupil division. In this case, since only the unnecessary component is detected as positive values by discarding the negative values to be zero at step S303. Therefore, the unnecessary component can be removed by simply subtracting the second unnecessary component (image of FIG. 17E) from the synthesis image (image of FIG. 15A). Finally, at step S313, the system controller 210 stores, as illustrated in FIG. 15B, an output image in which the unnecessary component is removed or reduced in the image recording medium 209 or displays the output image on the display unit 205.

According to this embodiment, an unnecessary component formed by unnecessary light (ghost) can be determined from a plurality of relative difference images based on a plurality of parallax images obtained by image pickup once. In other words, the unnecessary component contained in a shot image can be determined without performing image pickup a plurality of times. Furthermore, since negative values are discarded in generating the relative difference images, a high-quality shot image in which the unnecessary component determined only by a simple difference calculation is appropriately removed or reduced can be obtained. In addition, calculating a plurality of pieces of relative difference information to calculate relative difference maximum value information obtained by extracting the maximum value of the relative difference information, the unnecessary component can be effectively detected and reduced even when the positions of the unnecessary components in the plurality of parallax images overlap with each other. Furthermore, since the unnecessary components contained in the image obtained by synthesizing the parallax images are generated as a set of data by performing the synthesis process of the unnecessary components, the process of reducing the unnecessary component can be performed by one difference calculation and thus the process of reducing the unnecessary component can be simplified.

Embodiment 4

Next, Embodiment 4 of the present invention will be described. Ren. Ng et al., "Light Field Photography with a Hand-held Plenoptic Camera" (Stanford Tech Report CTSR 2005-2) discloses a "plenoptic camera". The "plenoptic camera" can acquire information of the position and angle of a light beam from an object by using a technique called "light field photography".

Figure 19:
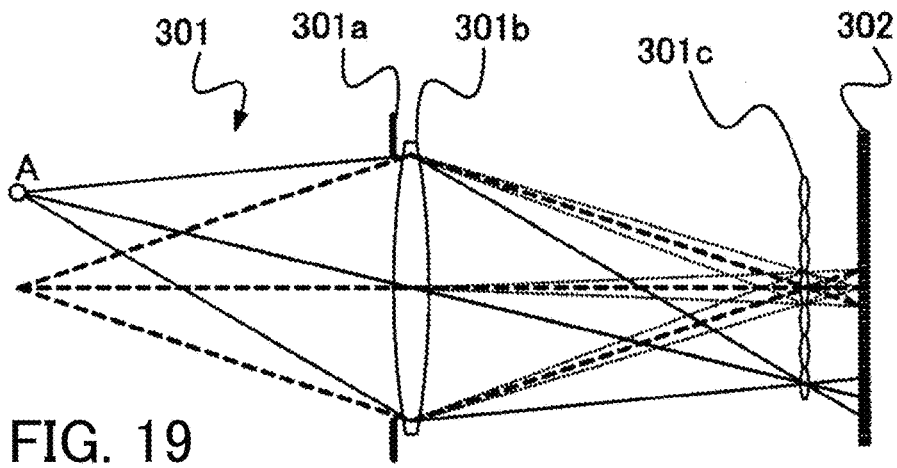
FIG. 19 illustrates a schematic diagram of an image pickup system in Embodiment 4.

FIG. 19 illustrates an image pickup system of an image pickup apparatus in this embodiment, and illustrates a configuration of the image pickup system of the "plenoptic camera". An optical system 301 (image pickup optical system) includes a primary lens (image pickup lens) 301b and an aperture stop 301a. A micro lens array 301c is disposed at an imaging position of the optical system 301, and an image pickup element 302 is disposed behind (closer to an image than) the micro lens array 301c. The micro lens array 301c has a function as a separator (separating unit) that prevents a light beam passing through, for example, a point A in an object space from being mixed with a light beam passing through a point near the point A on the image pickup element 302. FIG. 19 illustrates that a top beam, a primary light beam, and a bottom beam from the point A are received by pixels different from each other. Thus, the light beams passing through the point A can be separately acquired depending on their angles.

Figure 20:
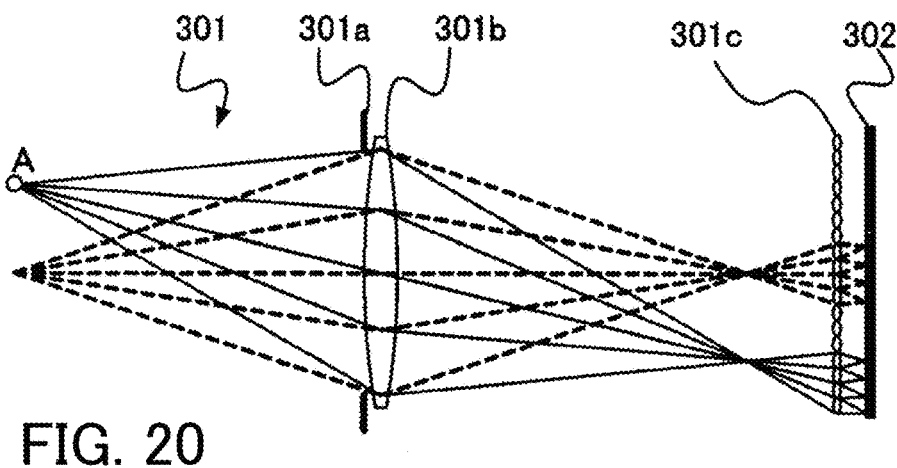
FIG. 20 illustrates a schematic diagram of an image pickup system in Embodiment 4.
Figure 21:
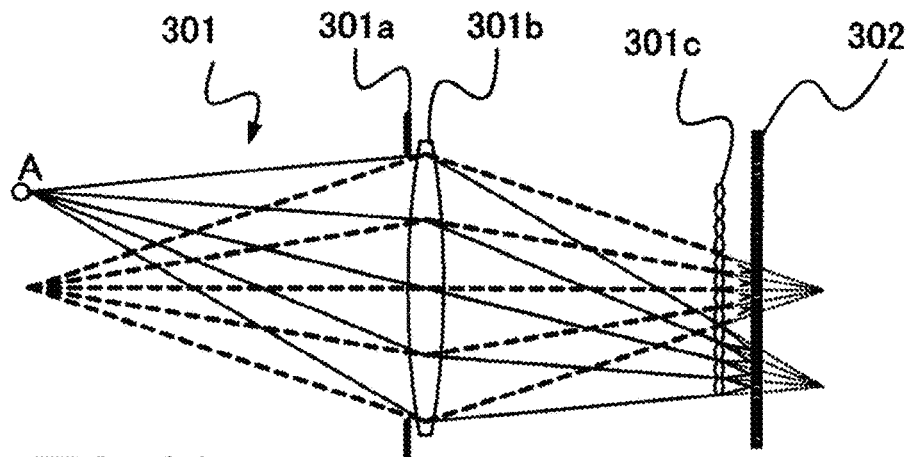
FIG. 21 illustrates a schematic diagram of an image pickup system in Embodiment 4.

Todor Georgive et al., "Full Resolution Light Field Rendering" (Adobe Technical Report January 2008) discloses configurations of an image pickup system illustrated in FIGS. 20 and 21 that acquire information (light field) of the position and angle of a light beam.

Figure 22:
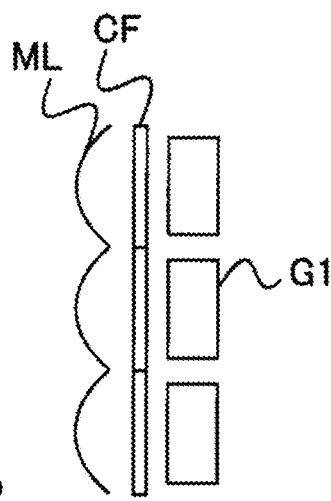
FIG. 22 illustrates a conventional image pickup element.

With the configuration of the image pickup system illustrated in FIG. 20, the micro lens array 301c is disposed behind (closer to an image than) the imaging position of the primary lens 301b to reimage the light beams passing through the point A on the image pickup element 302, thereby separately acquiring the light beams depending on their angles. With the configuration of the image pickup system illustrated in FIG. 21, the micro lens array 301c is disposed in front of (closer to an object than) the imaging position of the primary lens 301b to image the light beams passing through the point A on the image pickup element 302, thereby separately acquiring the light beams depending on their angles. In both configurations, light beams passing through a pupil of the optical system 301 are separated depending on passed regions (passed positions) in the pupil. In these configurations, the image pickup element 302 may employ a conventional image pickup element including one micro lens ML and one light-receiving portion G1 that are paired via a color filter CF as illustrated in FIG. 22.

Figure 23A:
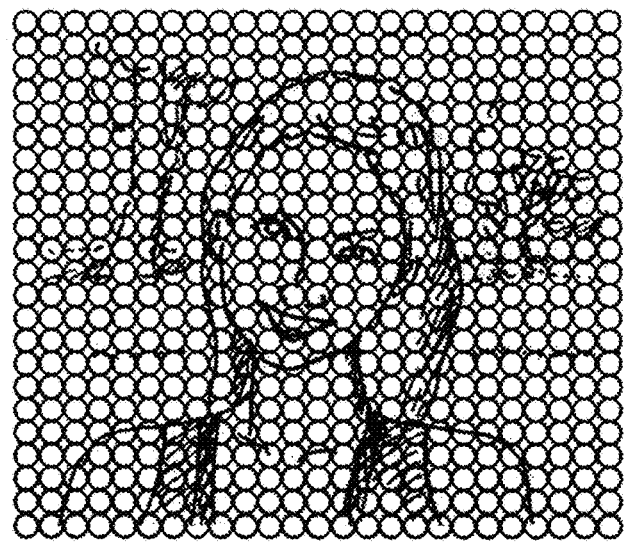
FIGS. 23A and 23B illustrate images obtained through the image pickup system in FIG. 19.
Figure 23B:
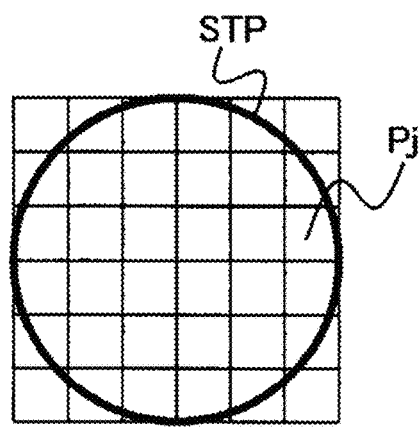
Figure 24:
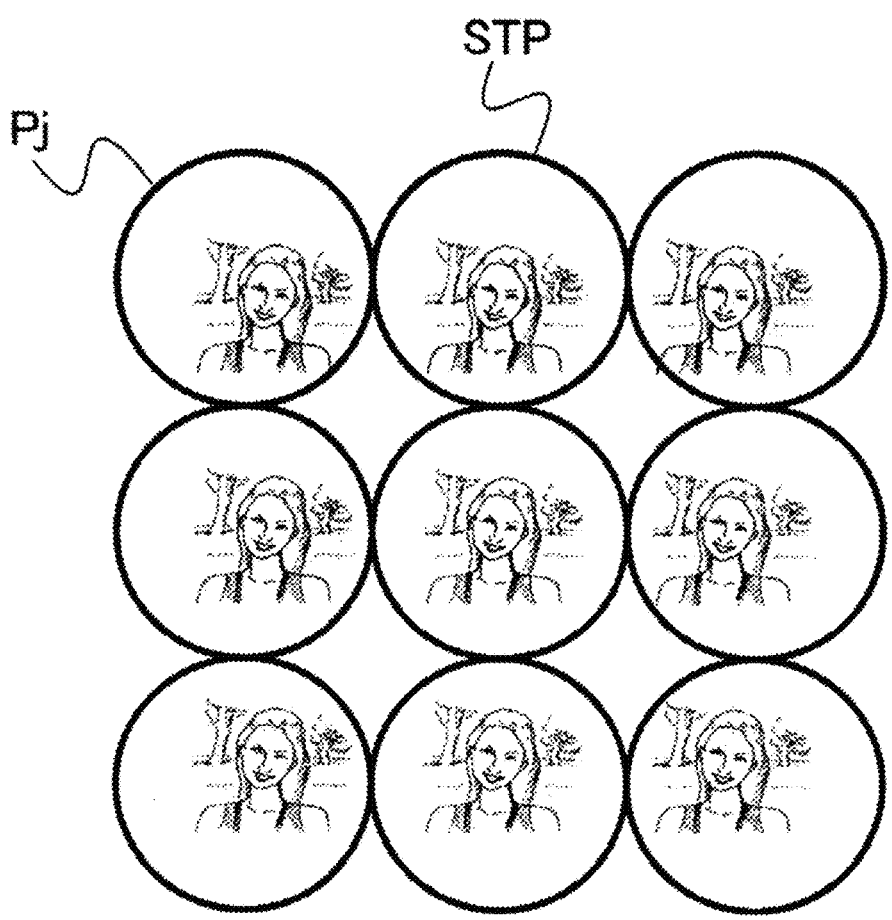
FIG. 24 illustrates an image obtained through the image pickup system in each of FIGS. 20 and 21.

The optical system 301 illustrated in FIG. 19 yields an image as illustrated in FIG. 23A. FIG. 23B is an enlarged view of one of arrayed circles in FIG. 23A. One circle represents the aperture stop STP, and an inside thereof is divided by a plurality of pixels Pj (j=1, 2, 3, . . . ). This configuration allows the intensity distribution of the pupil within one circle to be acquired. The optical system 301 illustrated in FIGS. 20 and 21 are used to obtain parallax images illustrated in FIG. 24. The parallax images as illustrated in FIG. 24 may be obtained by rearranging and reconstructing the pixels Pj in the circles (aperture stops STP) in an image illustrated in FIG. 23A.

As described in Embodiment 1 to 3, unnecessary light such as ghost passes through the pupil with biased distribution across the pupil. Thus, the image pickup apparatus in this embodiment that performs image pickup through divided regions of the pupil may employ the image processing methods described in Embodiment 1 to 3 to determine unnecessary components.

Figure 25:
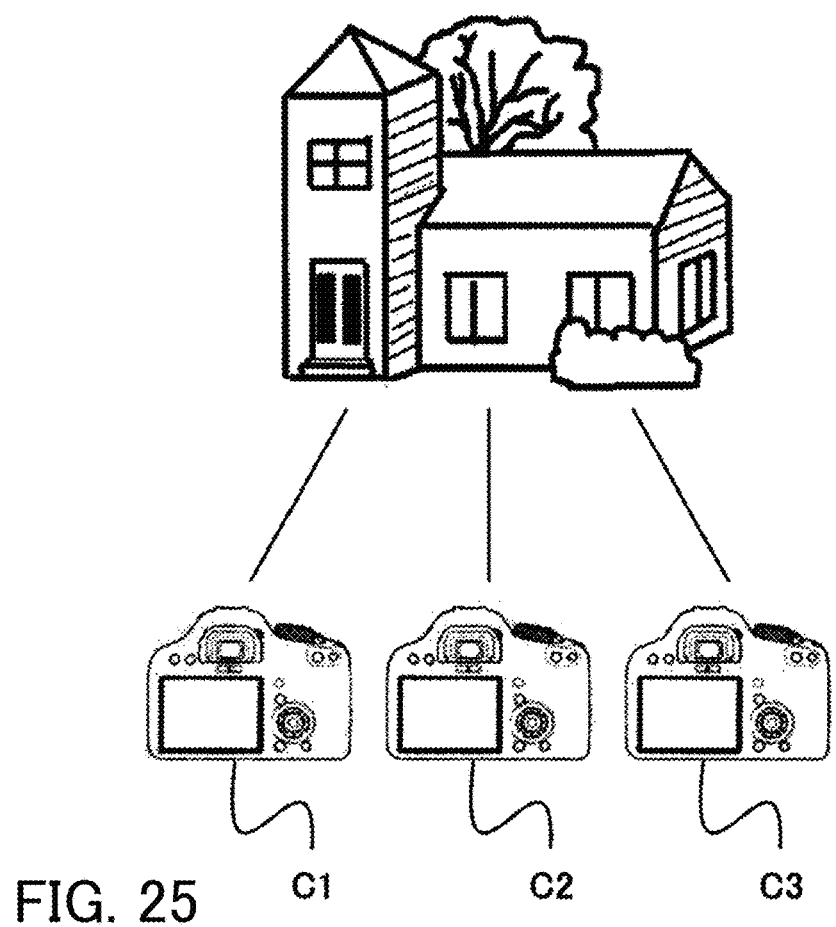
FIG. 25 illustrates an exemplary diagram of an image pickup apparatus in Embodiment 4.
Figure 26:
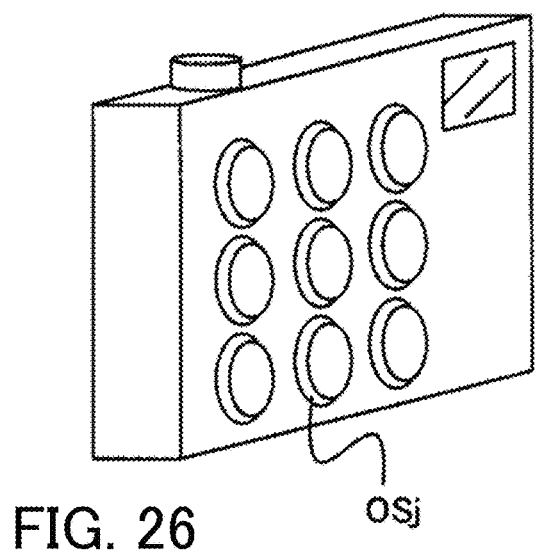
FIG. 26 illustrates an exemplary diagram of an image pickup apparatus in Embodiment 4.

In another example, parallax images are obtained by capturing images of an identical object through a plurality of cameras as illustrated in FIG. 25. Thus, these cameras may employ the image processing methods described in Embodiment 1 to 3. C1, C2, and C3 represent separate image pickup apparatuses, but they may be regarded as a single image pickup apparatus that performs image pickup through three divided regions of a large pupil. Alternatively, as illustrated in FIG. 26, the pupil division may be achieved by providing one image pickup apparatus with a plurality of optical systems OSj (j=1, 2, 3, . . . ). Each configuration in this embodiment can be similarly applied to that in each embodiment described below.

Embodiment 5

Next, Embodiment 5 of the present invention will be described. Each embodiment described above describes a case where the unnecessary component is determined and removed over the entire region of the image, but in many cases, the unnecessary component occurs in part of the image as illustrated in FIGS. 1A and 1B. Since it is easy for a user to determine an unnecessary component region in the image, the process load in each embodiment can be reduced by specifying an image region to perform the reducing process by the user. Limiting the region, the influence of the object parallax component generated in the photographing of a close-distance object described above can also be reduced. Synthesizing the unnecessary components to be handled as a set of data, it is easy to adjust a reduction amount of the unnecessary component multiplied by a weighting coefficient such as a parameter process.

Figure 27A:
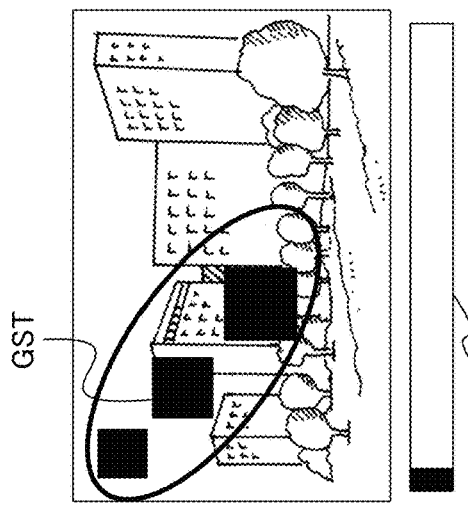
FIGS. 27A to 27C illustrate examples of selecting an unnecessary component reduction processing region and an unnecessary component reduction processing amount in Embodiment 5.
Figure 27B:
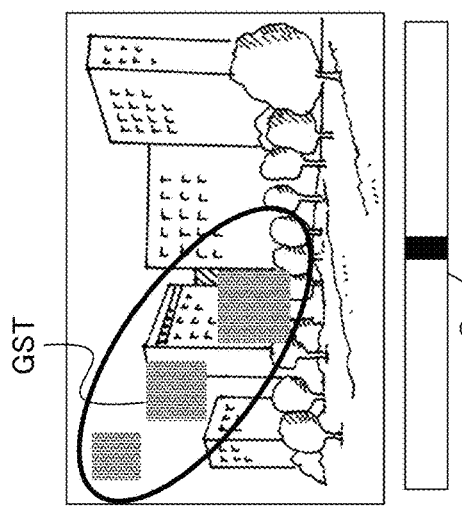
Figure 27C:
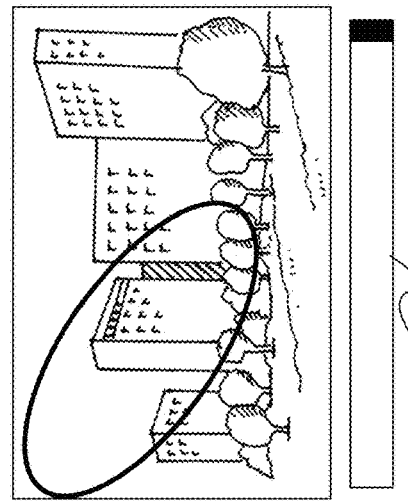

FIGS. 27A to 27C illustrate examples of selecting an unnecessary component reduction processing region and an unnecessary component reduction processing amount in this embodiment. Specifically, the user operates an operating unit such as a touch panel (not illustrated) to specify the unnecessary component region in an output image before the process of removing the unnecessary component as a range surrounded by a solid line illustrated in FIG. 27A.

Subsequently, the user specifies an elimination amount (reduction amount) within a range of an indicator 10 to adjust the elimination amount of the unnecessary components illustrated in FIGS. 27A to 27C. In this embodiment, the weighting coefficient to be applied to the unnecessary components becomes 0 (zero) at the left end of the indicator 10, and in this case, as illustrated in FIG. 27A, an image on which the process of removing the unnecessary components is not performed yet is generated. The weighting coefficient to be applied to the unnecessary components becomes 1 (one) at the right end of the indicator 10, and in this case, as illustrated in FIG. 27C, an image in which the unnecessary components are completely removed is generated. In the middle of the indicator 10, the weighting coefficient to be applied to the unnecessary components is between 0 and 1, and in this case, as illustrated in FIG. 27B, an image in which the unnecessary components are removed (i.e. reduced) by the weighting coefficient. In this embodiment, the maximum weighting coefficient to be applied to the unnecessary components is one, and one or more weighting coefficient can be applied to perform the reducing process not less than a detected unnecessary component amount if needed to remove further unnecessary components. Even when the region is limited as described above, the unnecessary component (ghost component) can be determined or removed based on the parallax images by using the same image processing method as that in each of Embodiments 1 to 3.

Each embodiment describes a case where the unnecessary component (second unnecessary component, or ghost component) is removed or reduced, but a correction process to add or emphasize other unnecessary components may be performed by using information on the determined unnecessary component (ghost component). For example, with respect to each of the plurality of parallax images illustrated in FIG. 24, there are an image which contains the unnecessary component (ghost component) and an image which does not contain the unnecessary component. If the unnecessary component (ghost component) is to remain in a reconstructed image, the determined unnecessary component (ghost component) may be added to each parallax images. The unnecessary component (ghost component) can also be added to the reconstructed image.

Each of the embodiments describes the image pickup apparatus that employs the image processing method of the present invention (is provided with the image processing apparatus), but the image processing method of the present invention may be performed by an image processing program installed in a personal computer. In this case, the personal computer corresponds to the image processing apparatus of the present invention. The personal computer takes in (acquires) an image (input image) generated by the image pickup apparatus and yet to be provided with image recovery processing, and outputs an image obtained by performing the image recovery processing by the image processing program.

Thus, in each of the embodiments (Embodiments 1 to 5), an image processing apparatus (image processor 204) includes a first unnecessary component determiner (first unnecessary component detecting unit 204a) and an image generator (unnecessary component reducing unit 204c). The image processing unit also includes a blurred image generator (blur adding unit 204d), a mask creator (mask creating unit 204e), and a second unnecessary component determiner (second unnecessary component detecting unit 204f). The first unnecessary component determiner determines a first unnecessary component contained in each of a plurality of parallax images based on a plurality of pieces of relative difference information of the parallax images (S104, S204, S305). The image generator generates a first image (first unnecessary component removed image) by reducing the first unnecessary component from the parallax images (S107, S205, S308). The blurred image generator generates a blurred image by adding blur to the first image (S108, S206, S309). The mask creator creates a mask based on the blurred image and the first image (S109, S207, S310). The second unnecessary component determiner determines a second unnecessary component based on the first unnecessary component and the mask (S110, S208, S312).

Preferably, an image pickup system (the optical system 201 and the image pickup element 202) and the image processor 204 obtains the parallax images by photographing (S101, S102, S202, S203, S301, S302). Preferably, the first unnecessary component determiner (first unnecessary component detecting unit 204a) sets each of the parallax images as a reference image and calculates a difference between a parallax image other than the reference image of the parallax images and the reference image to obtain the relative difference information (S103, S203, S303).

Preferably, the first unnecessary component determiner acquires, as two-dimensional data with any negative value (or a value not greater than a predetermined first threshold value) discarded, each piece of relative difference information obtained by using, as a reference image, one of the parallax images that contains the first unnecessary component to be determined. Then, the first unnecessary component determiner extracts a maximum value (or a value not less than a predetermined second threshold value) among the pieces of relative difference information at each position in the two-dimensional data to determine a position and an amount of the first unnecessary component contained in the reference image.

Preferably, the blurred image generator generates the blurred image by using a filter to apply a blurring effect to the first image. More preferably, the blurred image generator determines an amount of blurring by a filtering process using the filter based on an image shooting condition of the parallax image. Preferably, the blurred image generator determines an amount of blurring by a filtering process using the filter based on object distance information of the parallax image. More preferably, the object distance information is calculated based on the plurality of parallax images.

Preferably, the mask creator creates the mask based on difference information obtained by subtracting the first image from the blurred image. More preferably, the mask creator corrects the mask by adding the blur.

Preferably, the image generator generates a second image (output image) by reducing the second unnecessary component from at least one of the parallax images (S111, S209, S312). Then, the second unnecessary component determiner determines, as the second unnecessary component, an unnecessary component of each of the parallax images based on the first unnecessary component and the mask.

Preferably, the image generator generates a second image (output image) by reducing the second unnecessary component from a synthesis value of the parallax images (S111, S209, S312). Then, the second unnecessary component determiner determines, as the second unnecessary component, an unnecessary component contained in the synthesis value of the parallax images based on a synthesis value of the first unnecessary components and the mask. More preferably, the synthesis value of the first unnecessary components and the synthesis value of the parallax images are an average value of the first unnecessary components and an average value of the parallax images, respectively.

Preferably, the image processor 204 selects a region to determine the second unnecessary component. Then, the second unnecessary component determiner determines the second unnecessary component in the selected region. Preferably, the parallax images are images generated based on a plurality of light beams passing through regions of a pupil of an optical system that are different from each other. Preferably, the image processor 204 performs a correction process to add another unnecessary component to at least one of the parallax images by using information on the second unnecessary component.

Each of the embodiments described above can provide an image processing method, an image processing apparatus, an image pickup apparatus, and a non-transitory computer-readable storage medium storing an image processing program that are capable of separating a parallax component and an unnecessary component (ghost component) contained in a shot image without performing image pickup a plurality of times. In addition, it is not necessary to previously correct a parallax difference when separating the parallax component and the unnecessary component.

Embodiment 6

Figure 30:
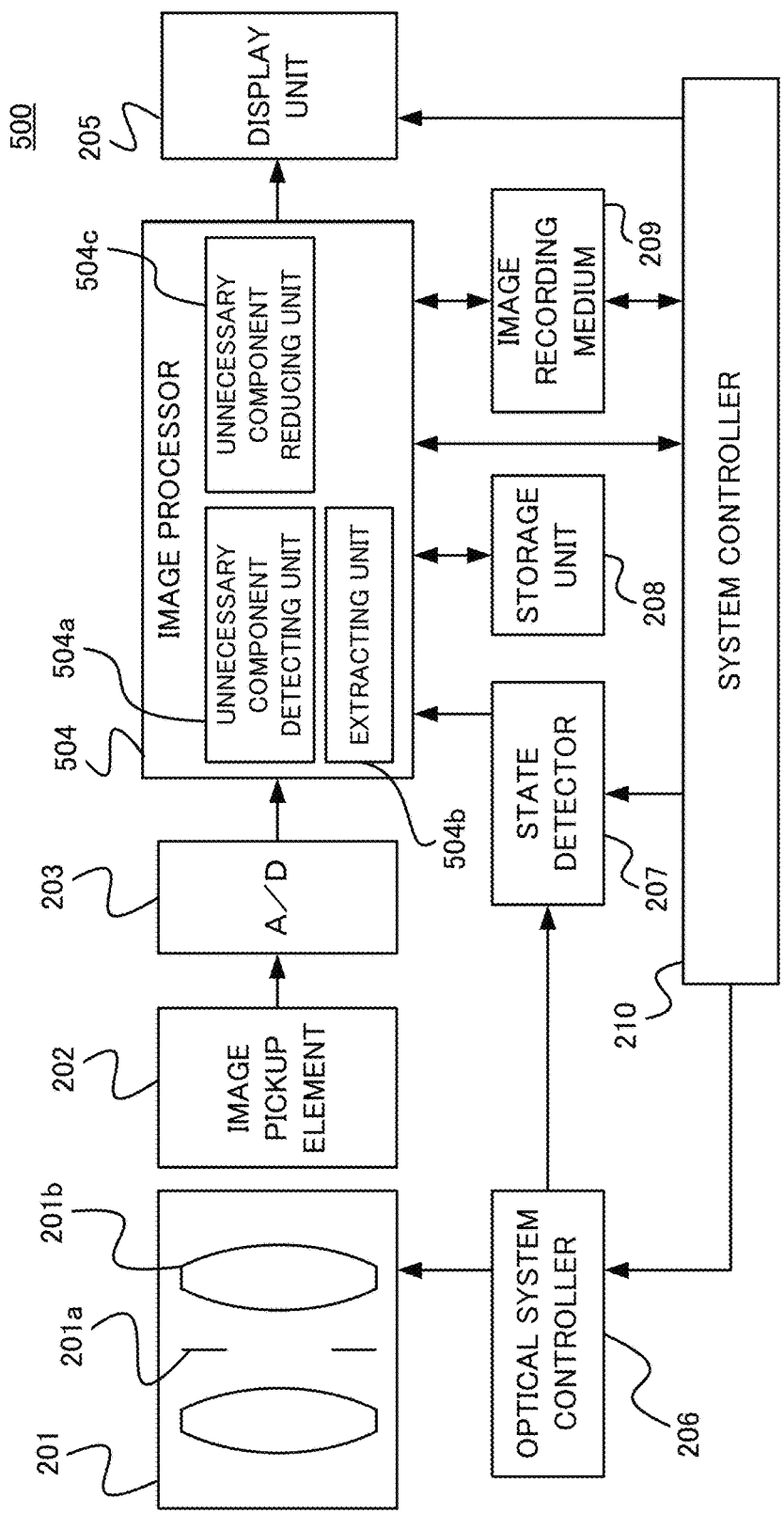
FIG. 30 illustrates a block diagram of an image pickup apparatus in each of Embodiments 6 to 10.

Next, referring to FIG. 30, an image pickup apparatus that executes an image processing method in Embodiment 6 of the present invention will be described. FIG. 30 is a block diagram of a configuration of an image pickup apparatus 500 in this embodiment. The image pickup apparatus 500 is different from the image pickup apparatus 200 in that it includes an image processor 504 instead of the image processor 204. Other basic configurations of the image pickup apparatus 500 are the same as those of the image pickup apparatus 200, and thus descriptions thereof will be omitted.

The image processor 504 (image processing unit) performs a determination process of unnecessary light (unnecessary component) and a correction process to reduce or remove the unnecessary light, as well as image processing to be generally performed. The image processor 504 performs an extracting process of an unnecessary component region. In this embodiment, the image processor 504 corresponds to an image processing apparatus that is incorporated in the image pickup apparatus 500. The image processor 504 includes an unnecessary component detecting unit 504a (first determiner), an extracting unit 504b (second determiner), and an unnecessary component reducing unit 504c (reducer).

The unnecessary component detecting unit 504a generates (acquires) parallax images and detects (determines) an unnecessary component based on the parallax images. The extracting unit 504b reduces a parallax component from the detected unnecessary component and extracts an unnecessary component region such as a ghost. The unnecessary component reducing unit 504c reduces the unnecessary component from each parallax image. In this embodiment, the parallax images can be generated by outputting "an image formed only by a pixel group G1" and "an image formed only by a pixel group G2" in an originally separated manner. Alternatively, "an image formed only by a pixel group G1" and "a synthesis image formed by a pixel group G1 and a pixel group G2" may be originally output, and then an image corresponding to the image formed only by the pixel group G2 may be calculated by subtracting, from the synthesis image, the image formed only by the pixel group G1.

Figure 31A:
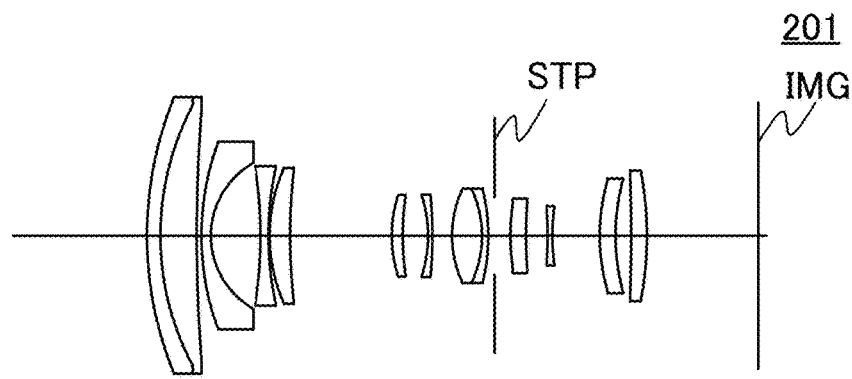
FIGS. 31A to 31C illustrate a configuration of the optical system and an explanatory diagram of unnecessary light occurring in the optical system in Embodiment 6.
Figure 31B:
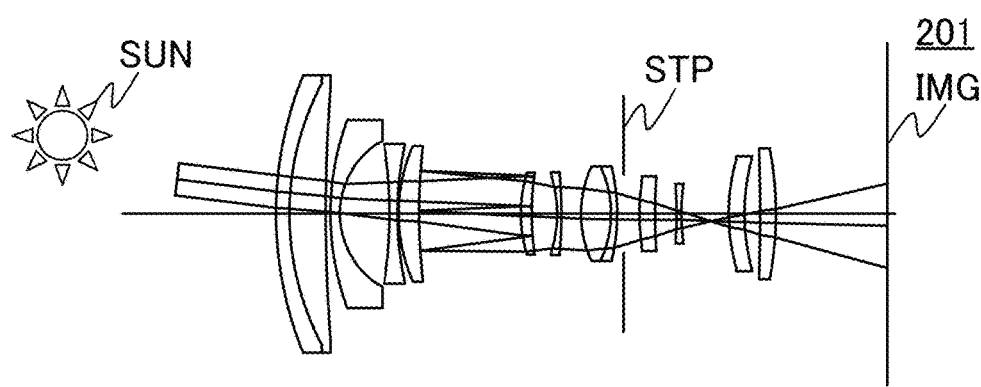
Figure 31C:
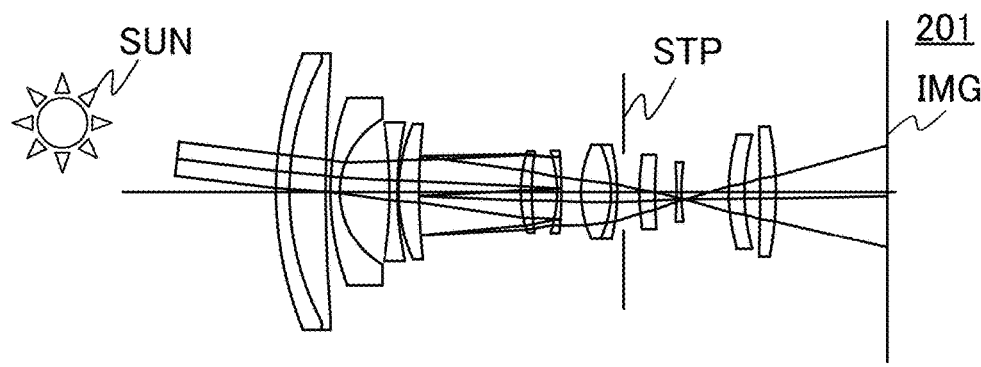

FIGS. 31A to 31C are a configuration of the optical system 201 of the image pickup apparatus 500 and an explanatory diagram of the unnecessary light occurring in the optical system 201. FIG. 31A specifically illustrates an exemplary configuration of the optical system 201. In FIG. 31A, symbol STP represents an aperture stop (corresponding to the aperture stop 201a), and symbol IMG represents an imaging plane. The image pickup element 202 illustrated in FIG. 30 is disposed at the position of the imaging plane IMG. FIG. 31B illustrates a case in which strong light from the sun denoted with SUN as an exemplary high luminance object is incident on the optical system 201, and light reflected at a surface of a lens included in the optical system 201 arrives as an unnecessary component A (unnecessary light such as ghost and flare) at the imaging plane IMG. FIG. 31C illustrates a case in which strong light is incident similarly to FIG. 31B, and light reflected at a surface of another lens included in the optical system 201 arrives as an unnecessary component B (unnecessary light such as ghost and flare) at the imaging plane IMG.

Figure 32:
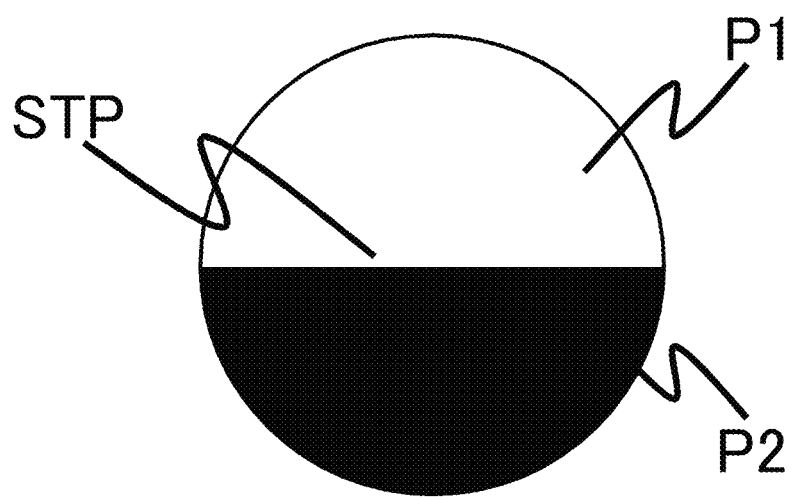
FIG. 32 illustrates an explanatory diagram of unnecessary light passing through an aperture stop of the optical system in Embodiment 6.

FIG. 32 illustrates the regions P1 and P2 (pupil regions or pupil division regions) of the aperture stop STP, through which light beams incident on the pixels G1 and G2 illustrated in FIG. 5 pass. The aperture stop STP can be assumed to correspond to the exit pupil EXP (virtual image when seen from a position on an imaging plane of the optical system 201) of the optical system 201, but in practice, the aperture stop STP and the exit pupil EXP are different from each other. Although a light beam from the high luminance object (SUN) passes through an almost entire region of the aperture stop STP, a region through which the light beams to be incident on the pixels G1 and G2 pass divided into the regions P1 and P2 (pupil regions). In the example illustrated in FIGS. 31B and 31C, the light beams from the high luminance object pass through approximately lower half of the aperture stop STP, and referring to FIG. 5, part of the light beams passes through the region P1 and all the remaining light beams passes through the region P2. The light beams passing through the region P1 enter the pixel G1, and the light beams passing through the region P2 enter the pixel G2.

Figure 28:
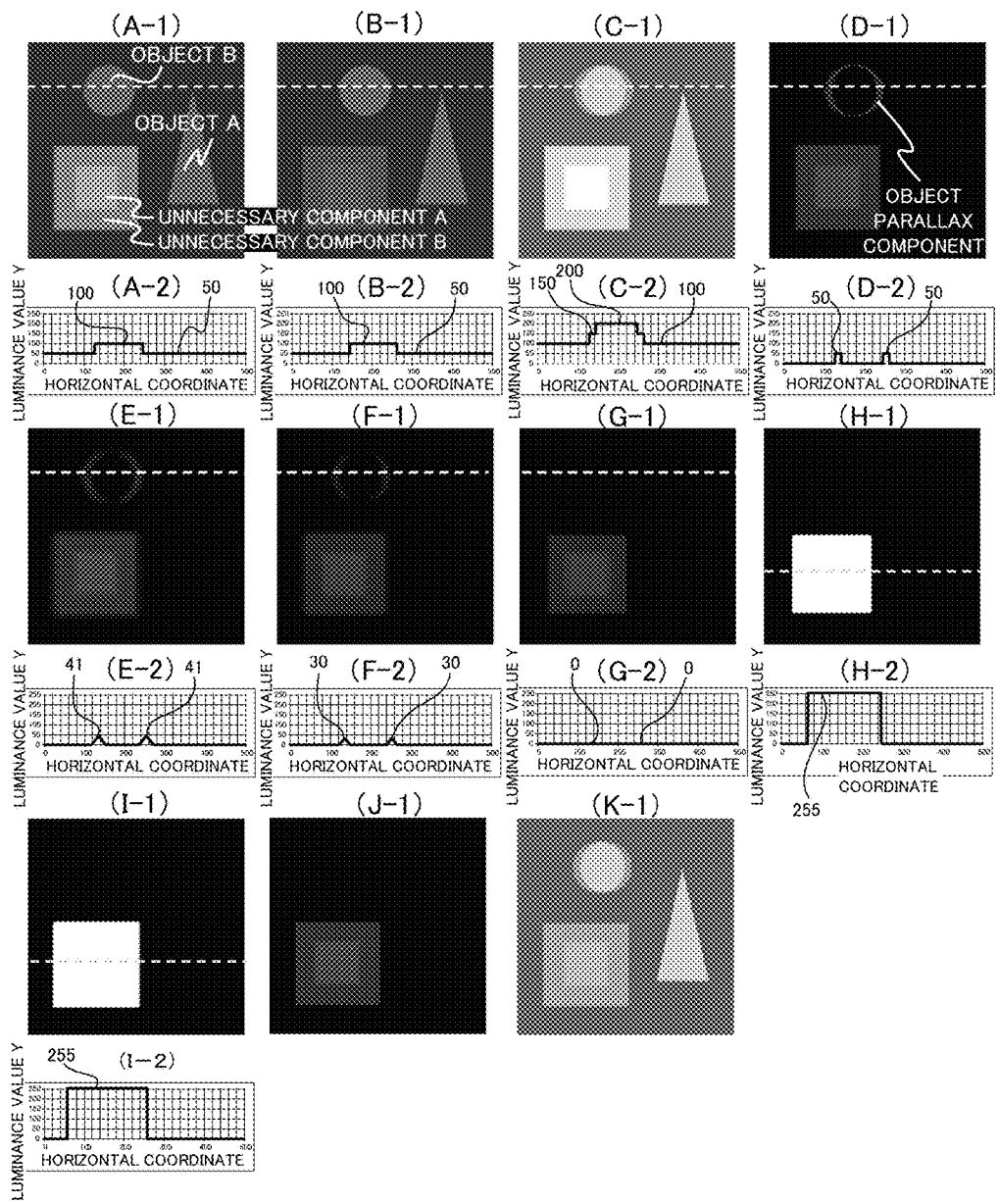
FIG. 28 illustrates a procedure of an image processing method in Embodiment 6.
Figure 29:
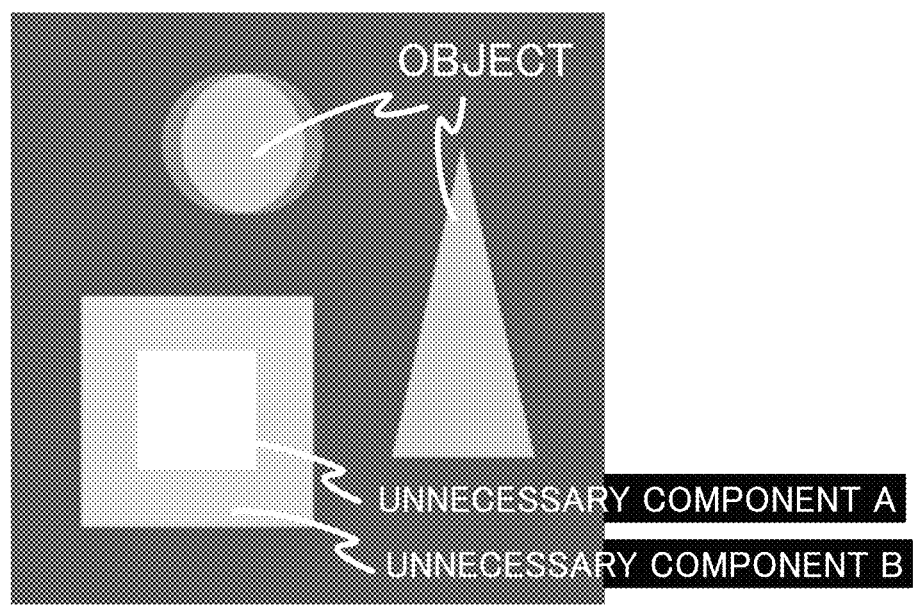
FIG. 29 illustrates exemplary output images obtained by the image processing method in Embodiment 6.

Subsequently, referring to FIGS. 28 and 29, a method of determining an unnecessary component as an image component that appears through a photoelectric conversion of unnecessary light in a shot image generated by the image pickup apparatus 500 will be described. FIG. 28 illustrates a procedure of the image processing method in this embodiment. FIG. 29 is an explanatory output image obtained by the image processing method in this embodiment. When an image is shot by using the optical system 201 of FIG. 31A, the unnecessary component A occurring in an optical path of FIG. 31B and the unnecessary component B occurring in an optical path of FIG. 31C overlap with each other. Therefore, in FIGS. 28 and 29, the unnecessary components A and B are depicted to overlap with each other. However, in any case where the plurality of unnecessary components are overlapped with or separated from each other, the intent and the basic concept of this embodiment do not change, and a method of determining the unnecessary component described below does not change.

FIG. 29 illustrates a shot image that is generated by "the image pickup without the pupil division" and for simplicity, small objects are omitted. This shot image includes a gray portion at the background, a focused triangular object A, a blurred object B located behind the object A, and two squares as ghosts (unnecessary components A and B overlapping with each other that have luminance higher than that of the object or the background). In reality, these unnecessary components are somewhat transparent enough to see objects at the background. An unnecessary component corresponds to unnecessary light on a shot object, and thus has luminance higher than that of the shot object. Therefore, the unnecessary component is illustrated so that the luminance is higher than that of gray portion at the background. This is true also in the drawings in other embodiments described below.

FIG. 28 (A-1) and FIG. 28 (B-1) respectively illustrate a pair of parallax images obtained by performing, at the pixel groups G1 and G2, a photoelectric conversion on light beams passing through the regions (pupil regions) P1 and P2. A pair of parallax images have a difference (object parallax component) corresponding to their parallax as image components. Therefore, the objects B illustrated in FIG. 28 (A-1) and FIG. 28 (B-1) are shifted from each other in a lateral direction (parallax difference occurs). The pair of parallax images contain the unnecessary components A and B schematically illustrated as gray squares having uniform luminances, and the luminances are different depending on the parallax images. This embodiment describes an example where the unnecessary components A and B overlap with each other as described above, and alternatively these unnecessary components may be separated from each other without overlapping. In other words, the unnecessary components only need to have positions or luminances different from each other.

FIG. 28 (A-2) and FIG. 28 (B-2) respectively illustrate cross sections of luminances of the pair of parallax images along dashed lines in FIG. 28 (A-1) and FIG. 28 (B-1). The numerical value in a graph of FIG. 28 (A-2) and FIG. 28 (B-2) indicates a luminance Y of an unnecessary component. For example, in FIG. 28 (A-2), a luminance value of the background is 50, and a luminance value of the object B having the parallax difference is 100. FIG. 28 (C-1) illustrates an image (parallax synthesis image) obtained by adding or synthesizing the images of FIG. 28 (A-1) and FIG. 28 (B-1). FIG. 28 (C-2) illustrates a cross section of a luminance of the parallax synthesis image along a dashed line in FIG. 28 (C-1). This parallax synthesis image is equivalent to the shot image (FIG. 29) generated by "the image pickup without the pupil division". In this embodiment, adding or synthesizing the pair of parallax images, an image is obtained which has the same luminance as that of the shot image generated by "the image pickup without the pupil division". An image pickup apparatus may be used which is capable of adding and averaging the pair of parallax images to obtain the image having the same luminance as that of the shot image generated by "the image pickup without the pupil division". This case will be described in Embodiment 10 below.

FIG. 28 (D-1) illustrates, for the pair of parallax images, an image (difference synthesis image, or first unnecessary component image) obtained by adding or synthesizing an image obtained by subtracting the image of FIG. 28 (B-1) from the image of FIG. 28 (A-1) and an image obtained by subtracting the image of FIG. 28 (A-1) from the image of FIG. 28 (B-1). FIG. 28 (D-2) illustrates a cross section of a luminance along a dashed line in FIG. 28 (D-1). Thus, the difference synthesis image of FIG. 28 (D-1) is an image in which objects and backgrounds are removed from the image of FIG. 28 (C-1), and it includes only the unnecessary component and the object parallax component that are contained in the image of FIG. 28 (C-1).

This embodiment performs the difference calculation twice as described above before performing the addition or synthesis to calculate the image of FIG. 28 (D-1), but as represented by the following expression (1), an equivalent result is obtained by calculating the absolute value of the difference.

$$\text{Fig1}D1(x,y) = |\text{Fig1}A1(x,y) - \text{Fig1}B1(x,y)| \quad (1)$$

In expression (1), symbols Fig1D1(x,y), Fig1A1(x,y), and Fig1B1(x,y) respectively represent luminance values at each coordinate in the images of FIG. 28 (D-1), FIG. 28 (A-1), and FIG. 28 (B-1). As a result, the result of FIG. 28 (D-1) is obtained by a single calculation. Thus, a first unnecessary component is determined, and the image of FIG. (D-1) is a first unnecessary component image that is obtained by imaging the first unnecessary component.

Thus, performing the difference calculation for each parallax image, only the unnecessary component remains (in other words, the unnecessary component is separated or extracted) and the first unnecessary component (first unnecessary component image) can be determined. When the object parallax component is contained as described in this embodiment, the first unnecessary component image includes the mixture of the unnecessary component and the object parallax component. Therefore, in order to determine the unnecessary component with high accuracy, the object parallax component needs to be reduced or removed. Accordingly, in this embodiment, the object parallax component is reduced from the first unnecessary component. In this embodiment, each process described below is performed based on the first unnecessary component, but it is not necessary to store the first unnecessary component image as a so-called "image" which is to be displayed so that a user can see it. The first unnecessary component image only needs to be usable as numerical data.

Next, a method of removing or reducing the object parallax component from the first unnecessary component determined as described above will be described. The object parallax component is a component relating to a difference of a plurality of parallax images. Therefore, in many cases, the object parallax component is a component having a linear shape such as an edge, or a component having a low luminance value and a wide area to some extent. On the other hand, the unnecessary component, such as a ghost, to be originally reduced from a shot image is a component having a relatively high luminance and a wide area in many cases. Therefore, in order to reduce the object parallax component, the luminance value of the component having the linear shape such as an edge needs to be reduced by blurring it, and the contrast of a region having the low luminance value needs to be increased so that the object parallax component can be close to zero (or can be reduced). A remaining noise component can be reduced by performing a threshold process to some extent. A component remaining after performing these processes can be determined as an unnecessary component. However, when the component having the linear shape is blurred or the contrast of the region having the low luminance value is increased, the unnecessary component may also be slightly reduced. Accordingly, in this embodiment, a region enlarging process is performed for the remaining region (hereinafter, these processes are collectively referred to as an extracting process). Thus, the unnecessary component region (first unnecessary component region) can be automatically determined. This embodiment performs the extracting process for the first unnecessary component to reduce the object parallax component.

Figure 33:
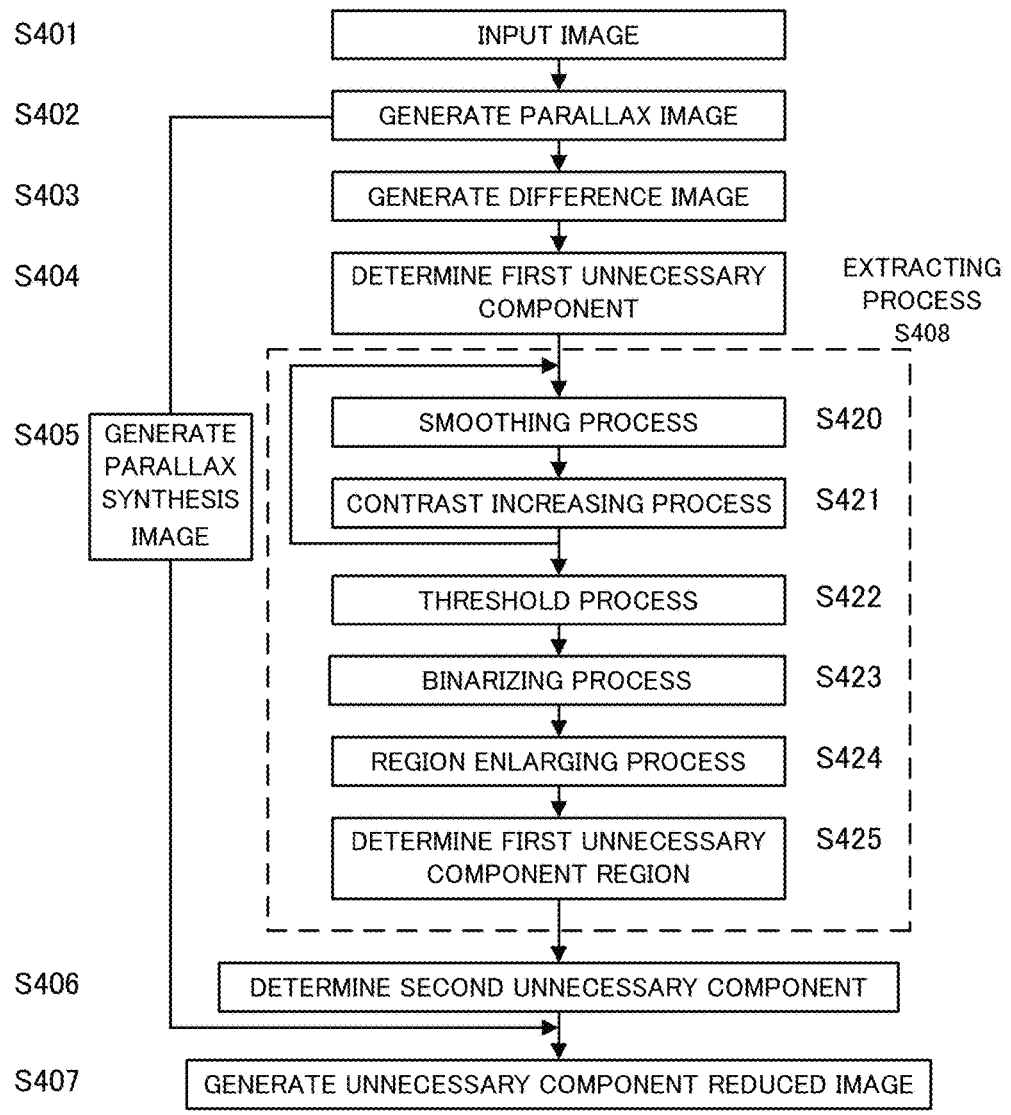
FIG. 33 illustrates a flowchart of the image processing method in Embodiment 6.

Next, referring to FIG. 33, an image processing method (process of reducing the object parallax component) in this embodiment will be described. FIG. 33 illustrates a flowchart of the image processing method. Each step in FIG. 33 is executed mainly by the system controller 210 or the image processor 504 in accordance with an image processing program as a computer program.

First of all, at step S401, the system controller 210 control the image pickup unit including the optical system. 201 and the image pickup element 202 to take a photograph of an object. The image processor 504 acquires a shot image as an input image.

Subsequently, at step S402, the image processor 504 generates a pair of parallax images by using digital signals output from the image pickup element 202 (pixel groups G1 and G2) and obtained by performing A/D conversion by the A/D convertor 203. In this case, the image processor 504 may perform a typical developing process or various image correcting processes to generate the parallax images.

Subsequently, at step S403, the image processor 504 (unnecessary component detecting unit 504a) obtains difference information of the pair of parallax images. In other words, the image processor 504 adds or synthesizes a difference image obtained by subtracting the image of FIG. 28 (B-1) from the image of FIG. 28 (A-1) and a difference image obtained by subtracting the image of FIG. 28 (A-1) from the image of FIG. 28 (B-1) to generate a difference synthesis image of FIG. 28 (D-1). In such a simple difference calculation, the difference value of the unnecessary components indicates positive and negative values. For example, in this embodiment, when the image of FIG. 28 (B-1) is subtracted from the image of FIG. 28 (A-1) to generate the difference synthesis image of FIG. (D-1), a luminance value of the unnecessary component contained in the image of FIG. 28 (A-1) is higher than that of the unnecessary component in the image of FIG. 28 (B-1). Therefore, the difference value is positive. Similarly, when the image of FIG. 28 (A-1) is subtracted from the image of FIG. 28 (B-1), the difference value is negative. In this embodiment, for the sake of simplifying a process of reducing the unnecessary component at the latter step, the negative values are discarded to be zero.

Subsequently, at step S404, the image processor 504 (unnecessary component detecting unit 504a) determines a component remaining in the difference image (difference synthesis image) obtained at step S403 as a first unnecessary component. Imaging the first unnecessary component, a first unnecessary component image is obtained. Specifically, only the difference values of the unnecessary components contained in the images of FIG. 28 (A-1) and FIG. 28 (B-1) are detected as positive values. The unnecessary component detecting unit 504a determines it as the first unnecessary component and generates the first unnecessary component image (FIG. 28 (D-1)). However, it is not necessary to generate or store the first unnecessary component image as so-called "image data" which can be seen by a user, but it only needs to be usable in the process calculation. When the difference image is obtained by calculating the absolute value of the difference as represented by expression (1) described above, it can be obtained by a single calculation. In order to further improve the process speed, regarding the difference image as a first unnecessary component, step S404 may be skipped and the flow may proceed to step S405 subsequent to step S403.

Subsequently, at step S405, the image processor 504 adds or synthesizes the parallax images to generate the image (parallax synthesis image) equivalent to the shot image generated by "the image pickup with the pupil division". For example, a process which adds the parallax image of FIG. 28 (A-1) generated at step S402 and the parallax image of FIG. 28 (B-1) is performed to generate the added and synthesized parallax synthesis image illustrated in FIG. 28 (C-1). Alternatively, at step S405, the image may be generated by adding digital signals output from the image pickup element 202 (pixel groups G1 and G2) and obtained by performing the A/D conversion by the A/D converter without performing the step (S402) of generating the parallax images. Step S405 does not need to be located at this position, and the position where the step is performed is not limited this if the step is performed before step S407 so that the parallax synthesis image can be used at the latter step S407.

Subsequent step S408 (S420 to S425) is a step (extracting process step) of determining an unnecessary component region (first unnecessary component region as a mask) based on the first unnecessary component determined at step S404. Step S408 is performed by the image processor 504 (extracting unit 504b). First of all, at step S420, the image processor 504 (extracting unit 504b) performs a smoothing process on the first unnecessary component. FIG. 28 (E-1) illustrates an image in which the smoothing process is performed. FIG. 28 (E-2) illustrates a cross section of a luminance along a dashed line in FIG. 28 (E-1). According to this process, an edge portion of the object parallax component can be blurred and an entire luminance value of the object parallax component can be reduced. Specifically, as the smoothing process, a moving average process, a Gaussian filter process, or the like is performed.

Subsequently, at step S421, the image processor 504 (extracting unit 504b) performs a process to increase a contrast (contrast increasing process) on the blurred image obtained by performing the smoothing process at step S420. FIG. 28 (F-1) illustrates an image in which the contrast is increased. FIG. 28 (F-2) illustrates a cross section of a luminance along a dashed line in FIG. 28 (F-1). According to this process, a luminance value of the blurred portion is decreased and a luminance value of a portion having a relatively high luminance value such as an unnecessary component is increased.

Subsequently, at step S422, the image processor 504 (extracting unit 504b) performs a threshold process. Specifically, it performs a process in which all luminance values in a region where for example the luminance value is not greater than 30 is set to zero. In this embodiment, for simplicity, a relatively large luminance value of 30 remains. However, in practice, it is preferred that the smoothing process is performed more positively and the luminance values around 2 to 10 (for an 8-bit image) is set to zero by performing the threshold process. According to this process, accidentally removing the unnecessary component to originally remain in the image at this step (step S422) can be avoided. As a result, the object parallax component or the noise component can be effectively removed, and eventually, only the unnecessary component can remain. FIG. 28 (G-1) illustrates an image in which only the unnecessary component remains. FIG. 28 (G-2) illustrates a cross section of a luminance along a dashed line in FIG. 28 (G-1).

When a lot of object parallax components remain after the threshold process at step S422, the flow may return to step S420 and repeat steps S420 and S421. According to this process, the object parallax component can be reduced in stages.

Subsequently, at step S423, the image processor 504 (extracting unit 504b) performs a binarizing process on the remaining unnecessary component. The binarizing process is a process in which a luminance value keeps zero for a region where the luminance value is zero, and all luminance values are set to 1 (or set to 255 if it is an 8-bit gray-scale image) for a region where the luminance value is not less than 1 (or not less than a predetermined threshold value). According to this process, the remaining unnecessary component can be considered as a "region (region containing the unnecessary component)". FIG. 28 (H-1) illustrates a binarized image. FIG. 28 (H-2) illustrates a cross section of a luminance along a dashed line in FIG. 28 (H-1).

Subsequently, at step S424, the image processor 504 (extracting unit 504b) performs a process (region enlarging process) which enlarges the "region containing the unnecessary component" binarized at step S423. FIG. 28 (I-1) illustrates an image in which the region enlarging process has been performed. FIG. 28 (I-2) illustrates a cross section of a luminance along a dashed line in FIG. 28 (I-1).

Performing the smoothing process at step S420, the contrast increasing process at step S421, and the threshold process at step S422, the object parallax component can be removed or reduced. At the same time, however, the unnecessary component is also reduced to some extent. In this case, there is a possibility that the binarized and eventually remaining the "region containing the unnecessary component" cannot cover an entire region actually containing the unnecessary component. Therefore, at step S424, the region actually containing the unnecessary component which is reduced by performing the smoothing process and the like is enlarged so as to cover the entire region actually containing the unnecessary component. The unnecessary component such as a ghost may have a clear or blurred edge, and thus in practice there are many unnecessary components where it is difficult to define an outline. Therefore, when an unnecessary component reducing process is to be performed at the latter step, a natural image can be obtained by setting the unnecessary component region to some extent wider than the actual unnecessary component as described in this embodiment, instead of exactly extracting the outline of the unnecessary component. Accordingly, a periphery of the unnecessary component may be extracted to be slightly more than its actual periphery.

Subsequently, at step S425, the image processor 504 (extracting unit 504b) determines an unnecessary component region (first unnecessary component region) based on the result of step S424. The first unnecessary component region is used as a mask to reduce or remove the parallax component contained in the first unnecessary component.

Next, at step S406, the image processor 504 (extracting unit 504b) determines a second unnecessary component based on the first unnecessary component determined at step S404 and the first unnecessary component region (mask) determined at step S425. Specifically, the extracting unit 504b performs a masking process on the first unnecessary component by using the first unnecessary component region (mask) to extract, from the first unnecessary component, only the region containing the unnecessary component such as a ghost. For example, with respect to a region having the luminance value of 255 in FIG. 28 (I-1) maintains luminance values at the same region (i.e. corresponding region) in FIG. 28 (D-1). On the other hand, with respect to a region having the luminance value of 0 in FIG. 28 (I-1), luminance values at the same region in FIG. 28 (D-1) are replaced with 0. Accordingly, an image of FIG. 28 (J-1) in which the object parallax component is reduced from the first unnecessary component image of FIG. (D-1) is obtained.

In this embodiment, a component obtained by reducing or removing the object parallax component from the first unnecessary component (first unnecessary component image) is referred to as a second unnecessary component, and an image obtained by imaging the second unnecessary component is referred to as a second unnecessary component image (FIG. 28 (J-1)). In this embodiment, as illustrated in FIG. 28 (I-1), the mask in which regions are clearly divided is created, but a gradation mask in which a boundary portion between the luminance values 0 and 255 in FIG. 28 (I-1) are blurred can also be applied. In this case, the masking process is performed on the image of FIG. 28 (D-1) by using a weighting coefficient for the gradation portion.

Finally, at step S407, the image processor 504 (unnecessary component reducing unit 504d) performs an unnecessary component reducing process based on the second unnecessary component determined at step S406 and the parallax synthesis image generated at step S405. Specifically, the unnecessary component reducing unit 504d subtracts the second unnecessary component (second unnecessary component image) of FIG. 28 (J-1) from the parallax synthesis image of FIG. 28 (C-1). Accordingly, an unnecessary component reduced image illustrated in FIG. (K-1) is generated.

In this embodiment, each of a smoothing amount (blur amount) in the smoothing process, a contrast changing amount in the contrast increasing process, a threshold value in the threshold process, and an enlarging amount in the region enlarging process can be changed as appropriate. In this embodiment, the smoothing process, the contrast increasing process, and the threshold process are not limited to these processes, and other processes can also be used if the same effects are achieved. For simplicity, this embodiment describes an example of a gray-scale image, but can also be applied to a color image similarly. In this case, the processes described above are performed independently for each color channel, and eventually each color may be synthesized to obtain an image.

According to this embodiment, a second unnecessary component having a reduced object parallax component can be determined based on a first unnecessary component containing an object parallax component. Furthermore, according to this embodiment, an unnecessary component reduced image in which the second unnecessary component is reduced from a parallax synthesis image can be generated.

Embodiment 7

Next, Embodiment 7 of the present invention will be described. This embodiment is different from Embodiment 6 in a method of an extracting process. In this embodiment, an image pickup apparatus in this embodiment has the same basic configuration as that of the image pickup apparatus 500 in Embodiment 6 described referring to FIG. 30, and thus a description thereof will be omitted. In addition, an image processing method in this embodiment is different only in a process flow and a calculation method from those of Embodiment 6, and its result is the same as that of Embodiment 6.

This embodiment adds a process to extract and reduce an edge component contained in the first unnecessary component at the first half of the extracting process in Embodiment 6. As described in Embodiment 6, the object parallax component is a parallax difference amount, and the difference amount is determined depend on a distance from a focused image. When the distance from the focused image is short, the parallax difference amount is small and the object parallax component which appears in the first unnecessary component has a linear shape. On the other hand, when the distance from the focused image is great, the parallax difference amount is large and the object parallax component which appears in the first unnecessary component has a planar shape with a small width.

On the other hand, since the unnecessary component such as a ghost has a wide planar shape in many cases, there is a high possibility that the shapes of the object parallax component and the unnecessary component are likely to have a characteristic difference. Therefore, it is preferred that the edge component such as a linear-shaped object parallax component is reduced before the smoothing process is performed at step S420 described referring to FIG. 33 in Embodiment 6 and the like, since a load in the smoothing process and the like at the latter step can be reduced. Accordingly, in this embodiment, the process which extracts and reduces the edge component contained in the first unnecessary component is added.

Figure 35:
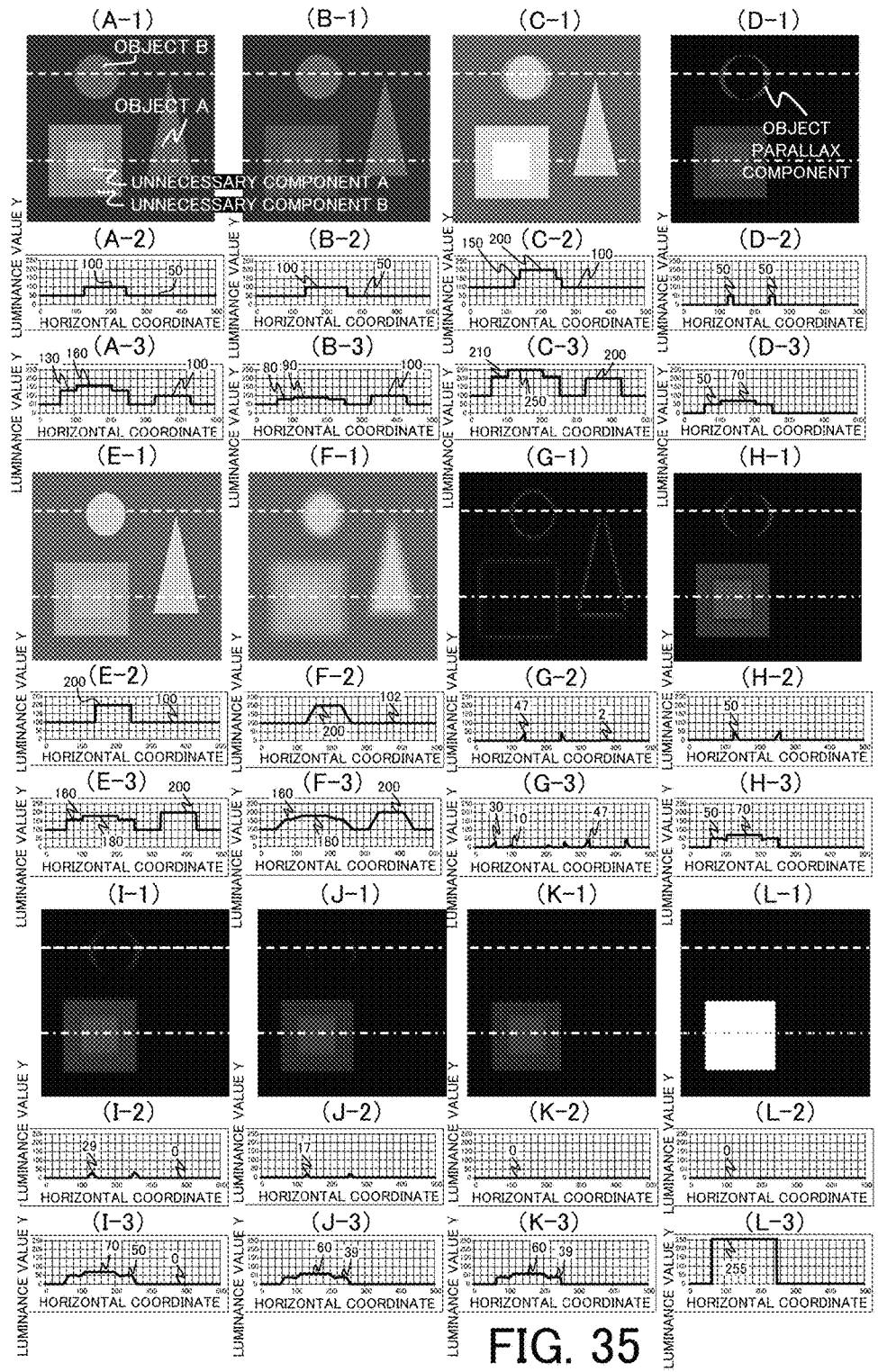
FIG. 35 illustrates a procedure of the image processing method in Embodiment 7.
Figure 36:
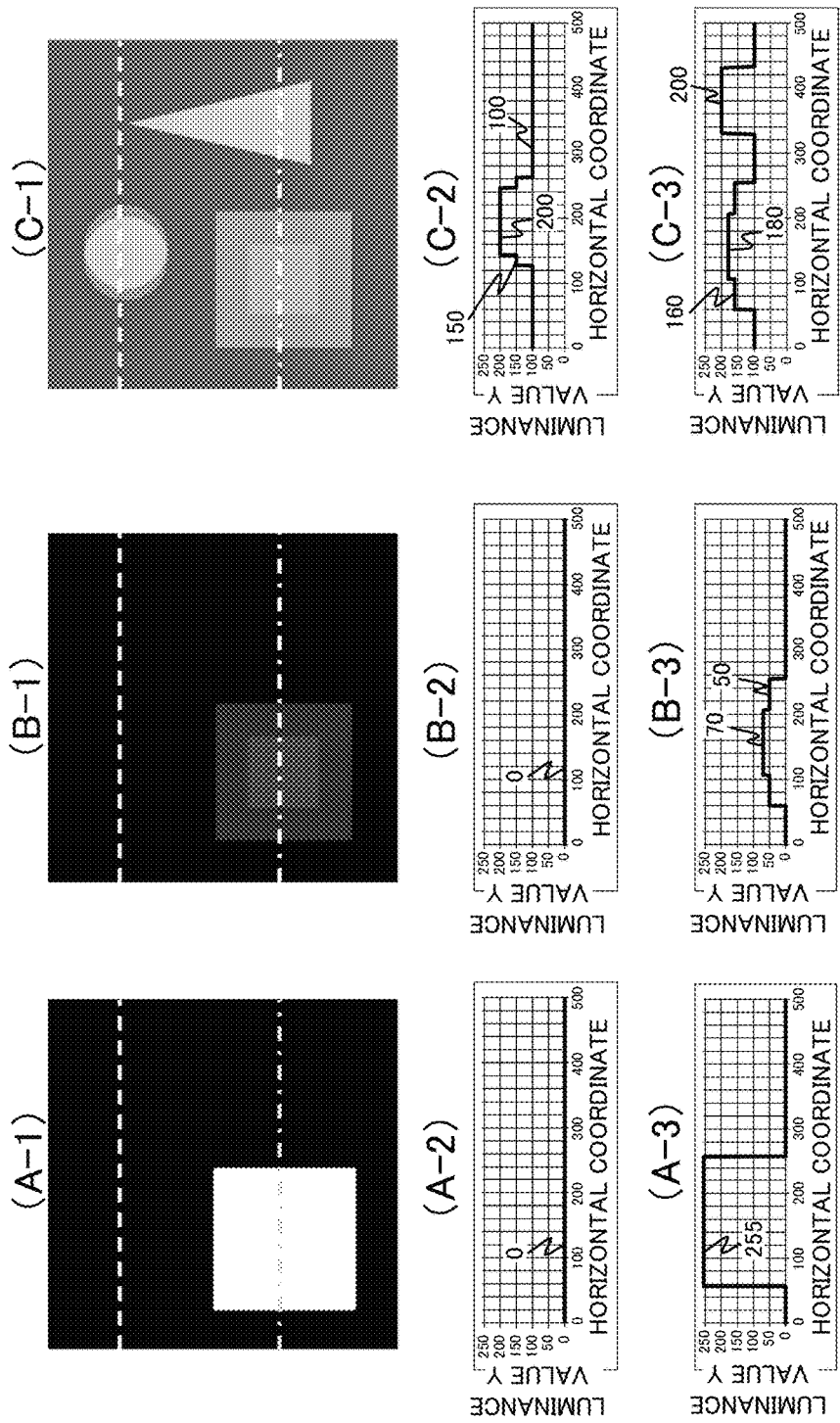
FIG. 36 illustrates a procedure of the image processing method in Embodiment 7.
Figure 37:
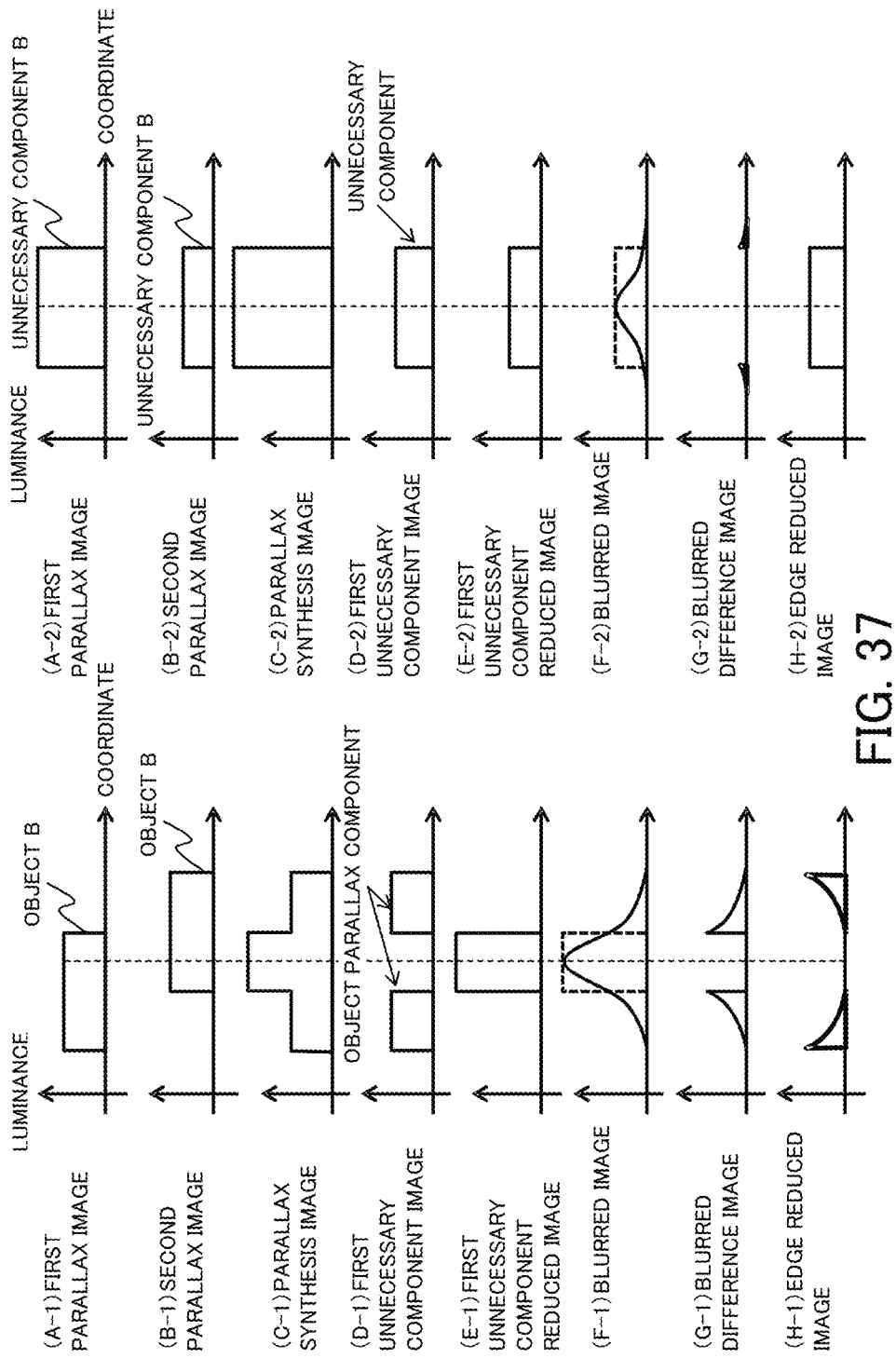
FIG. 37 illustrates a procedure of the image processing method in Embodiment 7.

Referring to FIGS. 35 to 37, a method of determining an unnecessary component as an image component that appears through a photoelectric conversion of unnecessary light in a shot image generated by the image pickup apparatus 500 will be described. FIGS. 35 to 37 illustrate a procedure of the image processing method in this embodiment.

In this embodiment, the object parallax component exists on a blurred object B. The object B has a parallax difference between the parallax images of FIG. 35 (A-1) and FIG. 35 (B-1). FIG. 35 (A-2) and FIG. 35 (B-2) respectively illustrate cross sections of luminances of a pair of parallax images along dashed lines in FIG. 35 (A-1) and FIG. 35 (B-1). Each of numerical values in the graph of FIG. 35 (A-2) and FIG. 35 (B-2) indicates a luminance value Y of the unnecessary component. For example, in FIG. (A-2), a luminance value at the background is 50, and a luminance value of the object B having the parallax difference is 100. FIG. 35 (A-3) and FIG. 35 (B-3) respectively illustrate cross sections of luminances of the pair of parallax images along dashed-dotted lines in FIG. (A-1) and FIG. 35 (B-1). Each of numerical values in the graph of FIG. 35 (A-3) and FIG. 35 (B-3) indicates a luminance value Y of the unnecessary component. For example, in FIG. 35 (A-3), a luminance value of an object A is 100, a luminance value of an unnecessary component A is 160, and a luminance value of an unnecessary component B is 130.

FIG. 35 (C-1) illustrates an image (parallax synthesis image) obtained by adding or synthesizing the images of FIG. 35 (A-1) and FIG. 35 (B-1). FIG. 35 (C-2) and FIG. 35 (C-3) respectively illustrate cross sections of a luminance of the parallax synthesis image along a dashed line and a dashed-dotted line in FIG. 35 (C-1). This parallax synthesis image is equivalent to the shot image generated by "the image pickup without the pupil division". In this embodiment, adding or synthesizing the pair of parallax images, an image is obtained which has the same luminance as that of the shot image generated by "the image pickup without the pupil division". An image pickup apparatus may be used which is capable of adding and averaging the pair of parallax images to obtain the image having the same luminance as that of the shot image generated by "the image pickup without the pupil division". This case will be described in Embodiment 10 below.

FIG. 35 (D-1) illustrates, for the pair of parallax images, an image (difference synthesis image, or first unnecessary component image) obtained by adding or synthesizing an image obtained by subtracting the image of FIG. 35 (B-1) from the image of FIG. 35 (A-1) and an image obtained by subtracting the image of FIG. 35 (A-1) from the image of FIG. 35 (B-1). FIG. 35 (D-2) and FIG. 35 (D-3) respectively illustrate cross sections of luminances along a dashed line and a dashed-dotted line in FIG. 35 (D-1). Thus, the difference synthesis image of FIG. 35 (D-1) is an image in which objects and backgrounds are removed from the image of FIG. 35 (C-1), and it includes only the unnecessary component and the object parallax component that are contained in the image of FIG. 35 (C-1).

Thus, performing the difference calculation for each parallax image, only the unnecessary component remains (in other words, the unnecessary component is separated or extracted) and the first unnecessary component (first unnecessary component image) can be determined. When the object parallax component is contained as described in this embodiment, the first unnecessary component image includes the mixture of the unnecessary component and the object parallax component. Therefore, in order to determine the unnecessary component with high accuracy, the object parallax component needs to be reduced or removed. Accordingly, in this embodiment, the object parallax component is reduced from the first unnecessary component.

Figure 34:
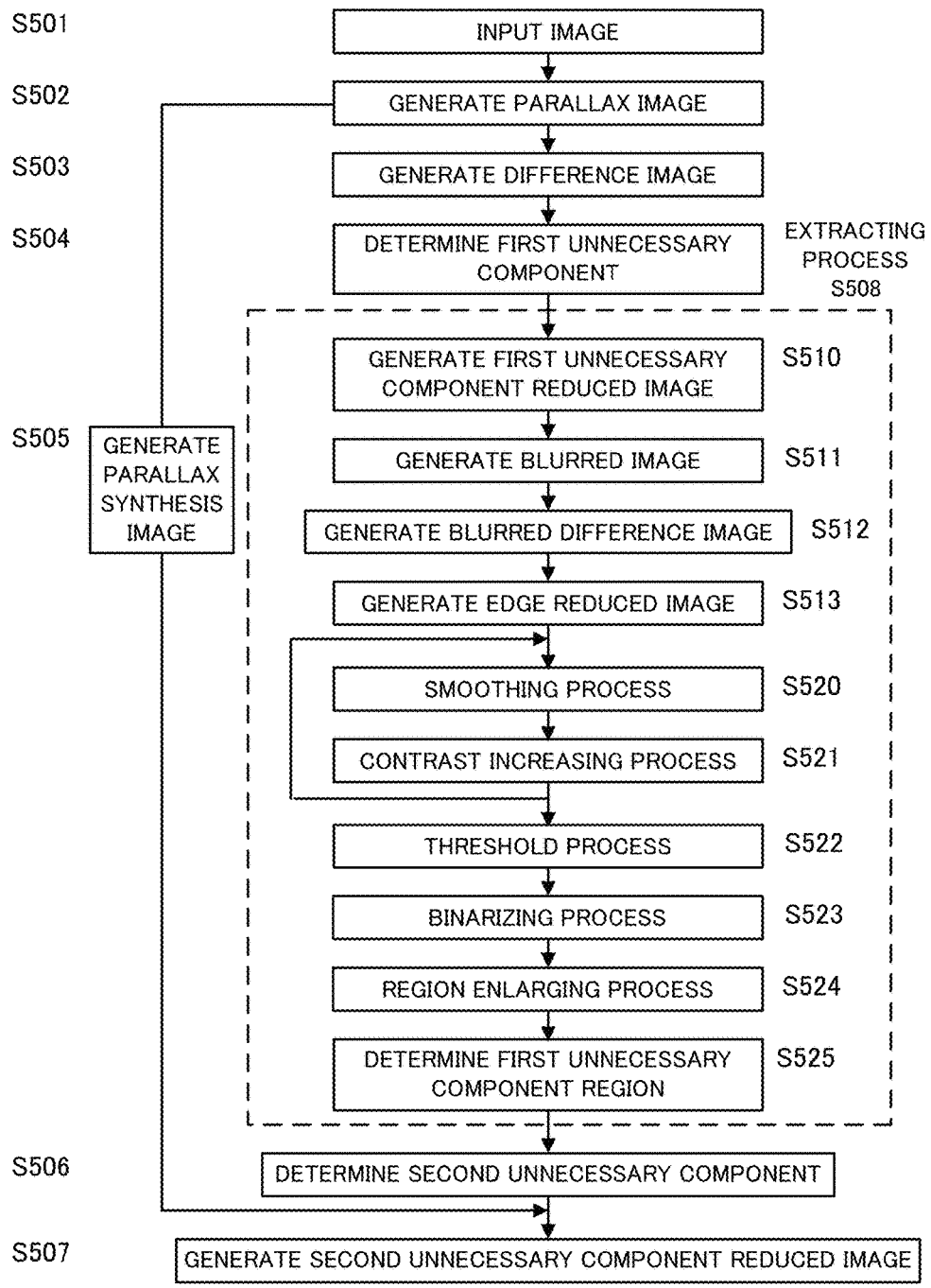
FIG. 34 illustrates a flowchart of the image processing method in Embodiment 7.

Next, referring to FIG. 34, an image processing method (process of reducing the object parallax component) in this embodiment will be described. FIG. 34 illustrates a flowchart of the image processing method. Each step in FIG. 34 is executed mainly by the system controller 210 or the image processor 504 in accordance with an image processing program as a computer program.

Steps S501 to S507 in FIG. 34 are respectively the same as steps S401 to S407 in Embodiment 6 described referring to FIG. 33. Step S508 (S520 to S525) in FIG. 34 is the same as step 408 (S420 to S425) in Embodiment 6 described referring to FIG. 33. Therefore, descriptions of these steps will be omitted. This embodiment is different from Embodiment 6 in that steps S510 to S513 are inserted between steps S504 and S520 (i.e. steps S510 to S513 are added to the extracting process in Embodiment 6).

At step S510, the image processor 504 (extracting unit 504b) performs a correction process to reduce or remove the unnecessary component from the parallax synthesis image to generate an unnecessary component reduced image (first unnecessary component reduced image). FIG. 35 (E-1) illustrates the first unnecessary component reduced image. FIG. 35 (E-2) and FIG. (E-3) respectively illustrate cross sections of luminances along a dashed line and a dashed-dotted line in FIG. 35 (E-1). Specifically, the extracting unit 504b subtracts the image of FIG. 35 (D-1) from the image of FIG. 35 (C-1), and thus the first unnecessary component can be reduced or removed. When performing this process, the object parallax component is also removed and accordingly a shape of a round object B having a parallax difference changes (in this example, the object B decreases in size by the parallax difference).

Subsequently, at step S511, the image processor 504 (extracting unit 504b) adds blur to the first unnecessary component reduced image to generate a blurred image. FIG. 35 (F-1) illustrates the blurred image. FIG. 35 (F-2) and FIG. 35 (F-3) respectively illustrate cross sections of luminances along a dashed line and a dashed-dotted line in FIG. 35 (F-1). Specifically, the extracting unit 504b performs a filtering process by using a filter having a blurring effect for the first unnecessary component reduced image. In this embodiment, a Gaussian filter which can adjust a blur amount is used. When the blur amount is known, a filter coefficient as a blur amount is set by using the standard deviation of Gaussian distribution to be sufficiently large compared to the object parallax component. On the other hand, the blur amount can also be determined by referring the image shooting condition such as a focal length and an aperture value Fno of the optical system 201 obtained from the state detector 207. The blur amount is an amount determined based on a parameter to control the strength of the blur such as the standard deviation of Gaussian distribution or a parameter to control a range of the blur depending on a size of the filter. Since a parallax difference amount (corresponding to a region size of the parallax component) of the object varies depending on the focal length or the aperture value Fno of the optical system 201, referring to the image shooting condition, an optimum blur amount can be determined and the size of the filter can be reduced.

In this embodiment, the same blur amount is applied to the entire image, but it is preferred that the blur amount is changed depending on a distance for each object when object distance information is known. Since the parallax difference amount of the object varies depending on the object distance, changing the blur amount depending on the distance for each object, an optimum blur amount can be determined for each object and the size of the filter can be reduced. Reducing the size of the filter, a process load of the blur adding process can be reduced. With respect to the object distance information, corresponding points of the object are extracted by using a block matching method generally known for a pair of parallax images, and a parallax amount is calculated as a difference of positions of pixels of the corresponding points between the parallax images. Then, the distance information (object distance information) for the shooting object can be calculated based on the calculated parallax amount, the focal length of the image pickup system as known information, and base length data by the pupil division. In this embodiment, the calculating step of the object distance information may be added. In this embodiment, the blur amount (parallax difference amount) of the object B is unknown, and a filter coefficient as a blur amount is set by using the standard deviation of Gaussian distribution to be small compared to the object parallax component.

Subsequently, at step S512, the image processor 504 (extracting unit 504b) obtains a difference between the blurred image generated at step S511 and the first unnecessary component reduced image generated at step S510 to generate a blurred difference image. FIG. 35 (G-1) illustrates the blurred difference image. FIG. 35 (G-2) and FIG. 35 (G-3) respectively illustrate cross sections of luminances along a dashed line and a dashed-dotted line in FIG. 35 (G-1). Accordingly, the edge portion in the first unnecessary component reduced image can be extracted. Subsequently, at step S513, the image processor 504 (extracting unit 504b) generates an edge reduced image based on a difference between the first unnecessary component image determined at step S504 and the blurred difference image generated at step S512.

Referring to FIG. 37, a reason why the edge can be extracted by adding the blur to the first unnecessary component reduced image to generate the blurred image and by obtaining the difference between the blurred image and the first unnecessary component reduced image will be described. FIG. 37 (A-1) to FIG. 37 (H-1) are diagrams focused on the object B having the parallax difference, and the unnecessary component is not depicted in each of the drawings. FIG. 37 (A-2) to FIG. 37 (H-2) are diagrams focused on the unnecessary component B, and the object parallax component is not depicted in each of the drawings. FIG. 37 corresponds to a cross section of a luminance of an image, and a vertical axis and horizontal axis indicate a luminance and a coordinate, respectively.

FIG. 37 (A-1) and FIG. 37 (B-1) illustrate a pair of parallax images (first parallax images), and FIG. 37 (A-2) and FIG. 37 (B-2) illustrate a pair of parallax images (second parallax images). In particular, FIG. 37 (A-1) and FIG. 37 (B-1) illustrate a state in which the object B has a parallax difference. FIG. 37 (C-1) and FIG. 37 (C-2) illustrate the parallax synthesis image of FIG. 35 (C-1). FIG. 37 (D-1) illustrates the first unnecessary component image (first unnecessary component) determined at step S504 in FIG. 34. FIG. 37 (E-1) illustrates the first unnecessary component reduced image generated at step S510. FIG. 37 (E-1) corresponds to a difference between the images of FIG. 37 (C-1) and FIG. 37 (D-1). FIG. 37 (F-1) illustrates the blurred image generated at step S511. For easy understanding, it is depicted by providing a blur amount different from that in FIG. 35 (F-1). FIG. 37 (G-1) illustrates the blurred difference image generated at step S512. FIG. 37 (G-1) corresponds to a difference between the images of FIG. 37 (F-1)

and FIG. 37 (E-1). Negative values determined by obtaining the difference are replaced by 0 (value of zero), and this is true also in each of the following embodiments. FIG. 37 (H-1) illustrates the edge reduced image generated at step S513. FIG. 37 (H-1) corresponds to a difference between the images of FIG. 37 (D-1) and FIG. 37 (G-1). Accordingly, the luminance value of the object parallax component contained in the first unnecessary component image can be reduced. FIG. 37 (D-2) to FIG. 37 (H-2) respectively illustrate results of performing the same processes as those in FIG. 37 (D-1) to FIG. 37 (H-1) described above on the unnecessary component B.

FIG. 35 (H-1) illustrates a result of the edge reducing process. FIG. 35 (H-2) and FIG. 35 (H-3) respectively illustrate cross sections of luminances along a dashed line and a dashed-dotted line in FIG. 35 (H-1).

In this embodiment, the edge reduced image is generated by using the blurred difference image, and the binarizing process as described in Embodiment 6 can also be performed on the blurred difference image to perform the masking process on the first unnecessary component image based on the binarized blurred difference image. According to this embodiment, adding steps S510 to S513 as an extracting process, the luminance of the object parallax component can be reduced without substantially influencing the luminance of the first unnecessary component.

Subsequent steps S520 to S525 are respectively the same as steps S420 to S425 in Embodiment 6 described referring to FIG. 33, and thus descriptions thereof will be omitted. FIG. 35 (I-1) to FIG. 35 (L-1) and FIG. 36 (A-1) respectively correspond to images obtained by the processes at step S520 to S525. FIG. 35 (I-2) and FIG. 35 (I-3) respectively illustrate cross sections of luminances along a dashed line and a dashed-dotted line in FIG. 35 (I-1). FIG. 35 (J-2) and FIG. 35 (J-3) respectively illustrate cross sections of luminances along a dashed line and a dashed-dotted line in FIG. 35 (J-1). FIG. 35 (K-2) and FIG. (K-3) respectively illustrate cross sections of luminances along a dashed line and a dashed-dotted line in FIG. 35 (K-1). FIG. 35 (L-2) and FIG. 35 (L-3) respectively illustrate cross sections of luminances along a dashed line and a dashed-dotted line in FIG. 35 (L-1). FIG. 36 (A-2) and FIG. 36 (A-3) respectively illustrate cross sections of luminances along a dashed line and a dashed-dotted line in FIG. 36 (A-1).

Next, at step S506, a second unnecessary component is determined based on the first unnecessary component and the first unnecessary component region. Specifically, the masking process is performed on the first unnecessary component by using the first unnecessary component region as a mask, and only the part where the unnecessary component such as a ghost is contained is extracted as the second unnecessary component. FIG. 36 (B-1) illustrates the second unnecessary component (second unnecessary component image). FIG. 36 (B-2) and FIG. 36 (B-3) respectively illustrate cross sections of luminances along a dashed line and a dashed-dotted line in FIG. 36 (B-1).

Finally, at step S507, the image processor 504 (unnecessary component reducing unit 504d) performs a unnecessary component reducing process based on the second unnecessary component determined at step S506 and the parallax synthesis image generated at step S505. Specifically, the unnecessary component reducing unit 504d subtracts the second unnecessary component (second unnecessary component image) of FIG. 36 (B-1) from the parallax synthesis image of FIG. 35 (C-1). According to this process, an unnecessary component reduced image (second unnecessary component reduced image) is generated. FIG. 36 (C-1) illustrates the second unnecessary component reduced image. FIG. 36 (C-2) and FIG. 36 (C-3) respectively illustrate cross sections of luminances along a dashed line and a dashed-dotted line in FIG. 36 (C-1).

According to this embodiment, a second unnecessary component having a reduced object parallax component can be determined based on a first unnecessary component containing an object parallax component. Furthermore, according to this embodiment, an unnecessary component reduced image (second unnecessary component reduced image) in which the second unnecessary component is reduced from a parallax synthesis image can be generated.

In this embodiment, in order to reduce a noise component or an offset component, a coefficient may be multiplied by the luminance value of each coordinate of the edge extraction result of step S512 or a width of the edge may be extended to further emphasize the edge before generating the edge reduced image at step S513.

Embodiment 8

Next, Embodiment 8 of the present invention will be described. This embodiment is different from each of Embodiments 6 and 7 in a method of an extracting process. In this embodiment, an image pickup apparatus in this embodiment has the same basic configuration as that of the image pickup apparatus 500 in Embodiment 6 described referring to FIG. 30, and thus a description thereof will be omitted. In addition, an image processing method in this embodiment is different only in a process flow and a calculation method from those of Embodiment 6, and its result is the same as that of Embodiment 6.

Figure 38:
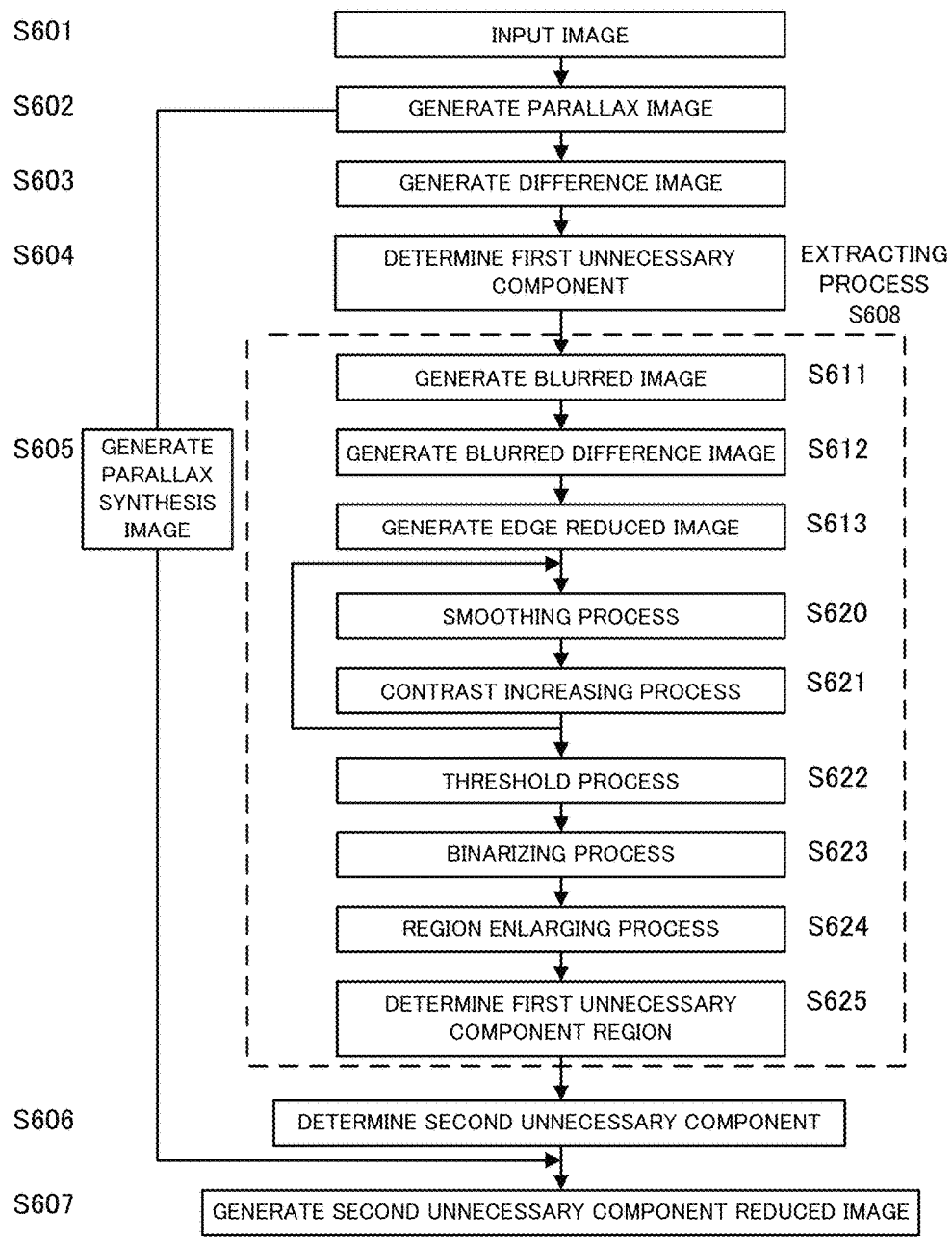
FIG. 38 illustrates a flowchart of the image processing method in Embodiment 8.
Figure 39:
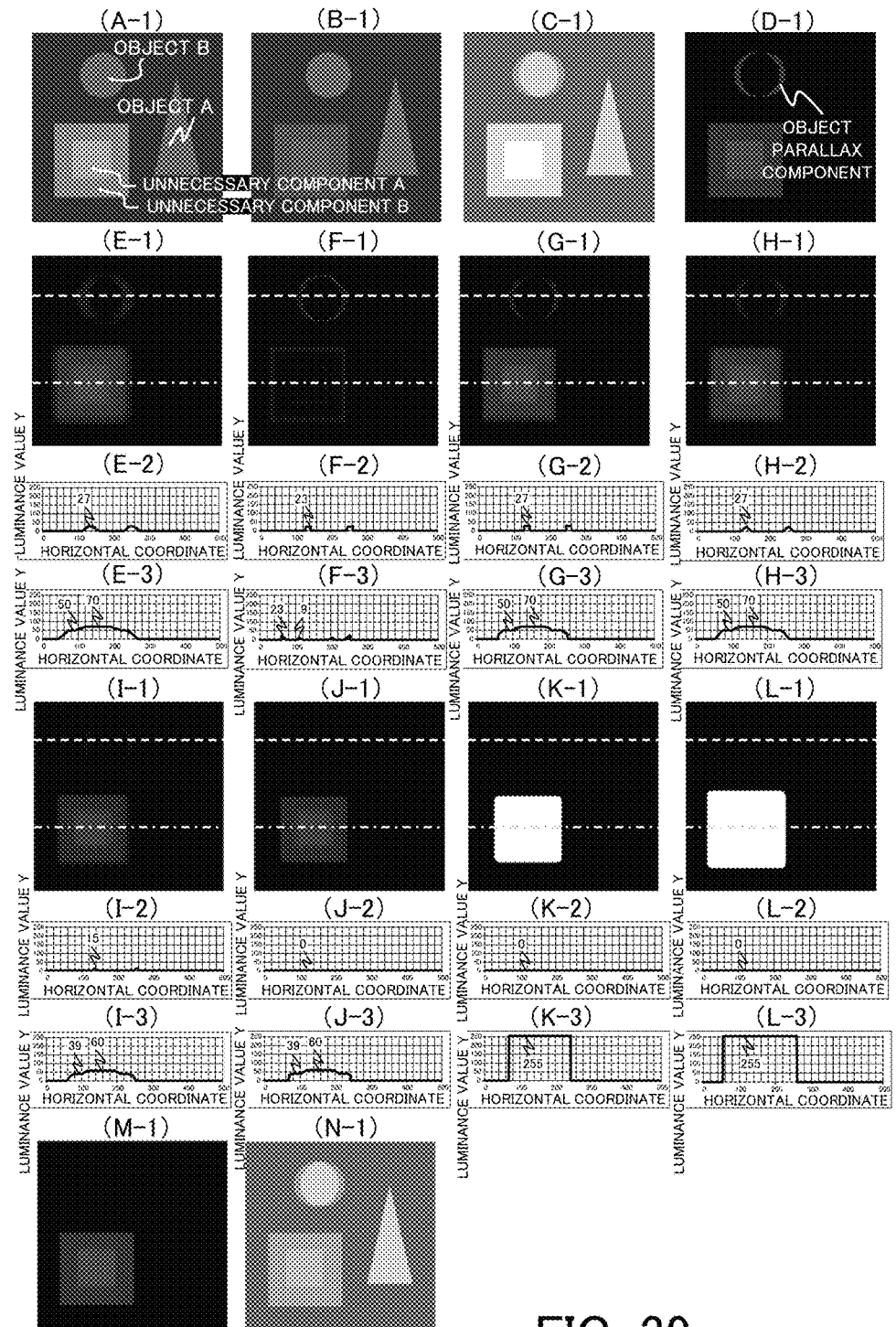
FIG. 39 illustrates a procedure of the image processing method in Embodiment 8.
Figure 40:
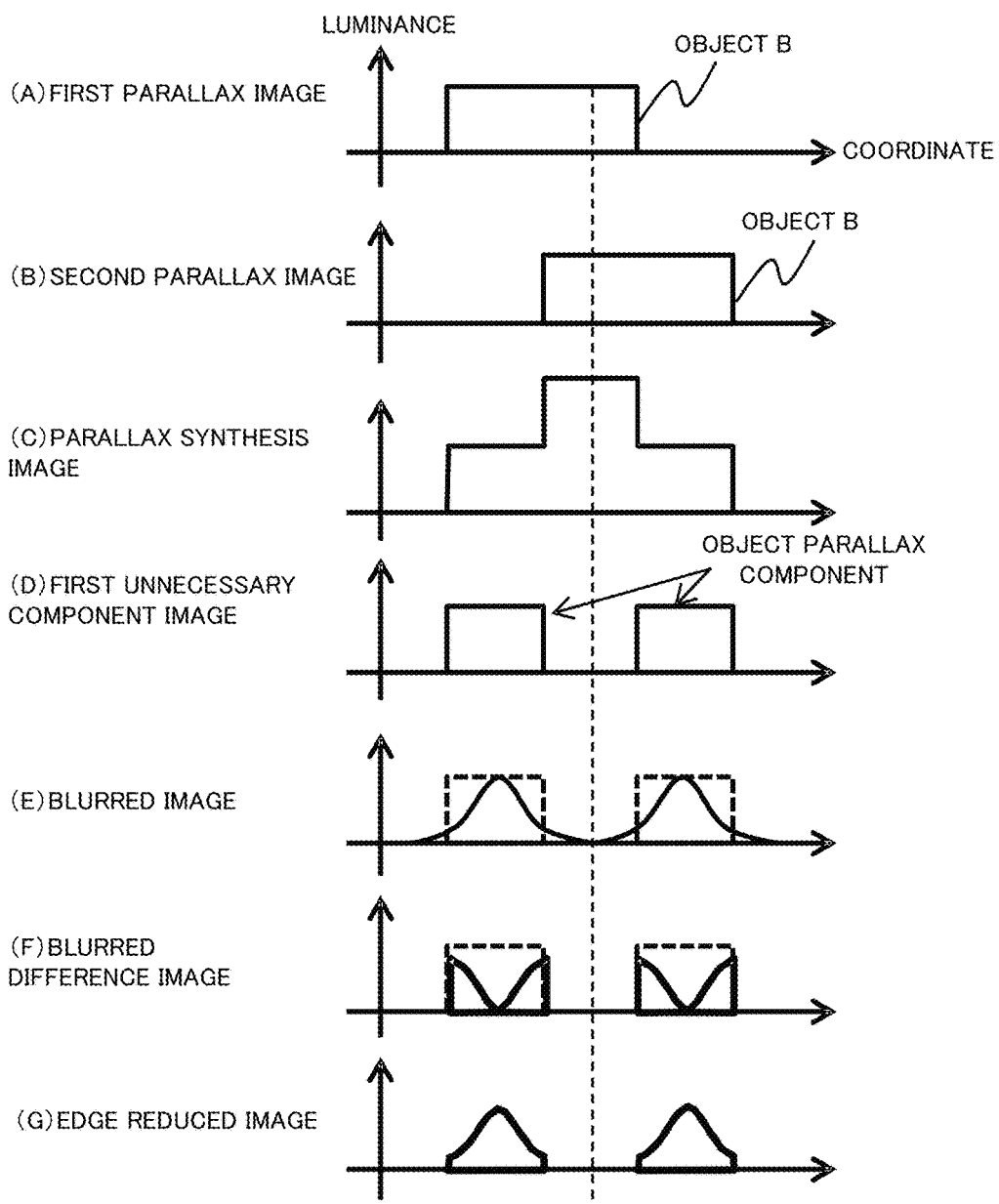
FIG. 40 illustrates a procedure of the image processing method in Embodiment 8.

Next, referring to FIGS. 38 to 40, an image processing method (process of reducing the object parallax component) in this embodiment will be described. FIG. 38 illustrates a flowchart of the image processing method. Each step in FIG. 38 is executed mainly by the system controller 210 or the image processor 504 in accordance with an image processing program as a computer program. FIGS. 39 and 40 illustrate a procedure of the image processing method.

Steps S601 to S607 of FIG. 38 are respectively the same as steps S501 to S507 in Embodiment 7 described referring to FIG. 34. Steps S611 to S625 of FIG. 38 are respectively the same as steps S511 to S525 in Embodiment 7 described referring to FIG. 34. Therefore, descriptions of these steps will be omitted. This embodiment is different from Embodiment 7 in that a step corresponding to step S510 is eliminated and the blur is directly added to the first unnecessary component (first unnecessary component image) to generate the blurred difference image. Since this embodiment does not have the step corresponding to step S510, the first unnecessary component reduced image as described in Embodiment 7 is not generated. For making an easy comparison with Embodiment 7, an unnecessary component reduced image generated at the final step S607 is referred to as a "second unnecessary component reduced image". FIG. 39 (A-1) to FIG. 39 (D-1) respectively correspond to FIG. 35 (A-1) to FIG. 35 (D-1).

Referring to FIG. 40, a reason why the object parallax component can be reduced by directly adding the blur to the first unnecessary component (first unnecessary component image), eliminating the step corresponding to step S510 in Embodiment 7, to generate the blurred difference image will be described. FIG. 40 (A) to FIG. 40 (D) respectively correspond to FIG. 37 (A-1) to FIG. 37 (D-1) in Embodiment 7. In Embodiment 7, as illustrated in FIG. 37 (E-1), the first unnecessary component reduced image is generated, but on the other hand, in this embodiment, the blur is added to the first unnecessary component image of FIG. 40 (D) to generate a blurred image of FIG. 40 (E). A blur adding method in this embodiment uses a Gaussian filtering process as described in Embodiment 7, or alternatively, other blur adding methods may be used.

This embodiment is different from Embodiment 7 in the method of generating the blurred difference image. In this embodiment, the blur image generated at step S611 is subtracted from the first unnecessary component image determined at step S604 to generate the blurred difference image. In this case, a direction of the subtraction is opposite to that in Embodiment 7. Specifically, the blurred image of FIG. 40 (E) is subtracted from the first unnecessary component image of FIG. 40 (D). As a result, the blurred difference image as illustrated in FIG. 40 (F) is obtained. Furthermore, subtracting the blurred difference image from the first unnecessary component image, an edge reduced image is obtained. Specifically, the blurred difference image of FIG. 40 (F) is subtracted from the first unnecessary component image of FIG. 40 (D). As a result, the edge reduced image as illustrated in FIG. 40 (G) is obtained. Accordingly, the edge portion in the first unnecessary component image can be reduced.

FIG. 39 (E-1), FIG. 39 (F-1), and FIG. 39 (G-1) respectively correspond to FIG. 40 (E), FIG. 40 (F), and FIG. 40 (G), which are respectively images obtained by the processes at steps S611, S612, and S613 of FIG. 38. FIG. 39 (E-2) and FIG. 39 (E-3) are respectively cross sections of luminances along a dashed line and a dashed-dotted line in FIG. 39 (E-1). FIG. 39 (F-2) and FIG. 39 (F-3) are respectively cross sections of luminances along a dashed line and a dashed-dotted line in FIG. 39 (F-1). FIG. 39 (G-2) and FIG. 39 (G-3) are respectively cross sections of luminances along a dashed line and a dashed-dotted line in FIG. 39 (G-1).

Subsequent step S608 (S620 to S625) is the same as step S508 (S520 to S525) in Embodiment 7 described referring to FIG. 34, and thus descriptions thereof will be omitted. FIG. 39 (H-1) to FIG. 39 (M-1) are respectively images obtained by the processes at steps S620 to S625. FIG. 39 (H-2) and FIG. 39 (H-3) are respectively cross sections of luminances along a dashed line and a dashed-dotted line in FIG. 39 (H-1). Similarly, FIG. 39 (I-2) and FIG. 39 (I-3), FIG. 39 (J-2) and FIG. 39 (J-3), FIG. 39 (K-2) and FIG. 39 (K-3), and FIG. 39 (L-2) and FIG. 39 (L-3) respectively illustrate cross sections of luminances corresponding to FIG. 39 (I-1) to FIG. 39 (L-1).

Next, at step S606, a second unnecessary component is determined based on the first unnecessary component and the first unnecessary component region. Specifically, the masking process is performed on the first unnecessary component by using the first unnecessary component region (mask) to extract, as the second unnecessary component, only the part where the unnecessary component such as a ghost is contained.

Finally, at step S607, the image processor 504 (unnecessary component reducing unit 504*d*) performs a unnecessary component reducing process based on the second unnecessary component determined at step S606 and the parallax synthesis image generated at step S605. Specifically, the unnecessary component reducing unit 504*d* subtracts the second unnecessary component (second unnecessary component image) of FIG. 39 (M-1) from the parallax synthesis image of FIG. 39 (C-1). According to this process, an unnecessary component reduced image (second unnecessary component reduced image) is generated as illustrated in FIG. 39 (N-1).

According to this embodiment, a second unnecessary component having a reduced object parallax component can be determined based on a first unnecessary component containing an object parallax component. Furthermore, according to this embodiment, an unnecessary component reduced image (second unnecessary component reduced image) in which the second unnecessary component is reduced from a parallax synthesis image can be generated.

Embodiment 9

Next, Embodiment 9 of the present invention will be described. This embodiment is different from each of Embodiments 6 to 8 in displaying a result of an extracting process on the display unit 205 (display). In this embodiment, an image pickup apparatus in this embodiment has the same basic configuration as that of the image pickup apparatus 500 in Embodiment 6 described referring to FIG. 30, and thus a description thereof will be omitted. As an extracting process in an image processing method in this embodiment, the same extracting process as that in each of Embodiments 6 to 8 is applicable.

Figure 41:
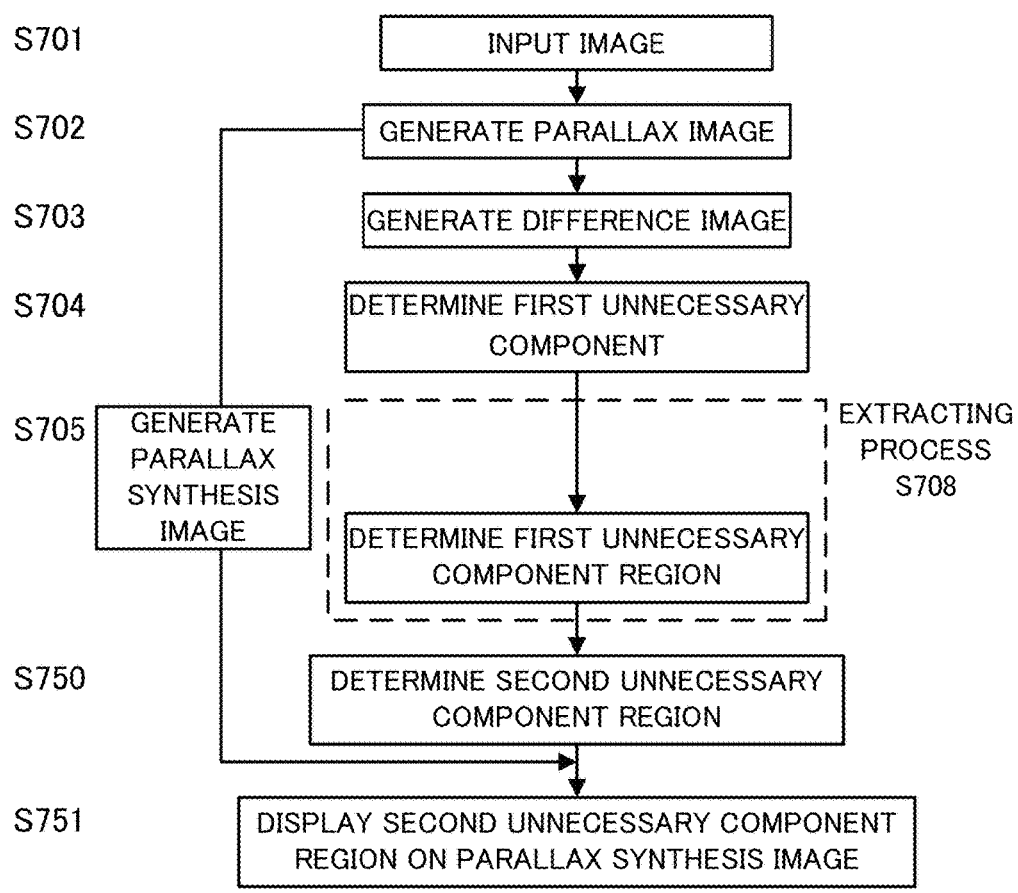
FIG. 41 illustrates a flowchart of the image processing method in Embodiment 9.
Figure 42A:
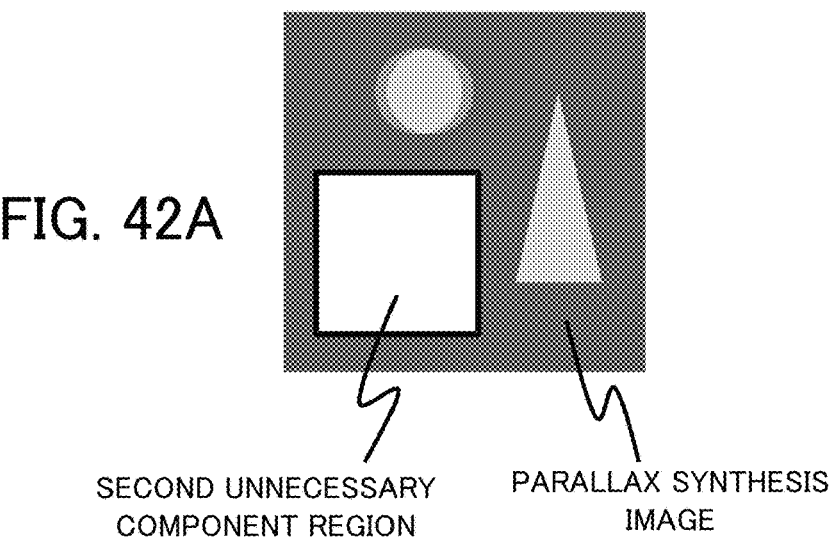
FIGS. 42A and 42B illustrate exemplary output images obtained by the image processing method in Embodiment 9.
Figure 42B:
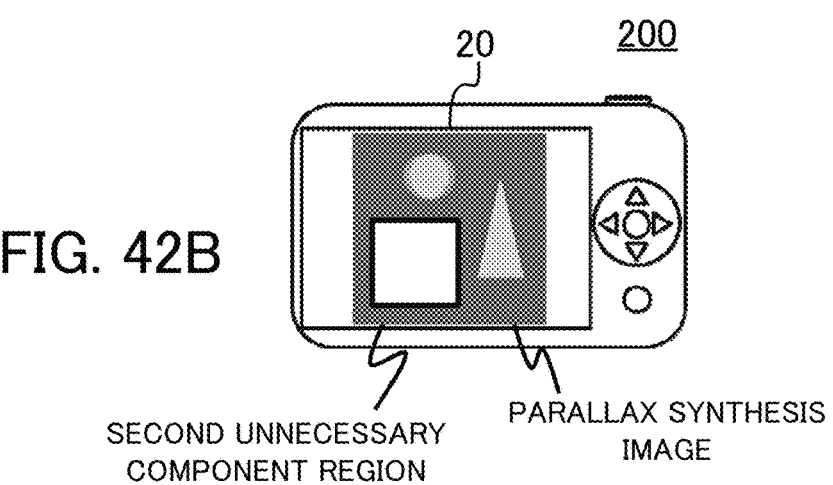

Next, referring to FIGS. 41, 42A, and 42B, an image processing method (process of reducing the object parallax component and displaying the extraction result of the unnecessary component) in this embodiment will be described. FIG. 41 illustrates a flowchart of the image processing method. Each step in FIG. 41 is executed mainly by the system controller 210, the image processor 504, or the display unit 205 in accordance with an image processing program as a computer program. FIGS. 42A and 42B illustrate exemplary output images obtained by the image processing method.

Steps S701 to S705 of FIG. 41 are respectively the same as steps S401 to S405 in Embodiment 6. In addition, step S408 (S420 to S425) in Embodiment 6 is applicable as an extracting process at step S708. Alternatively, step S508 (S510 to S525) in Embodiment 7 or step S608 (S611 to S625) in Embodiment 8 may be applied. This embodiment is different from each of Embodiments 6 to 8 in that a second unnecessary component region is determined at step S750 after the first unnecessary component region is determined, and the display unit 205 displays a second unnecessary component region along with the parallax synthesis image at step S751.

At step S750, the image processor 504 (extracting unit 504*b*) determines a second unnecessary component region (unnecessary component region displayed on the display unit 205) based on the first unnecessary component region determined at step S708. The simplest method of determining the second unnecessary component region is to treat the first unnecessary component region as the second unnecessary component region. Specifically, for example each of regions having a luminance value of 255 in FIG. 28 (I-1), FIG. 36 (A-1), and FIG. 39 (L-1) of Embodiments 6 to 8 respectively is considered to be the second unnecessary component region. Accordingly, the second unnecessary component region can be easily determined. Alternatively, expanding or reducing in size of the first unnecessary component region, a result of processing the first unnecessary component region may be determined as the second unnecessary component region so that it can be easily identified by a user when being displayed on the display unit 205 at the latter step.

Subsequently, at step S751, the system controller 210 and the image processor 504 displays the second unnecessary component region determined at step S750, along with the parallax synthesis image generated at step S705, on the display unit 205. Specifically, as illustrated in FIG. 42A, the second unnecessary component region is synthesized on the parallax synthesis image to be displayed on the display unit 205. As a method of displaying the second unnecessary component region, for example, the region can be colored or blinked, or the parallax synthesis image at the background can be displayed through the region for being easily recognized by the user. For example, as illustrated in FIG. 42B, immediately after capturing an image, the region as well as the image may be displayed on a backside display 20 (display) so that the user can see it.

According to this embodiment, the unnecessary component region (second unnecessary component region), along with the parallax synthesis image, is displayed on the display unit so that a user can see the generation of the unnecessary component such as a ghost. This embodiment only needs to have a configuration so that the second unnecessary component region can be displayed, and therefore it is not necessary to determine a second unnecessary component obtained by reducing the object parallax component from the first unnecessary component.

Embodiment 10

Next, Embodiment 10 (multiple pupil division) of the present invention will be described. This embodiment is different from each of Embodiments 6 to 9 in the number of parallaxes. An image processing method in this embodiment is different from each embodiment described above in the process step of generating the parallax images and determining the first unnecessary step, but the subsequent steps are the same as those of each embodiment and thus descriptions thereof will be omitted. In this embodiment, an image pickup apparatus in this embodiment has the same basic configuration as that of the image pickup apparatus 500 in Embodiment 6 described referring to FIG. 30, and thus a description thereof will be omitted.

Figure 43:
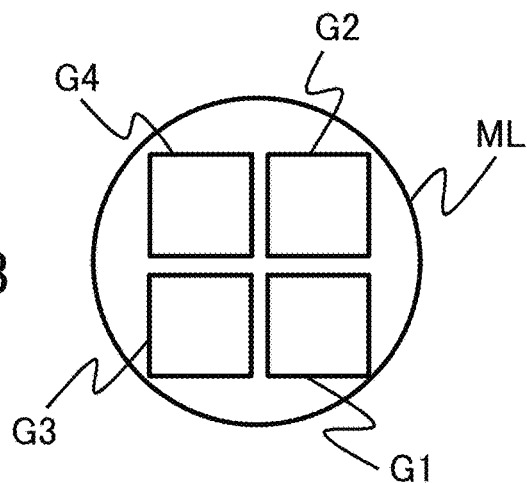
FIG. 43 illustrates an image pickup element in Embodiment 10.

FIG. 43 illustrates an image pickup element (light-receiving portion) in this embodiment. In FIG. 43, ML denotes a micro lens. G1, G2, G3, and G4 are a group of light-receiving portions (pixels). The image pickup element includes an array of a plurality of pixel groups each including the pixels G1, G2, G3, and G4, and each pixel group has a conjugate relation with an exit pupil EXP via the micro lens ML that is common or shared (in other words, provided for each pixel group). In this embodiment, when outputting an image equivalent to the shot image generated by "the image pickup without the pupil division", signals obtained from the four pixel groups G1, G2, G3, and G4 are added (combined) and averaged to generate a signal value. A specific exemplary configuration of an optical system is the same as that of the optical system 201 in Embodiment 6 described referring to FIGS. 31A to 31C, and thus a description thereof will be omitted.

Figure 44:
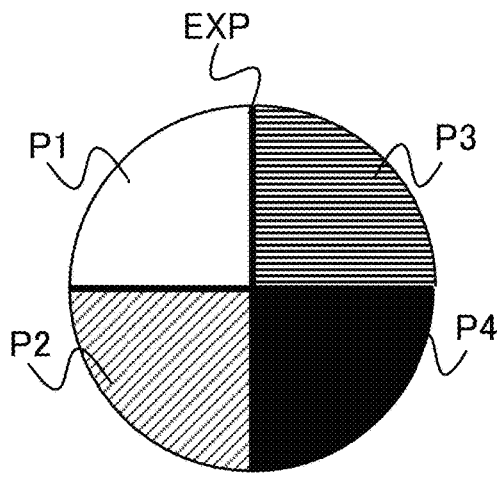
FIG. 44 illustrates an explanatory diagram of unnecessary light passing through an aperture stop of the optical system in Embodiment 10.

FIG. 44 illustrates regions P1, P2, P3, and P4 (pupil regions or pupil division regions) through which light beams incident on the pixels G1, G2, G3, and 14 illustrated in FIG. 43 pass. An aperture stop STP may be assumed to be equivalent to an exit pupil EXP of the optical system 201 (virtual image when seen from a position on an imaging plane of the optical system 201), but in practice, the aperture stop STP and the exit pupil EXP are different from each other. Light beams from a high luminance object (the sun) that pass through the aperture stop STP are incident on the pixels while being divided into the regions P1, P2, P3, and P4 (pupil regions).

Figure 45:
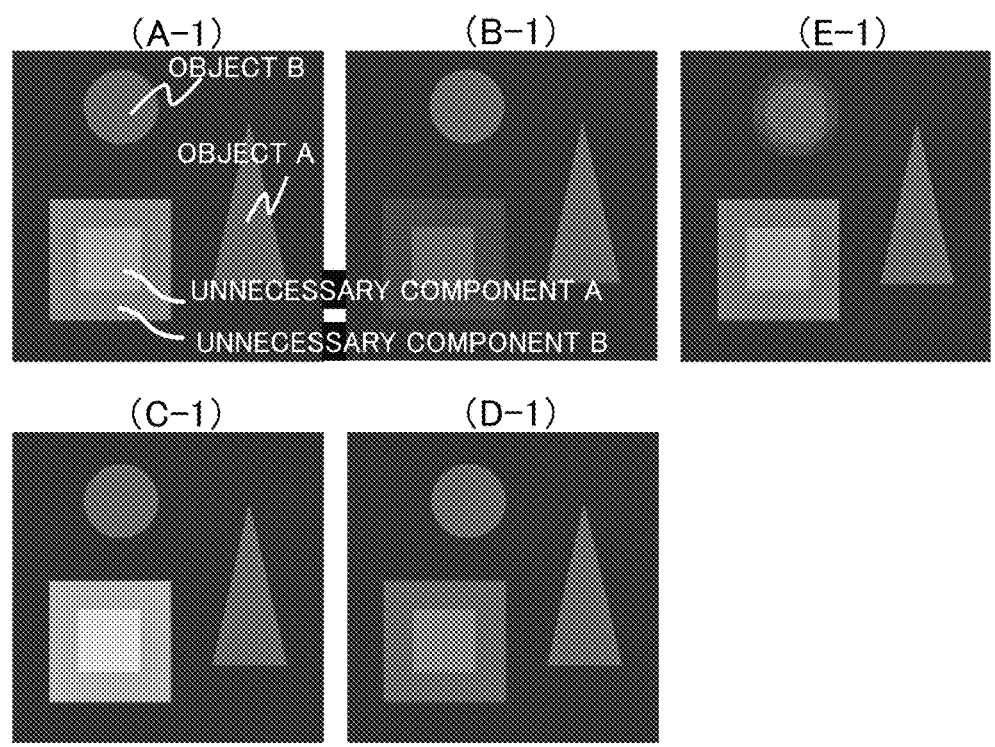
FIG. 45 illustrates a procedure of the image processing method in Embodiment 10.
Figure 46:
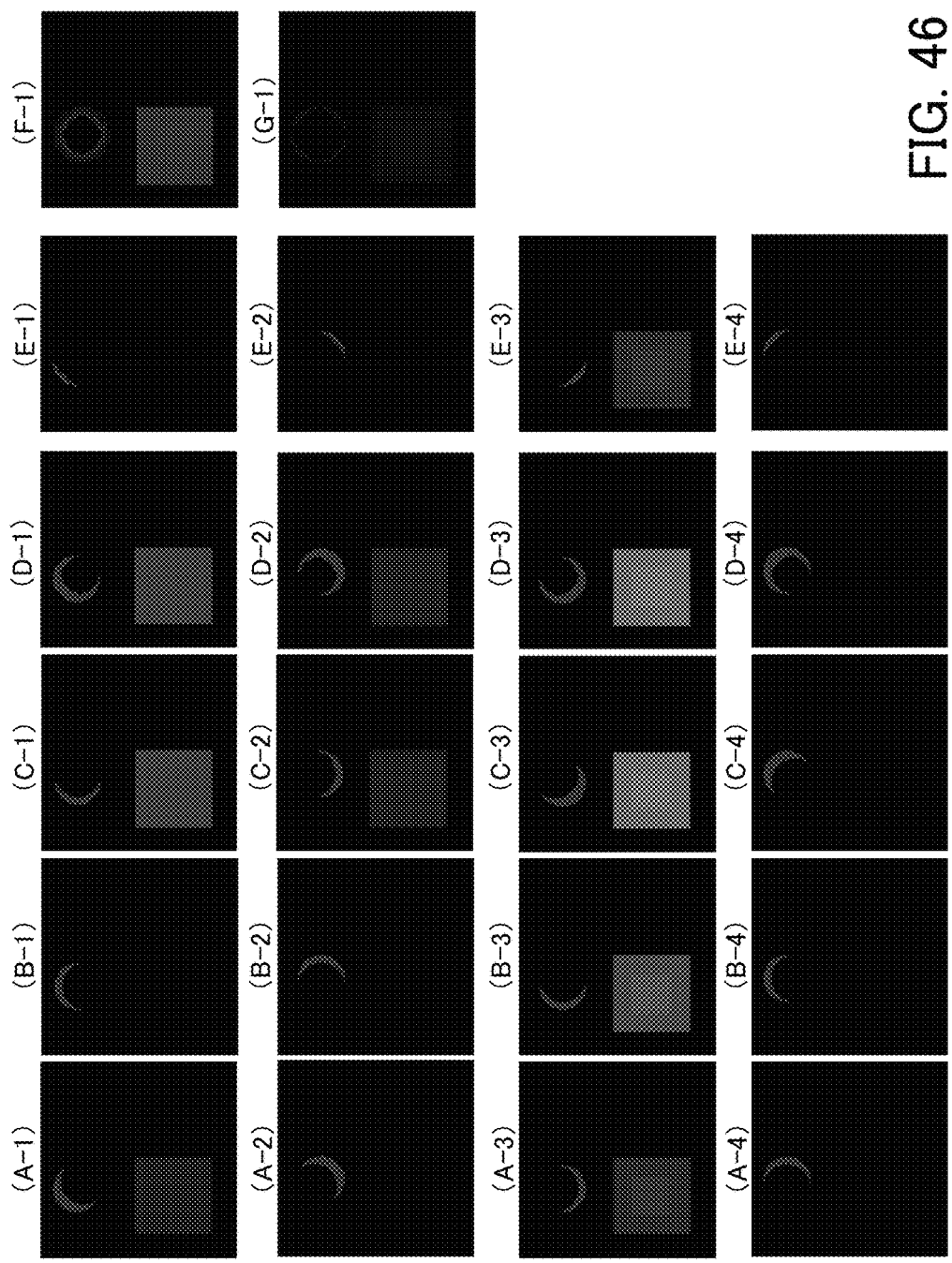
FIG. 46 illustrates a procedure of the image processing method in Embodiment 10.

Subsequently, referring to FIGS. 45 and 46, a method of determining an unnecessary component as an image component that appears through a photoelectric conversion of unnecessary light in a shot image generated by the image pickup apparatus 500 will be described. FIGS. 45 and 46 illustrate a procedure of the image processing method in this embodiment.

FIG. 45 (A-1), FIG. 45 (B-1), FIG. 45 (C-1) and FIG. 45 (D-1) respectively illustrate a pair of parallax images obtained by performing, at the pixel groups G1, G2, G3, and G4, a photoelectric conversion on light beams passing through the regions (pupil regions) P1, P2, P3, and P4. The pair of parallax images contain a triangular object A, a round object B, and unnecessary components A and B schematically illustrated as a square. These parallax images focus on the object A, and the object B has a predetermined parallax amount since it is behind the object A. Each unnecessary components of the parallax images occurs at the same position in FIG. 45 (A-1), FIG. 45 (B-1), FIG. 45 (C-1) and FIG. 45 (D-1), and the luminances of the unnecessary components are different from each other.

FIG. 45 (E-1) is an image obtained by adding and averaging the parallax images illustrated in FIG. 45 (A-1), FIG. 45 (B-1), FIG. 45 (C-1), and FIG. 45 (D-1) to be synthesized. Specifically, adding luminance values of each coordinate in the images of FIG. 45 (A-1), FIG. 45 (B-1), FIG. 45 (C-1), and FIG. 45 (D-1) and dividing the added value by four, a luminance value of each coordinate in the image of FIG. 45 (E-1) is calculated. The image of FIG. 45 (E-1) is equivalent to the shot image generated by performing "the image pickup without performing the pupil division" in the image pickup apparatus of this embodiment. The image of FIG. 45 (E-1) is a display image which is displayed on the display unit 205 to see the shot image by a user.

FIG. 46 (A-1), FIG. 46 (B-1), and FIG. 46 (C-1) respectively illustrate difference images obtained by subtracting the images of FIG. 45 (B-1), FIG. 45 (C-1), and FIG. 45 (D-1) in the pair of parallax images from the image of FIG. 45 (A-1) in the pair as a reference image. Similarly to Embodiment 6, each of these difference images contains an unnecessary component as difference information. Similarly to Embodiment 6, the difference calculation calculates the unnecessary component included in each of the images of FIG. 46 (A-1), FIG. 46 (B-1), and FIG. 46 (C-1) as a negative value, but this negative value is discarded to be zero for the sake of simplifying an unnecessary component reducing process at the latter step. This is true also in all the difference images described below. FIG. 46 (D-1) is information (difference maximum value information, or difference maximum value image) obtained by extracting the maximum value of the difference information at each pixel position in the difference images of FIG. 46 (A-1), FIG. 46 (B-1), and FIG. 46 (C-1) which are the difference information acquired as two-dimensional data.

FIG. 46 (A-2), FIG. 46 (B-2), and FIG. 46 (C-2) respectively illustrate difference images obtained by subtracting the images of FIG. 45 (A-1), FIG. 45 (C-1), and FIG. 45 (D-1) in the pair of parallax images from the image of FIG. 45 (B-1) in the pair as a reference image. FIG. (D-2) is difference maximum value information of the difference information at each pixel position in the difference images of FIG. 46 (A-2), FIG. 46 (B-2), and FIG. 46 (C-2) which are the difference information acquired as two-dimensional data.

FIG. 46 (A-3), FIG. 46 (B-3), and FIG. 46 (C-3) respectively illustrate difference images obtained by subtracting the images of FIG. 45 (A-1), FIG. 45 (B-1), and FIG. 45 (D-1) in the pair of parallax images from the image of FIG. 45 (C-1) in the pair as a reference image. FIG. 46 (D-3) is difference maximum value information of the difference information at each pixel position in the difference images of FIG. 46 (A-3), FIG. 46 (B-3), and FIG. 46 (C-3) which are the difference information acquired as two-dimensional data.

FIG. 46 (A-4), FIG. 46 (B-4), and FIG. 46 (C-4) respectively illustrate difference images obtained by subtracting the images of FIG. 45 (A-1), FIG. 45 (B-1), and FIG. 45 (C-1) in the pair of parallax images from the image of FIG. 45 (D-1) in the pair as a reference image. FIG. (D-4) is difference maximum value information of the difference information at each pixel position in the difference images of FIG. 46 (A-4), FIG. 46 (B-4), and FIG. 46 (C-4) which are the difference information acquired as two-dimensional data. These pieces of difference maximum value information are results of extracting unnecessary components from each parallax image.

As described in Embodiments 6 to 9, a case in which the first unnecessary component (first unnecessary component image obtained by imaging the first unnecessary component) is to be determined is considered. As described above, since the unnecessary component is extracted as difference maximum value information for each parallax image, each piece of the difference maximum value information is considered to correspond to each first unnecessary component image as a method. However, it is necessary to perform the subsequent processes on each parallax image as an image, and accordingly the process step is complicated. Therefore, in this embodiment, the pieces of the difference maximum value information are synthesized to be one piece of information, and accordingly the subsequent processes can be simplified. Specifically, the images of FIG. 46 (D-1), FIG. 46 (D-2), FIG. 46 (D-3), and FIG. 46 (D-4) are added and averaged, and thus these images are synthesized. FIG. 46 (F-1) is a synthesis result.

In this embodiment, alternatively, difference minimum value information may be extracted. FIG. 46 (E-1) is information (difference minimum value information, or difference minimum value image) obtained by extracting the minimum value of the difference information at each pixel position in the difference images of FIG. 46 (A-1), FIG. (B-1), and FIG. 46 (C-1) which are the difference information acquired as two-dimensional data. FIG. 46 (E-2) is difference minimum value information of the difference information at each pixel position in the difference images of FIG. 46 (A-2), FIG. 46 (B-2), and FIG. 46 (C-2) which are the difference information acquired as two-dimensional data. FIG. 46 (E-3) is difference minimum value information of the difference information at each pixel position in the difference images of FIG. 46 (A-3), FIG. 46 (B-3), and FIG. 46 (C-3) which are the difference information acquired as two-dimensional data. FIG. 46 (E-4) is difference minimum value information of the difference information at each pixel position in the difference images of FIG. 46 (A-4), FIG. 46 (B-4), and FIG. 46 (C-4) which are the difference information acquired as two-dimensional data. FIG. 46 (G-1) is a result (synthesis result) of adding and averaging the images of FIG. 46 (E-1), FIG. 46 (E-2), FIG. 46 (E-3), and FIG. 46 (E-4) to synthesize the pieces of difference minimum value information to one piece of information.

These pieces of difference maximum value information are results of extracting unnecessary components from each parallax image. When a reducing process is performed based on the difference minimum value information, compared to the case in which the difference maximum value information is used, the influence on the object parallax component is reduced although a reduction amount of the unnecessary component decreases. Therefore, applying each process flow in Embodiments 6 to 9, the object parallax component can be easily reduced. With respect to the subsequent process flow, each flow in Embodiments 6 to 9 is applicable and thus descriptions thereof will be omitted. Accordingly, even when the number of parallaxes increases, "the parallax synthesis image" and "the first unnecessary component image" can be calculated. The subsequent process flow and the basic handling manner are the same as those in Embodiments 6 to 9, and thus descriptions thereof are omitted.

According to this embodiment, an unnecessary component formed by unnecessary light (ghost or flare) can be determined from a difference image based on a plurality of parallax images obtained by image pickup once. In other words, the unnecessary component contained in a shot image can be determined without performing image pickup a plurality of times. Furthermore, according to this embodiment, an unnecessary component reduced image in which the unnecessary component is reduced from a parallax synthesis image can be obtained. For simplicity, this embodiment describes an example of a gray-scale image, but can also be applied to a color image similarly. In this case, the processes described above are performed independently for each color channel, and eventually each color may be synthesized to obtain an image.

Embodiment 11

Figure 47:
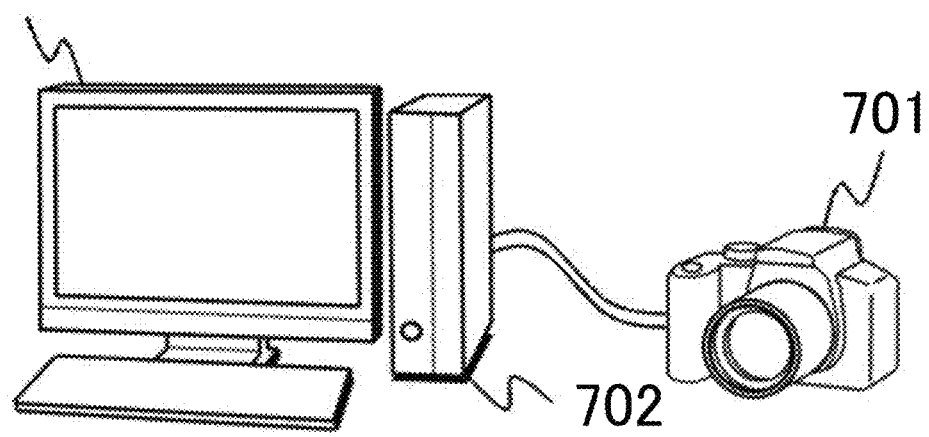
FIG. 47 illustrates a configuration of an image pickup system in Embodiment 11.

Next, referring to FIG. 47, an image pickup system in Embodiment 11 of the present invention will be described. FIG. 47 is a configuration diagram of an image pickup system 700 in this embodiment. As illustrated in FIG. 47, the image pickup system 700 includes an image pickup apparatus 701, an image processing apparatus 702, and a display apparatus 703.

The image pickup apparatus 701 corresponds to the image pickup apparatus 200 (FIG. 6) or the image pickup apparatus 500 (FIG. 30) in each embodiment described above. The image processing apparatus 702 is a computer device which performs the image processing method in each embodiment. The image processing apparatus 702 includes a communication unit (not illustrated). The communication unit receives a shot image (parallax images) from the image pickup apparatus 701. The connection between the image processing apparatus 702 and the image pickup apparatus 701 via the connection unit may be achieved by using a wired or wireless connection method.

A display image calculated by the image processing apparatus 702 based on the parallax images or a display image obtained by adding part of a mask image to the parallax image is stored in a storage unit (not illustrated) incorporated in the image processing apparatus 702 or displayed on the display apparatus 703. The display apparatus 703 is for example a liquid crystal display or a projector. A user can work while seeing an image during the image processing via the display apparatus 703. The user may specify a first unnecessary component region or a second unnecessary component region in this work. Accordingly, the user can confirm information as to whether the unnecessary component is contained in a shot image via the display apparatus 703.

In each of the embodiments (Embodiments 6 to 11), the image processing apparatus (image processor 504) includes a first determiner (unnecessary component detecting unit 504*a*) and a second determiner (extracting unit 504*b*). The first determiner determines a first unnecessary component based on difference information (for example, difference image or difference synthesis image) of a plurality of parallax images. The second determiner determines a second unnecessary component by reducing a parallax component (object parallax component) from the first unnecessary component.

Preferably, the second determiner determines the second unnecessary component based on the first unnecessary component and a mask (first unnecessary component region) created based on the first unnecessary component. More preferably, the second determiner changes a luminance value of the first unnecessary component to create the mask, and perform a masking process by using the mask on the first unnecessary component to determine the unnecessary component. More preferably, the second determiner changes the luminance value by performing at least one of a smoothing process, a contrast changing process (contrast increasing process), and a threshold process on the first unnecessary component (S420, S421, S422). More preferably, the second determiner performs a binarizing process on the first unnecessary component after performing the at least one of the smoothing process, the contrast changing process, and the threshold process (S423). More preferably, the second determiner performs an enlarging process on the binarized first unnecessary component (S424). More preferably, the second determiner creates the mask based on the enlarged first unnecessary component (S425).

Preferably, the second determiner generates an unnecessary component reduced image (first unnecessary component reduced image) based on the parallax image and the first unnecessary component (S510). The second determiner also determines an edge component based on a difference between a blurred image obtained by adding blur to the unnecessary component reduced image, and the unnecessary component reduced image (S511, S512). Then, the second determiner reduces the edge component from the first unnecessary component (S513).

Preferably, the second determiner generates a first unnecessary component image based on the first unnecessary component (S604). The second determiner also determines an edge component based on a difference between a blurred image obtained by adding blur to the first unnecessary component image, and the first unnecessary component image (S611, S612). Then, the second determiner reduces the edge component from the first unnecessary component (S613).

Preferably, the image processing apparatus includes a reducer (unnecessary component reducing unit 504*c*) that reduces the second unnecessary component from an image based on the plurality of parallax images. More preferably, the image based on the plurality of parallax images is a synthesized parallax image that is obtained by synthesizing the parallax images.

Preferably, the image pickup apparatus includes a display (display unit 205 or backside display 20) that displays information on a mask created based on the first unnecessary component to determine the second unnecessary component.

Each embodiment can provide an image processing apparatus, an image pickup apparatus, an image processing method, and a non-transitory computer-readable storage medium that are capable of determining a first unnecessary component of a shot image to determine a second unnecessary component in which an object parallax component is reduced from the first unnecessary component without performing image pickup a plurality of times.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086065, filed on Apr. 18, 2014, and Japanese Patent Laid-open No. 2015-040020, filed on Mar. 2, 2015, which are hereby incorporated by reference wherein in their entirety.

What is claimed is:

1. An image processing method comprising:
    determining a first unnecessary component contained in each of a plurality of parallax images based on a plurality of pieces of relative difference information of the plurality of parallax images, the first unnecessary component including a parallax component corresponding to a parallax among the plurality of parallax images and a component corresponding to light reflected inside an optical system used for capturing the plurality of parallax images;
    generating a first image in which the first unnecessary component is reduced based on the plurality of parallax images and the first unnecessary components;
    generating a blurred image by adding blur to the first image;
    creating a mask by subtracting the first image from the blurred image; and
    determining a second unnecessary component where the parallax component is reduced from the first unnecessary component by performing a masking processing with the mask for the first unnecessary component.

2. The image processing method according to claim 1, further comprising obtaining the plurality of parallax images by photographing.

3. The image processing method according to claim 1, further comprising setting each of the plurality of parallax images as a reference image and calculating differences between the reference image and the other parallax images of the plurality of parallax images to obtain the relative difference information.

4. The image processing method according to claim 1, wherein determining the first unnecessary component includes:
acquiring, as two-dimensional data with any negative value discarded, each piece of relative difference information obtained by using, as a reference image, one of the plurality of parallax images that contains the first unnecessary component to be determined, and
extracting a maximum value among the pieces of relative difference information at each position in the two-dimensional data to determine the first unnecessary component contained in the reference image.

5. The image processing method according to claim 1, wherein generating the blurred image includes generating the blurred image by using a filter to apply a blurring effect to the first image.

6. The image processing method according to claim 5, wherein an amount of blurring by a filtering process using the filter is determined based on an image shooting condition of the plurality of parallax images.

7. The image processing method according to claim 5, wherein an amount of blurring by a filtering process using the filter is determined based on object distance information of the plurality of parallax images.

8. The image processing method according to claim 7, further comprising calculating the object distance information based on the plurality of parallax images.

9. The image processing method according to claim 1, further comprising adding a blur to the mask.

10. The image processing method according to claim 1, further comprising generating a second image by reducing the second unnecessary component from at least one of the plurality of parallax images,
wherein determining the second unnecessary component includes determining, as the second unnecessary component, an unnecessary component contained in each of the plurality of parallax images based on the first unnecessary component and the mask.

11. The image processing method according to claim 1, further comprising generating a second image by reducing the second unnecessary component from a synthesis image obtained by synthesizing the plurality of parallax images,
wherein determining the second unnecessary component includes determining, as the second unnecessary component, an unnecessary component contained in the synthesis image based on a synthesis value of the first unnecessary components and the mask.

12. The image processing method according to claim 11, wherein the synthesis value of the first unnecessary components is an average value of the first unnecessary components of the plurality of parallax images.

13. The image processing method according to claim 1, further comprising selecting a region to determine the second unnecessary component,
wherein determining the second unnecessary component includes determining the second unnecessary component in the selected region.

14. The image processing method according to claim 1, wherein the plurality of parallax images are images generated based on a plurality of light beams passing through regions of a pupil of the optical system that are different from each other.

15. The image processing method according to claim 1, further comprising performing a correction process to add another unnecessary component to at least one of the plurality of parallax images by using information on the second unnecessary component.

16. An image processing apparatus comprising:
a first unnecessary component determiner configured to determine a first unnecessary component contained in each of a plurality of parallax images based on a plurality of pieces of relative difference information of the plurality of parallax images, the first unnecessary component including a parallax component corresponding to a parallax among the plurality of parallax images and a component corresponding to light reflected inside an optical system used for capturing the plurality of parallax images;
an image generator configured to generate a first image in which the first unnecessary component is reduced based on the plurality of parallax images and the first unnecessary components;
a blurred image generator configured to generate a blurred image by adding blur to the first image;
a mask creator configured to create a mask by subtracting the first image from the blurred image; and
a second unnecessary component determiner configured to determine a second unnecessary component where the parallax component is reduced from the first unnecessary component by performing a masking processing with the mask for the first unnecessary component.

17. An image pickup apparatus comprising:
an image pickup element configured to photoelectrically convert an optical image to output a plurality of parallax images;
a first unnecessary component determiner configured to determine a first unnecessary component contained in each of a plurality of parallax images based on a plurality of pieces of relative difference information of the plurality of parallax images, the first unnecessary component including a parallax component corresponding to a parallax among the plurality of parallax images and a component corresponding to light reflected inside an optical system used for capturing the plurality of parallax images;
an image generator configured to generate a first image in which the first unnecessary component is reduced based on the plurality of parallax images and the first unnecessary components;
a blurred image generator configured to generate a blurred image by adding blur to the first image;
a mask creating unit configured to create a by subtracting the first image from the blurred image; and
a second unnecessary component determiner configured to determine a second unnecessary component where the parallax component is reduced from the first unnecessary component by performing a masking processing with the mask for the first unnecessary component.

18. The image pickup apparatus according to claim 17,
wherein the plurality of parallax images are images generated based on a plurality of light beams passing through regions of a pupil of the optical system that are different from each other,
wherein the image pickup element includes a plurality of pixels that share one microlens, and
wherein the pixels are configured to receive the light beams passing through the regions of the pupil of the optical system that are different from each other.

19. A non-transitory computer-readable storage medium which stores an image processing program to cause a computer to execute a process comprising:
determining a first unnecessary component contained in each of a plurality of parallax images based on a plurality of pieces of relative difference information of the plurality of parallax images, the first unnecessary component including a parallax component corresponding to a parallax among the plurality of parallax images and a component corresponding to light reflected inside an optical system used for capturing the plurality of parallax images;
generating a first image in which the first unnecessary component is reduced based on the plurality of parallax images and the first unnecessary components;
generating a blurred image by adding blur to the first image;
creating a mask by subtracting the first image from the blurred image; and
determining a second unnecessary component where the parallax component is reduced from the first unnecessary component by performing a masking processing with the mask for the first unnecessary component.

* * * * *